(12) United States Patent
Gelinske et al.

(10) Patent No.: US 8,944,822 B2
(45) Date of Patent: *Feb. 3, 2015

(54) SYNCHRONIZED VIDEO AND SYNTHETIC VISUALIZATION SYSTEM AND METHOD

(75) Inventors: Joshua N. Gelinske, Fargo, ND (US); Robert M. Allen, Reiles Acres, ND (US); Barry D. Batcheller, West Fargo, ND (US); Jacob A. Halvorson, Dilworth, MN (US); Tyler C. Ohlsen, West Fargo, ND (US); Seth J. Schubert, Moorhead, MN (US); Robert V. Weinmann, Wahpeton, ND (US); Johan A. Wiig, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 811 days.

This patent is subject to a terminal disclaimer.

(21) Appl. No.: 13/030,901

(22) Filed: Feb. 18, 2011

(65) Prior Publication Data

US 2011/0171612 A1 Jul. 14, 2011

Related U.S. Application Data

(63) Continuation-in-part of application No. 12/961,612, filed on Dec. 7, 2010, which is a continuation of application No. 11/327,965, filed on Jan. 9, 2006, now Pat. No. 7,848,698.

(60) Provisional application No. 61/306,299, filed on Feb. 19, 2010, provisional application No. 60/701,736, filed on Jul. 22, 2005.

(51) Int. Cl.
G09B 9/08 (2006.01)
G09B 9/30 (2006.01)
G09B 19/16 (2006.01)

(52) U.S. Cl.
CPC .. G09B 9/30 (2013.01); G09B 9/08 (2013.01); G09B 19/165 (2013.01)
USPC .......................................................... 434/35

(58) Field of Classification Search
USPC .......................................................... 434/35
See application file for complete search history.

(56) References Cited

U.S. PATENT DOCUMENTS 2,975,671 A 3/1961 Hemstreet
3,050,870 A * 8/1962 Heilig ........................... 434/365

(Continued)

FOREIGN PATENT DOCUMENTS

CA 2305633 10/2001
EP 0445270 10/1992

(Continued)

OTHER PUBLICATIONS

"International Search Report", WO 2004/045106 International Search Report, PCT/CA03/01730, (May 27, 2004).

Primary Examiner — Robert J Utama
(74) Attorney, Agent, or Firm — Mark E. Brown; Jonathan L. Tolstedt

(57) ABSTRACT

The present invention presents a flight training and synthetic visualization system, which comprises a fully mobile, self-contained data recording unit including a desktop graphics software engine for creating a virtual model of the flight capable of playing back the recorded trip, synchronized with a real-time video or imagery recording of the actual flight with a view from the cockpit of the aircraft as a pilot would actually view the flight, along with ambient audio of the cockpit. This allows for the user of the simulation to view both modeled data of the flight, as well as actual time-sequenced still images or video of the flight. The two sources of data are synched in time so that real video images of the aircraft as it is flying at a specific point in time is displayed in the simulation at the same moment as the rendered visualization of the flight.

32 Claims, 39 Drawing Sheets

(56) References Cited

U.S. PATENT DOCUMENTS

| | | | |
|---|---|---|---|
| 3,081,557 A | 3/1963 | Mailhot | |
| 3,784,969 A | 1/1974 | Wilckens et al. | |
| 4,226,491 A | 10/1980 | Kazama | |
| 4,263,726 A | 4/1981 | Bolton | |
| 4,276,029 A | 6/1981 | Gilson et al. | |
| 4,380,024 A * | 4/1983 | Olofsson | 348/189 |
| 4,442,491 A * | 4/1984 | Olhausen, Jr. | 701/505 |
| 4,470,116 A | 9/1984 | Ratchford | |
| 4,527,980 A | 7/1985 | Miller | |
| 4,644,494 A | 2/1987 | Muller | |
| 4,694,119 A | 9/1987 | Groenewegen | |
| 4,740,779 A | 4/1988 | Cleary et al. | |
| 4,855,822 A * | 8/1989 | Narendra et al. | 348/114 |
| 4,944,401 A | 7/1990 | Groenewegen | |
| 5,123,538 A | 6/1992 | Groenewegen | |
| 5,173,856 A | 12/1992 | Purnell et al. | |
| 5,240,207 A * | 8/1993 | Eiband et al. | 244/190 |
| 5,261,820 A * | 11/1993 | Slye et al. | 463/1 |
| 5,272,652 A | 12/1993 | Rosenshein et al. | |
| 5,438,162 A | 8/1995 | Thompson et al. | |
| 5,594,286 A | 1/1997 | Tachikawa | |
| 5,742,336 A | 4/1998 | Lee | |
| 5,750,925 A | 5/1998 | Purdom | |
| 5,756,934 A | 5/1998 | Purdom | |
| 5,826,206 A * | 10/1998 | Nemeth | 701/33.4 |
| 5,865,624 A * | 2/1999 | Hayashigawa | 434/66 |
| 6,052,792 A | 4/2000 | Mensch | |
| 6,126,449 A | 10/2000 | Burns | |
| 6,148,179 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,219,618 B1 | 4/2001 | Bateman | |
| 6,345,232 B1 | 2/2002 | Lynch et al. | |
| 6,353,734 B1 | 3/2002 | Wright et al. | |
| 6,389,333 B1 | 5/2002 | Hansman et al. | |
| 6,397,128 B1 | 5/2002 | Todd | |
| 6,415,227 B1 | 7/2002 | Lin | |
| 6,473,676 B2 | 10/2002 | Katz et al. | |
| 6,480,152 B2 | 11/2002 | Lin et al. | |
| D470,450 S | 2/2003 | Olzak | |
| 6,634,885 B2 | 10/2003 | Hodgetts et al. | |
| 6,671,648 B2 | 12/2003 | McCall et al. | |
| 6,678,588 B2 | 1/2004 | He | |
| 6,690,338 B1 * | 2/2004 | Maguire, Jr. | 345/8 |
| 6,721,640 B2 | 4/2004 | Glenn et al. | |
| 6,762,942 B1 | 7/2004 | Smith | |
| 6,792,353 B2 | 9/2004 | Lin | |
| 6,822,161 B2 | 11/2004 | Komatsu et al. | |
| 6,822,624 B2 | 11/2004 | Naimer et al. | |
| 6,867,367 B2 | 3/2005 | Zimmerman | |
| 6,879,875 B1 | 4/2005 | Hu et al. | |
| 6,885,971 B2 | 4/2005 | Vock et al. | |
| 6,898,492 B2 | 5/2005 | de Leon et al. | |
| 6,915,206 B2 | 7/2005 | Sasajima | |
| 7,020,708 B2 | 3/2006 | Nelson et al. | |
| 7,023,695 B2 | 4/2006 | McCollum et al. | |
| 7,177,939 B2 | 2/2007 | Nelson et al. | |
| 7,203,630 B2 | 4/2007 | Kolb et al. | |
| 7,333,343 B2 | 2/2008 | Olzak | |
| 7,356,389 B2 | 4/2008 | Holst et al. | |
| 7,375,678 B2 | 5/2008 | Feyereisen et al. | |
| 7,386,376 B2 * | 6/2008 | Basir et al. | 701/33.4 |
| 7,624,943 B2 * | 12/2009 | Cerchie et al. | 244/17.11 |
| 7,742,080 B2 | 6/2010 | Nakajima | |
| 7,881,914 B2 * | 2/2011 | Trotta et al. | 703/6 |
| 8,355,834 B2 * | 1/2013 | Duggan et al. | 701/24 |
| 2002/0026567 A1 | 2/2002 | Naito et al. | |
| 2002/0035416 A1 | 3/2002 | De Leon | |
| 2003/0152145 A1 * | 8/2003 | Kawakita | 375/240.12 |
| 2003/0195672 A1 | 10/2003 | He | |
| 2003/0225492 A1 | 12/2003 | Cope et al. | |
| 2004/0054512 A1 * | 3/2004 | Kim et al. | 703/8 |
| 2004/0224740 A1 * | 11/2004 | Ball et al. | 463/6 |
| 2005/0114627 A1 | 5/2005 | Budny et al. | |
| 2005/0220055 A1 | 10/2005 | Nelson et al. | |
| 2005/0246353 A1 | 11/2005 | Ezer et al. | |
| 2006/0057974 A1 | 3/2006 | Ziarno et al. | |
| 2006/0176651 A1 | 8/2006 | Olzak | |
| 2006/0216674 A1 * | 9/2006 | Baranov et al. | 434/29 |
| 2006/0227995 A1 | 10/2006 | Spatharis | |
| 2007/0020588 A1 | 1/2007 | Batcheller et al. | |
| 2007/0100516 A1 | 5/2007 | Olzak | |
| 2010/0092926 A1 | 4/2010 | Fabling | |
| 2010/0149329 A1 * | 6/2010 | Maguire, Jr. | 348/121 |
| 2010/0231706 A1 * | 9/2010 | Maguire, Jr. | 348/121 |
| 2012/0215505 A1 * | 8/2012 | Srivastav et al. | 703/6 |

FOREIGN PATENT DOCUMENTS

| | | |
|---|---|---|
| EP | 1053290 | 3/2003 |
| WO | WO-8503583 | 8/1985 |
| WO | WO-9104525 | 4/1991 |
| WO | WO-9104921 | 4/1991 |
| WO | WO-0160693 | 8/2001 |
| WO | WO-2004045106 | 5/2004 |
| WO | WO-2005031272 | 4/2005 |
| WO | WO-2005053524 | 6/2005 |
| WO | WO-2005053528 | 6/2005 |
| WO | WO-2007046831 | 4/2007 |

* cited by examiner

Figure Continued on Figure 6B

Figure Continued from Figure 6A

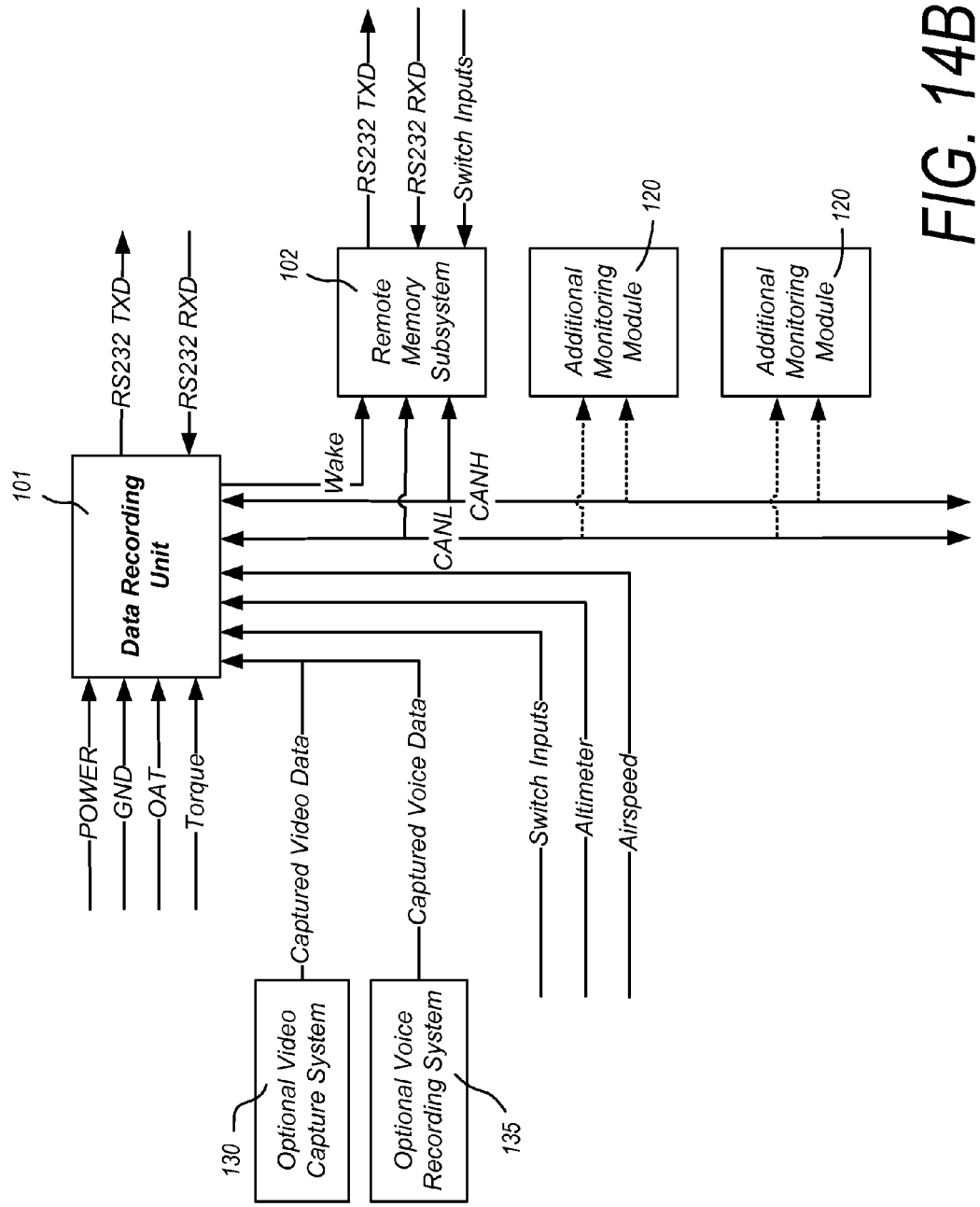

US 8,944,822 B2

SYNCHRONIZED VIDEO AND SYNTHETIC VISUALIZATION SYSTEM AND METHOD

CROSS-REFERENCE TO RELATED APPLICATIONS

This application claims priority in U.S. Provisional Patent Application No. 61/306,299 filed Feb. 19, 2010, which is incorporated herein by reference. This application is a continuation-in-part of and claims the benefit of U.S. patent application Ser. No. 12/961,612, entitled "Flight Training and Synthetic Visualization System and Method," filed Dec. 7, 2010, which is a continuation of U.S. patent application Ser. No. 11/327,965, entitled "Flight Training and Synthetic Visualization System and Method," filed Jan. 9, 2006, now U.S. Pat. No. 7,848,698, issued Dec. 7, 2010, and U.S. Provisional Patent Application No. 60/701,736, entitled, "Low-Cost Flight Training and Synthetic Visualization System," filed Jul. 22, 2005.

BACKGROUND OF THE INVENTION

1. Field of the Invention

The present invention pertains generally to a system and method for providing operator training through the synchronized playback of video recorded during a trip or performance and a visually-modeled simulation of the same trip or performance. Data and video are recorded simultaneously from an actual trip or performance. The data is modeled into a visual simulation and synchronized with the recorded video imagery recorded during the same time period.

2. Description of the Related Art

Various methodologies have been developed that provide flight training and/or analysis of prerecorded activities. One methodology provides a realistic, three-dimensional (3D) software simulation of flight in order to allow pilots to practice flight techniques without actually flying in an airplane. An example of this methodology is the software program called "Flight Simulator" by Microsoft Corporation. In this and other similar flight simulation programs, a user can complete a simulated flight and then play the simulation back to analyze their performance. Programs of this nature provide realistic simulations of flight in an artificially generated 3D environment in which aircraft behaviors are modeled quite accurately with respect to the physics of flight. However real the simulation may appear, the information produced is still only a simulation and cannot provoke the behaviors and responses of a student in a real airplane in a real life training situation whose behavior has life and death consequences. Neither can a simulation provide the sensory perception imparted to a person in flight by an actual airplane that is acted upon by external stimulations such as weather, loading, and altitude; although existing simulation programs do include weather information accurately based on particular dates and times, but this information does not impart actual sensory perception to simulation pilots.

Inventors have developed full-motion or partial-motion flight simulator systems that attempt to improve on software-only flight simulators. U.S. Pat. No. 6,634,885, issued to Hodgetts et al., describes a system that mounts a simulated aircraft flight deck onto a motion platform that is moved by electric motors to recreate the motions one would feel in an actual aircraft. This system can be coupled with and controlled by a flight simulator program such as Microsoft Flight Simulator.

As an example, U.S. Pat. No. 4,527,980, issued to Miller, describes a flight simulating video game system that uses an aircraft-shaped enclosure resting on a parabolic dish to produce pitch and roll movements based on the operator's movements of the flight controls. A monitor inside the enclosure displays simulated flight images that are oriented based on the current position of the aircraft-shaped enclosure to simulate the view through an aircraft window.

The addition of movement and tactile feedback is a distinct improvement over a software-only system for flight training, but demands a complex, bulky, and expensive electro-mechanical platform to add even the simplest motion, making it impractical for private home use.

More advanced virtual simulation systems, such as that described in U.S. Pat. No. 7,848,698, which is incorporated herein by reference, provide both modeled views of an aircraft and diagrammatic information such as a flight wall path demonstrating the path and altitude the aircraft traveled through its flight.

Typical flight simulation data involves transforming real flight data into a believable model. Graphical rendering has not yet reached the point where a 3D computer generated model can look as real as actual flight video. The more realistic a virtual simulation can be, the better it can serve as a training and teaching tool without endangering life and equipment by training in live-flight situations.

SUMMARY OF THE INVENTION

Accordingly, it is a main objective of the present invention to describe a flight training and synthetic visualization system, which comprises a fully mobile, self-contained data recording unit including a desktop graphics software engine for creating a virtual model of the flight capable of playing back the recorded trip, synchronized with a real-time video or imagery recording of the actual flight with a view from the cockpit of the aircraft as a pilot would actually view the flight. This allows for the user of the simulation to view both modeled data of the flight, as well as actual time-sequenced still images or video of the flight. The two sources of data are synched in time so that real video images of the aircraft as it is flying at a specific point in time is displayed in the simulation at the same moment as the rendered visualization of the flight.

An alternative embodiment of the present invention uses recovered synched simulation and video recorded data, along with recorded audio data from within the aircraft, to determine the source of a malfunction within an aircraft after an incident has occurred. Although high-quality simulation data of the flight is of great use when determining why an aircraft malfunctioned, real-time audio and video recording what was actually occurring in the cockpit at the time of the malfunction would be invaluable.

Heretofore there has not been an invention incorporating the elements in a manner as contained herein.

BRIEF DESCRIPTION OF THE DRAWINGS

The drawings constitute a part of this specification and include exemplary embodiments of the present invention illustrating various objects and features thereof.

FIG. 14B is a system-level block diagram of one implementation of data acquisition/storage components that may be used by the fleet operations quality management system of FIG. 14.

DETAILED DESCRIPTION

Figure 2:
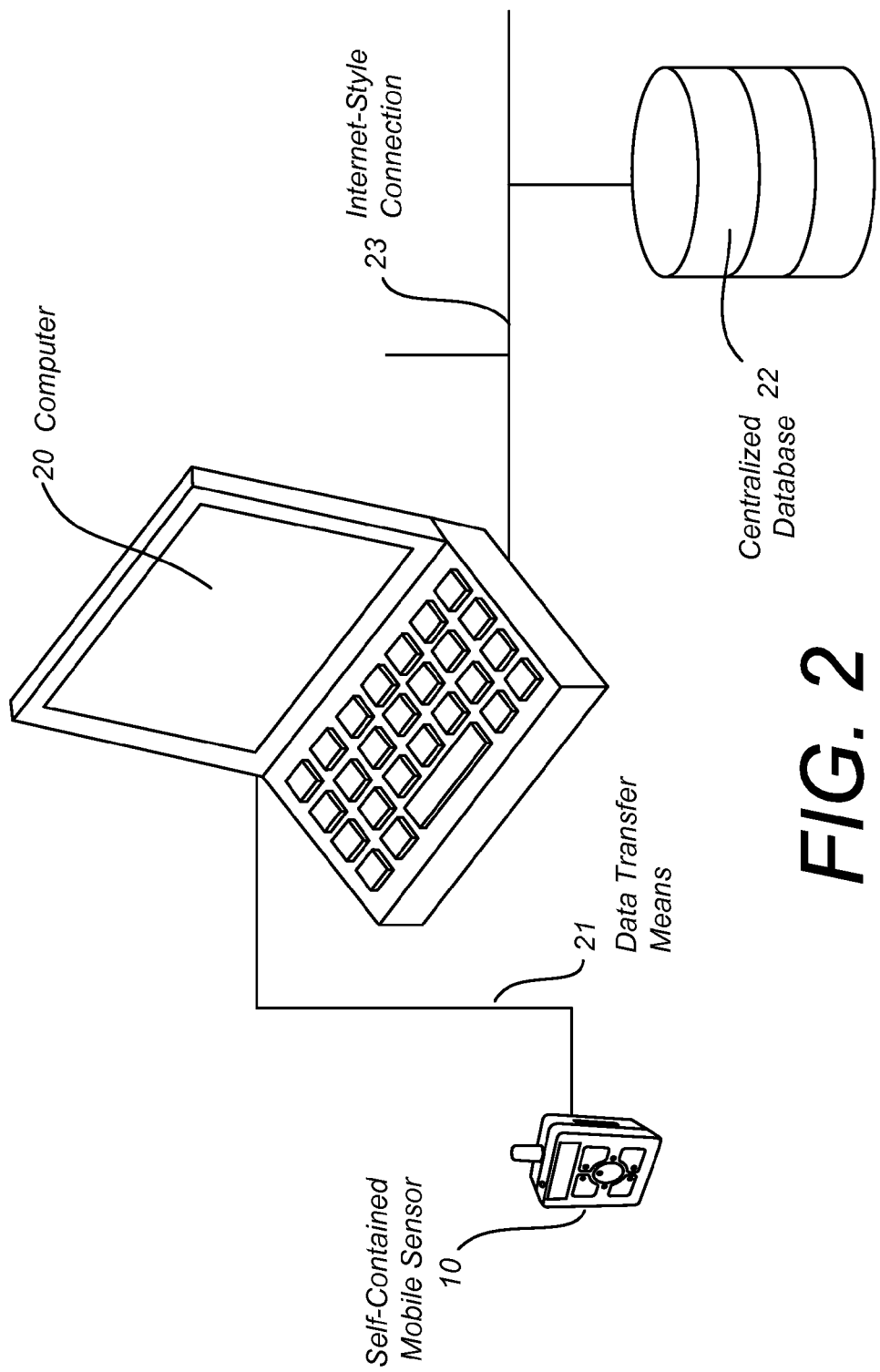
FIG. 2 shows an example embodiment of the flight training and synthetic visualization system described herein.

In the preferred embodiment, the flight training and synthetic visualization system is used primarily as a flight training aid, providing playback and analysis of flight data recorded by a mobile sensor (this embodiment is illustrated in FIG. 2). A user mounts the mobile sensor 10 in or on an aircraft or other moving object (the moving object could also be a person such as a skydiver). The mobile sensor 10 is turned on, the Record button is pressed, and recording begins. Once operational, the mobile sensor 10 follows the algorithm described in FIG. 10 (Steps 1000 through 1011), acquiring flight data describing the position and orientation of the mobile sensor 10 as it moves through three-dimensional space.

While it is recording, the mobile sensor 10 relies on a plurality of on-board sensors to obtain flight data. In the preferred embodiment (FIG. 6), the mobile sensor 10 comprises:

- a yaw accelerometer 600, a roll accelerometer 610, and a pitch accelerometer 620 to record the magnitude of acceleration of movement in three dimensions,
- a yaw gyroscope 601, a roll gyroscope 611, and a pitch gyroscope 621 to record the rate of acceleration of movement in three dimensions,
- two magnetoresistive compasses 604A and 604B to record the magnetic heading by measuring the Earth's magnetic field,
- a barometric pressure transducer 645 to measure the ambient barometric pressure,
- a wireless radio module 56B to allow the mobile sensor 10 to communicate bi-directionally and wirelessly with the computer 20 hosting the desktop application,
- a satellite receiver board 54 to allow the mobile sensor 10 to receive transmissions from the global positioning system,
- removable memory 673 as an alternate means of transferring data between the mobile sensor 10 and the computer 20 hosting the desktop application,
- permanent on-board memory 609 for storing the flight data as it is recorded,
- a rechargeable power source 52 to provide wireless power to the mobile sensor 10, and
- user feedback devices in the form of a plurality of buttons 11 and a plurality of indicator lights 51.

Using this preferred electronic architecture, the mobile sensor 10 records all movement and changes in orientation and stores this data in the on-board memory 609 for later transmission to the computer 20. In this embodiment, the mobile sensor 10 does very little processing of the data. This data is simply stored and later transferred to the computer 20 where the desktop application will perform post-processing of the data before playback.

Figure 1:
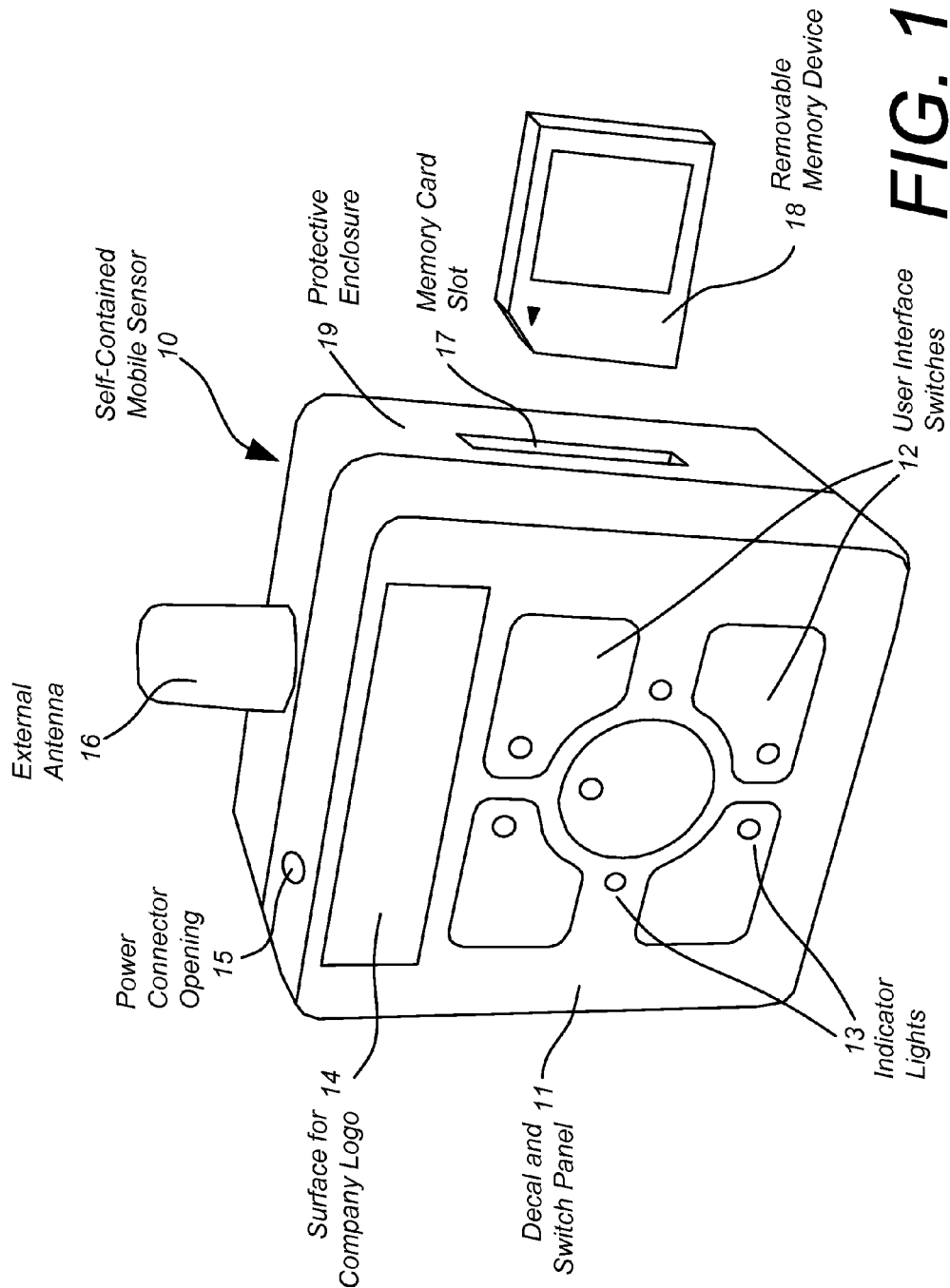
FIG. 1 shows a perspective view of a small, self-contained mobile sensor, which is one component of a flight training and synthetic visualization system described herein.

FIG. 1 shows a perspective view of a small, self-contained mobile sensor 10, which is one component of a flight training and synthetic visualization system described herein. The mobile sensor is contained in an enclosure 19, which provides environmental protection for the electronics which comprise the mobile sensor. A decal and switch panel 11 is adhered to the front surface of the enclosure 19, and provides a plurality of user interface switches 12, a plurality of indicator lights 13, and a surface 14 for a company logo or other printed matter. The mobile sensor contains a power connector opening 15 which accepts a jack from a recharging system. An external antenna 16 extends from the top of the mobile sensor for improved reception of satellite signals. An optional memory card slot 17 is provided for the use of removable memory devices such as a memory card 18.

FIG. 2 shows an example embodiment of the flight training and synthetic visualization system described herein. A mobile sensor 10 is mounted on an aircraft or other moving body and used to collect data about the movement of that body through space. This data may then be transferred by a transfer means 21 in real-time or asynchronously at a later time to a computer 20. The transfer means 21 may comprise a direct-wired connection, a wireless connection, or the transfer of data via a removable memory device. Software on the computer 20 is used to process and replay the data for the operator. The computer 20 can augment the playback of the data collected by the mobile sensor 10 by downloading satellite images and other information from a centralized database 22 over an internet-style connection 23. In this embodiment, the primary purpose of the flight training and synthetic visualization system is the playback and post-analysis of recorded flight data.

Figure 3:
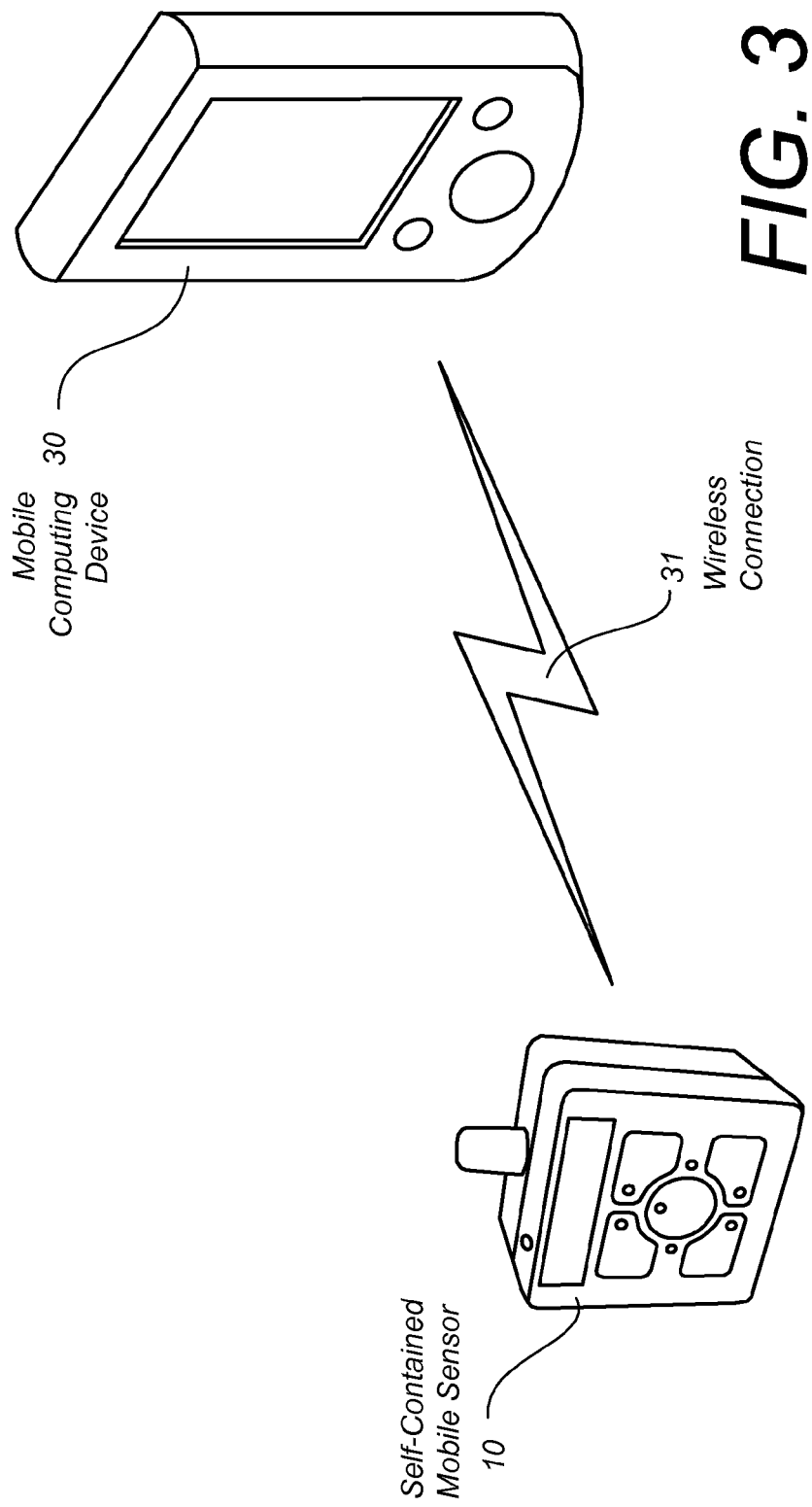
FIG. 3 shows an alternative embodiment of the flight training and synthetic visualization system described herein.

FIG. 3 shows an alternative embodiment of the flight training and synthetic visualization system described herein. A mobile sensor 10 is mounted on an aircraft or other moving body and used to collect data about the movement of that body through space. This data is then transferred in real-time over a wireless connection 31 to a handheld computer or other mobile computing device 30 for immediate viewing by the operator. In this embodiment, the primary purpose of the flight training and synthetic visualization system is to provide real-time, immediate feedback to the operator or instructor on an ongoing flight or trip.

Figure 4:
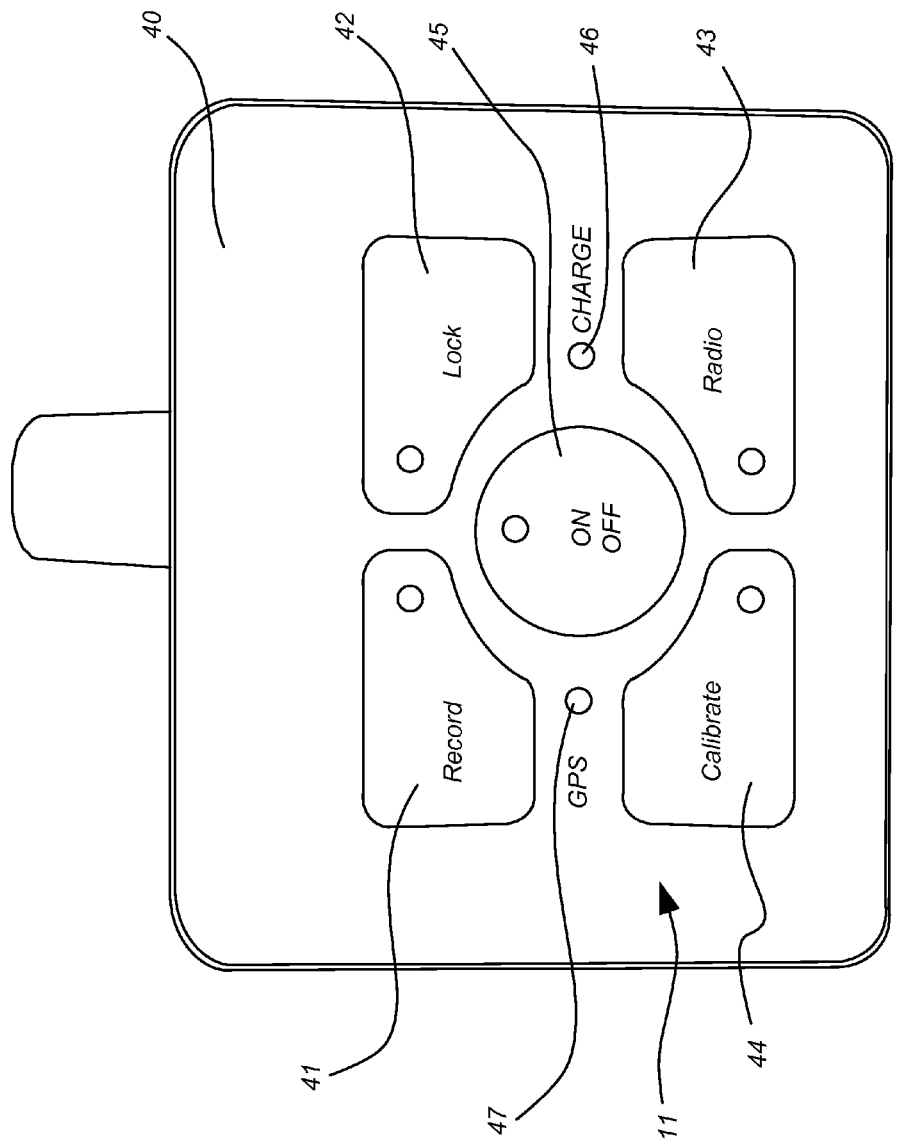
FIG. 4 shows an example embodiment of the decal and switch panel for the mobile sensor.

FIG. 4 shows an example embodiment of the decal and switch panel 11 for the mobile sensor 10. It is not the intent of this figure to limit the decal and switch panel functions to those shown, but rather to show one possible embodiment of the user interface for illustration purposes. In this embodiment, the decal and switch panel 11 comprises a Record button and indicator light 41 for starting and stopping the data record function, a Lock button and indicator light 42 for locking the keypad against inadvertent key presses, a Radio button and indicator light 43 for initiating wireless data transfers, a Calibrate button and indicator light 44 for calibrating the mobile sensor 10, and an on/off button and indicator light 45 for turning the mobile sensor 10 on and off. The decal and switch panel 11 further comprises a Charge indicator light 46 for indicating battery charge, a GPS indicator light 47 for indicating satellite connection, and a company logo 40.

Figure 5:
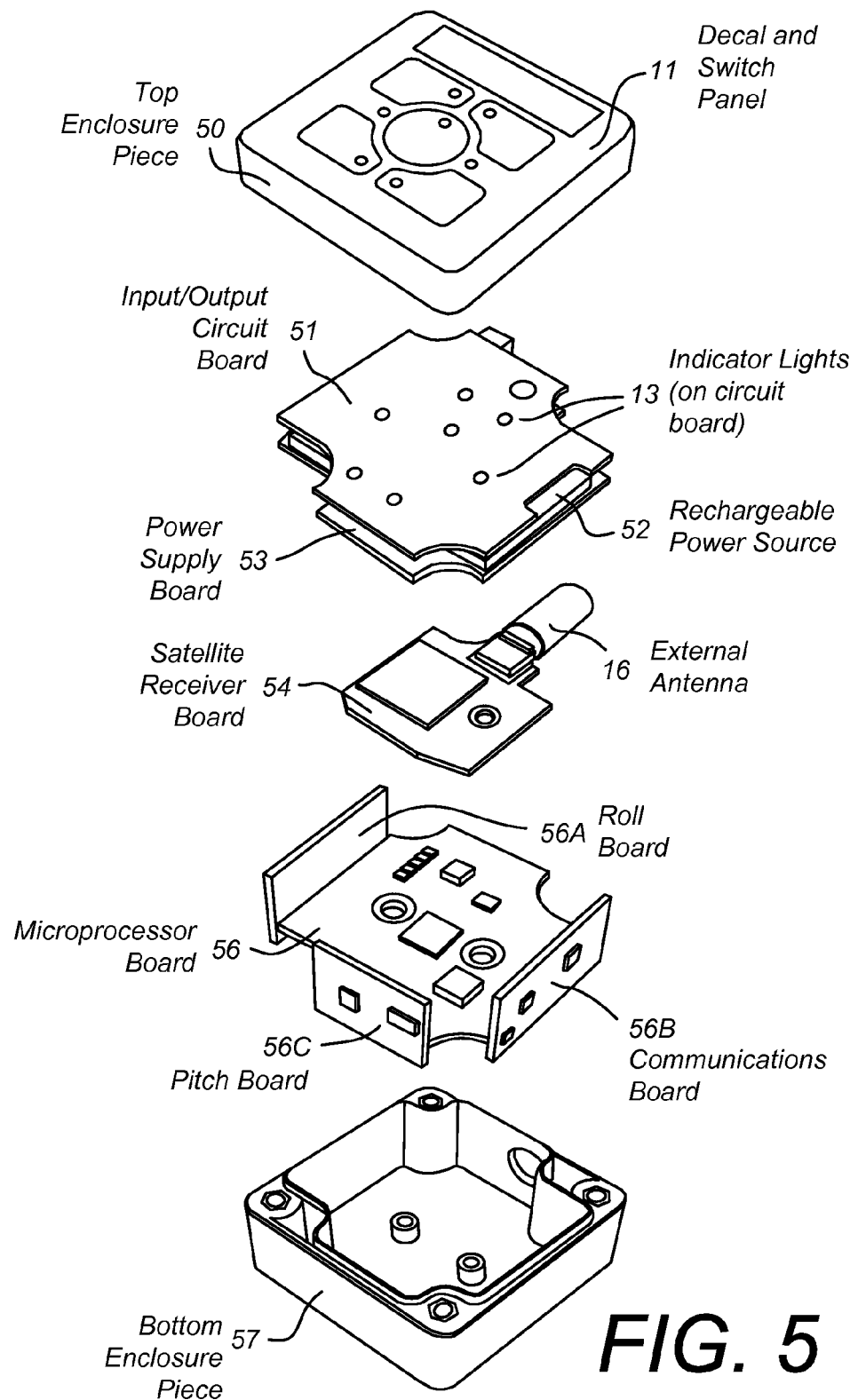
FIG. 5 shows an exploded perspective view of the mobile sensor, highlighting the main components.

FIG. 5 shows an exploded perspective view of the mobile sensor, highlighting the main components. A top enclosure piece 50 provides a surface for the decal and switch panel 11 and serves as the top half of a protective enclosure surrounding the electronics. An input/output (I/O) circuit board 51 comprises circuitry for detecting operator button presses from user interface switches 12 and houses the indicator lights 13. A power supply board 53 comprises circuitry for providing power to the electronics in the box and regulating any external power source that is supplied to the mobile sensor during charging. Sandwiched between the I/O board 51 and the power supply board 53 is a rechargeable power source 52 such as a battery. A satellite receiver board 54 comprises circuitry for receiving signals from satellite navigation systems such as the global positioning system (GPS). The satellite receiver board 54 also comprises an antenna means 16 to provide for the reception of satellite signals. A microprocessor board 56 comprises a microprocessor and related circuitry for overall control of the mobile sensor electronics. The microprocessor board 56 also comprises circuitry that allows the mobile sensor to sense rotation about its yaw axis. Attached to the microprocessor board 56 is the roll board 56A, which allows the mobile sensor to sense rotation about its roll axis, the pitch board 56C, which allows the mobile sensor to sense rotation about its pitch axis, and the communications board 56B, which comprises the circuitry necessary to allow the mobile sensor to communicate with a computer. The roll board 56A and the pitch board 56C are mounted perpendicular to each other and to the microprocessor board 56 in order to enable the mobile sensor to sense angular speed and rotation in each of three separate planes. A bottom enclosure piece 57 serves as the bottom half of the protective enclosure surrounding the electronics.

Figure 6A:
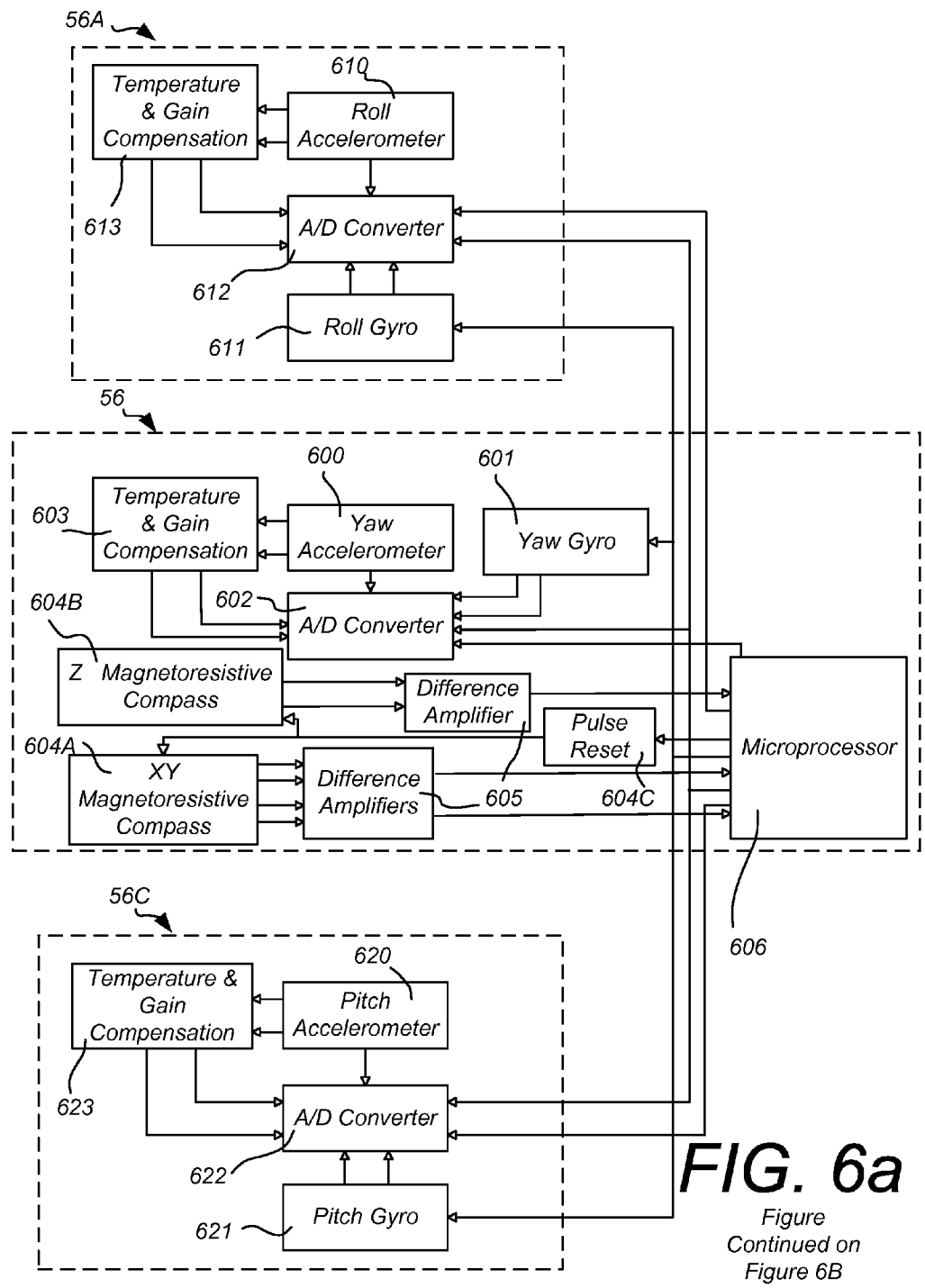
FIG. 6 shows a block diagram of the preferred embodiment of the electronic architecture for the mobile sensor.
Figure 6B:
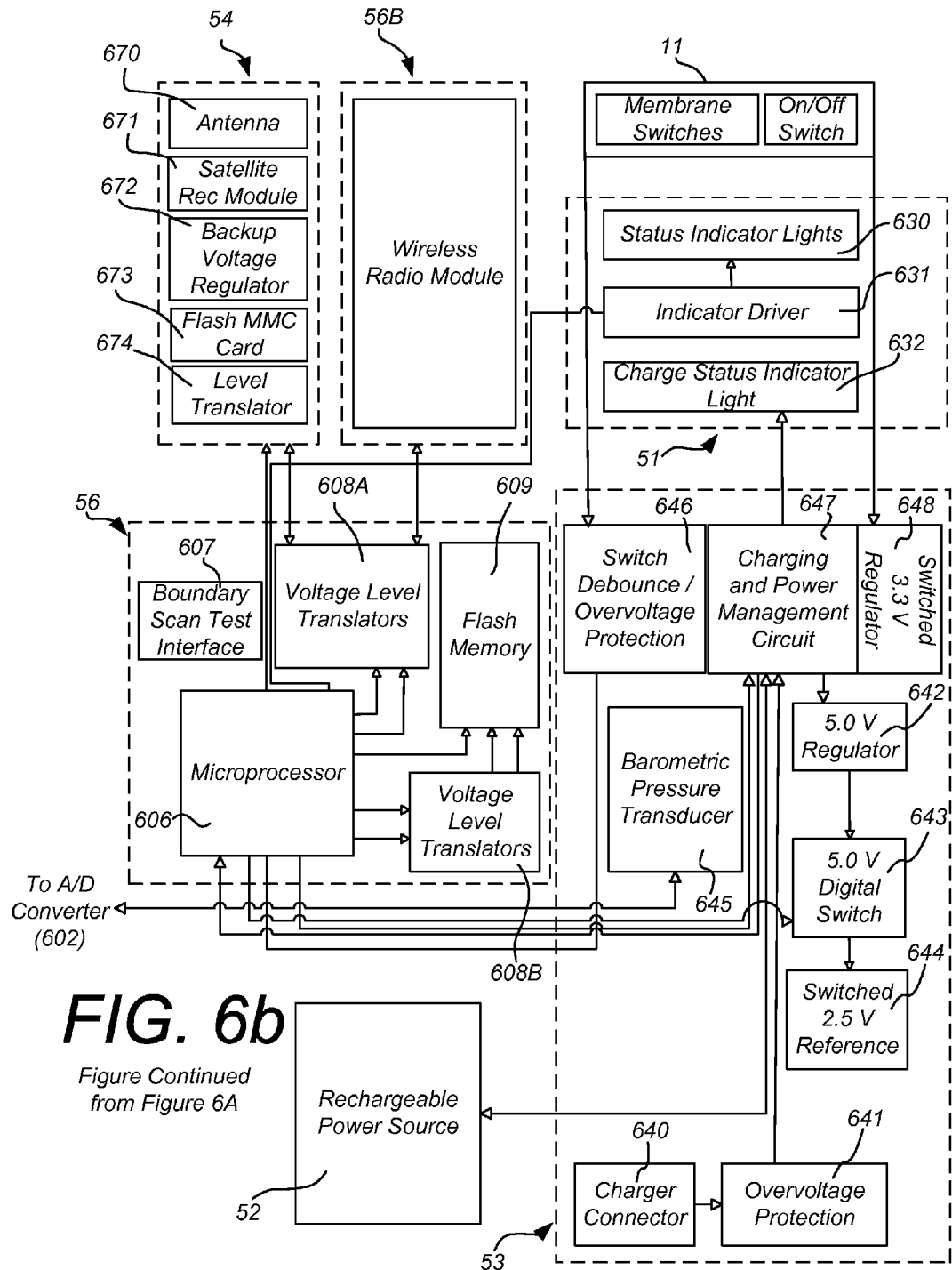

FIG. 6 shows a block diagram of the preferred embodiment of the electronic architecture for the mobile sensor 10. At the highest level, the mobile sensor 10 comprises a microprocessor board 56, a roll board 56A, a pitch board 56C, a communications board 56B, a satellite receiver board 54, an input/output board 51, a rechargeable power source 52, a power supply board 53, and a decal and switch panel 11. These functional blocks are described in additional detail in the following paragraphs.

The microprocessor board 56 includes a yaw accelerometer 600 for sensing the magnitude of acceleration of the mobile sensor 10 about its yaw axis, and a yaw gyroscope 601 for sensing the rate of rotation of the mobile sensor 10 about its yaw axis.

The signal output by the yaw accelerometer 600 is sensitive to changes in ambient temperature. Temperature and gain compensation are provided by block 603 to correct this signal in various temperature conditions and to apply a gain multiplier to increase the amount of useful resolution available from the yaw signal. An analog-to-digital (A/D) converter 602 converts the analog yaw accelerometer 600 signal to a digital signal that can be used by the microprocessor 606. The A/D converter 602 also converts the analog yaw gyroscope 601 signal to a digital signal that can be used by the microprocessor 606.

The microprocessor board 56 further includes an XY magnetoresistive compass 604A for measuring the Earth's magnetic field in both the X and Y planes of movement, and a Z magnetoresistive compass 604B for measuring the magnetic field in the Z plane.

The magnetoresistive compasses 604A and 604B each contain an element which senses its orientation relative to the earth's magnetic field and which produces a differential voltage output based on its orientation in the magnetic field. These differential voltage outputs are sent to difference amplifiers 605, which amplify the outputs to useful voltage levels. The amplified output voltages are then sent to the A/D converter 602, which converts the analog signals from 604A and 604B to digital signals that can be used by the microprocessor 606. A pulse reset feature 604C sends a current pulse to the magnetoresistive compasses 604A and 604B periodically to remove any magnetic disturbances which may have built up on the sensing elements.

A boundary scan test interface circuit 607 such as JTAG is provided as a means of programming the microprocessor 606 and as a means of accessing and testing various unit features.

A storage device 609 such as a NAND flash memory module or a removable memory card is used to store the data collected by the microprocessor 606 until the data can be downloaded to a separate system. A voltage level translator 608B converts the voltage levels output by the storage device 609 into levels which can be used by the microprocessor 606, and vice versa. A second voltage level translator 608A is used to convert voltage levels between the microprocessor 606 and the satellite receiver board 54 and the wireless radio board 56B.

The roll board 56A includes a roll accelerometer 610 for sensing the magnitude of acceleration of the mobile sensor 10 about its roll axis, and a roll gyroscope 611 for sensing the rate of acceleration of the mobile sensor 10 about its roll axis.

Temperature and gain compensation is provided for the roll accelerometer 610 by block 613. An analog-to-digital (A/D) converter 612 converts the analog roll accelerometer 610 signal to a digital signal that can be used by the microprocessor 606. The A/D converter 612 also converts the analog roll gyroscope 611 signal to a digital signal.

The pitch board 56 includes a pitch accelerometer 620 for sensing the magnitude of acceleration of the mobile sensor 10 about its pitch axis, and a pitch gyroscope 621 for sensing the rate of acceleration of the mobile sensor 10 about its pitch axis.

Temperature and gain compensation is provided for the pitch accelerometer 620 by block 623. An analog-to-digital (A/D) converter 622 converts the analog pitch accelerometer 620 signal to a digital signal that can be used by the microprocessor 606. The A/D converter 622 also converts the analog pitch gyroscope 621 signal to a digital signal.

It should be noted that the terms roll, yaw, and pitch are used throughout this specification as a means of distinguishing each of the three axes about which the unit can move, and is not intended to imply that the roll accelerometer 610 is capable of only measuring rotation about an object's roll axis, and so on. Depending on how the mobile sensor 10 is mounted or held during a trip, the roll accelerometer 610 may actually be measuring the magnitude of acceleration on the object's pitch or yaw axes. This is also true for the yaw accelerometer 600, the pitch accelerometer 620, the roll gyroscope 611, the yaw gyroscope 601, and the pitch gyroscope 621.

The power board 53 includes a charger connector 640 for interfacing to an external power source such as a wall charger. This charger connector 640 is isolated from causing damage to the power board 53 by an overload protection circuit 641. The power board 53 includes a plurality of voltage regulators and references 642, 643, 644, and 648 for supplying power to the various circuit functions on the mobile sensor 10. A charging and power management circuit 647 is provided to oversee the charging of the rechargeable power source 52 and to selectively disable mobile sensor 10 functions in order to prolong battery life. A switch debounce and overvoltage protection circuit 646 is provided to prevent noisy user input lines from causing inadvertent feature activations. Finally, a barometric pressure transducer 645 is provided to detect changes in ambient barometric pressure, allowing the mobile sensor 10 to calculate changes in altitude.

A decal and switch panel 11 and indicator lights 51 are provided for interfacing with the operator. The indicator lights 51 include status indicator lights 630, an indicator driver circuit 631, and a separate charge status indicator light 632 that is tied directly to the charging and power management circuit 647 on the power board 53 to indicate the charge status of the rechargeable power source 52.

A wireless radio module 56B provides a mechanism for downloading the data stored in the storage device 609 to an external system via a wireless data connection. Alternate embodiments of the mobile sensor 10 may also use a direct-wired connection such as RS-232 or a removable memory device 673 to transfer data.

The satellite receiver board 54 includes an antenna 670 to increase reception, a satellite receiver module 671, a backup voltage regulator 672, a removable memory module 673 such as a Flash Multi-Media Card (MMC) or a Secure Digital (SD) card, and a voltage level translator 674 that allows the features on the satellite receiver board 54 to interface to the microprocessor 606.

Figure 7:
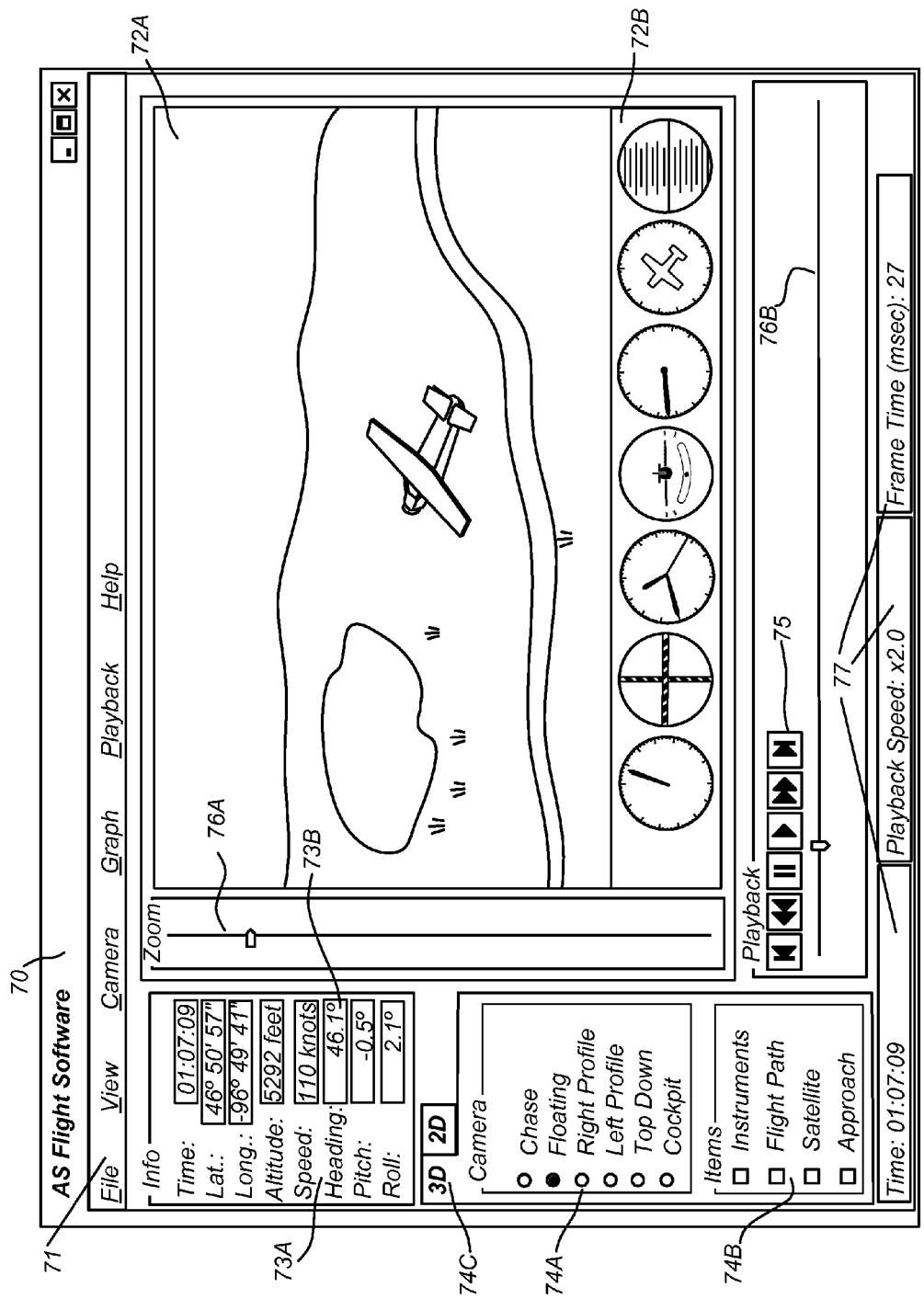
FIG. 7 shows an example of a representative graphical user interface (GUI) for a flight analysis application that executes on a separate desktop or handheld computer.

FIG. 7 shows an example of a representative graphical user interface (GUI) for a flight analysis application that executes on a separate desktop or handheld computer. This flight analysis application processes the data captured by the mobile sensor 10, performs any correctional adjustments required to the data, creates a three-dimensional representation of the motion of the sensor corresponding to the data, and displays the recreated event on the computer monitor. The features described herein are examples only and are not meant to limit the functionality in any manner. The main window 70 is a typical graphical user interface (GUI) window. A set of pull-down menus 71 provides a list of typical commands and command types. A synthetic vision window 72A is dedicated to displaying the recreated playback on a synthetic three-dimensional environment, which may include actual satellite or high-altitude photos of the environment where the data was recorded. A simulated gauge panel 72B provides a functioning set of simulated aircraft gauges and instruments. A portion of the screen is dedicated to the display of specific data parameters, including the parameter labels 73A and text boxes 73B containing the numeric values associated with these parameters. Another portion of the screen is dedicated to providing alternate views of the playback to the operator, including button controls featuring default "camera angles" 74A, button controls used to toggle display items 74B on and off, and a tab control device 74C for selecting between three-dimensional (3D) viewing of the data and two-dimensional (2D) viewing of the data. VCR-style controls 75 (such as forward, reverse, play, and pause) are provided to allow the operator to move backward and forward through the playback at will, and a progress indicator bar 76B is provided to indicate the current position in the playback, as well as to act as a slider control for moving to any point in the playback. A vertical zoom slider bar 76A is provided to move the "camera" in to and out from the aircraft during the playback. Additional data displays 77 provide information to the user, such as current playback speed, a time readout for the current playback, and the number of graphics frames per second being displayed.

Figure 8:
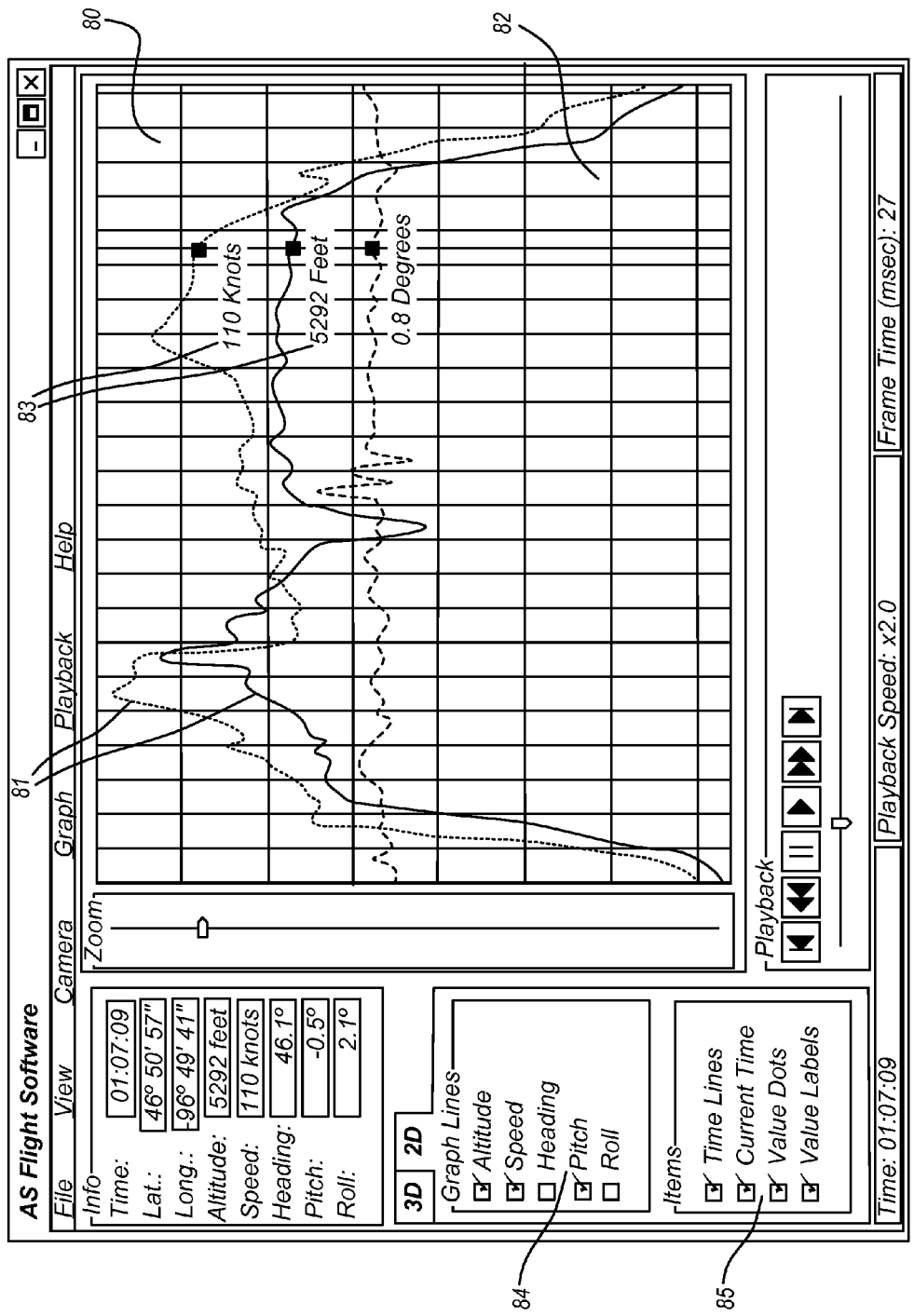
FIG. 8 shows the same example graphical user interface (GUI) as shown in FIG. 7 with changes to represent how the flight analysis application might appear when the data is displayed in two-dimensional mode, or graph mode.

FIG. 8 shows the same example graphical user interface (GUI) as shown in FIG. 7 with changes to represent how the flight analysis application might appear when the data is displayed in two-dimensional mode, or graph mode. Only the features that have changed from FIG. 7 have been numbered in FIG. 8, and all other features should be considered identical to FIG. 7. Again, the features described herein are examples only and are not meant to limit the functionality in any manner.

A graph window 80 is displayed with a grid pattern 82 representing units of playback time and data value magnitude. Graphical plots 81 of several different flight parameters are plotted against the grid pattern 82, corresponding to actual data values seen during the recorded event. Parameter labels 83 are provided to show the actual numeric value at the current point in the playback. Graph line controls 84 appear in two-dimensional mode to allow the user to select which plot lines appear on the graph window 80. Graph item controls 85 appear to allow the user to toggle the display of certain graph items on or off.

Figure 9:
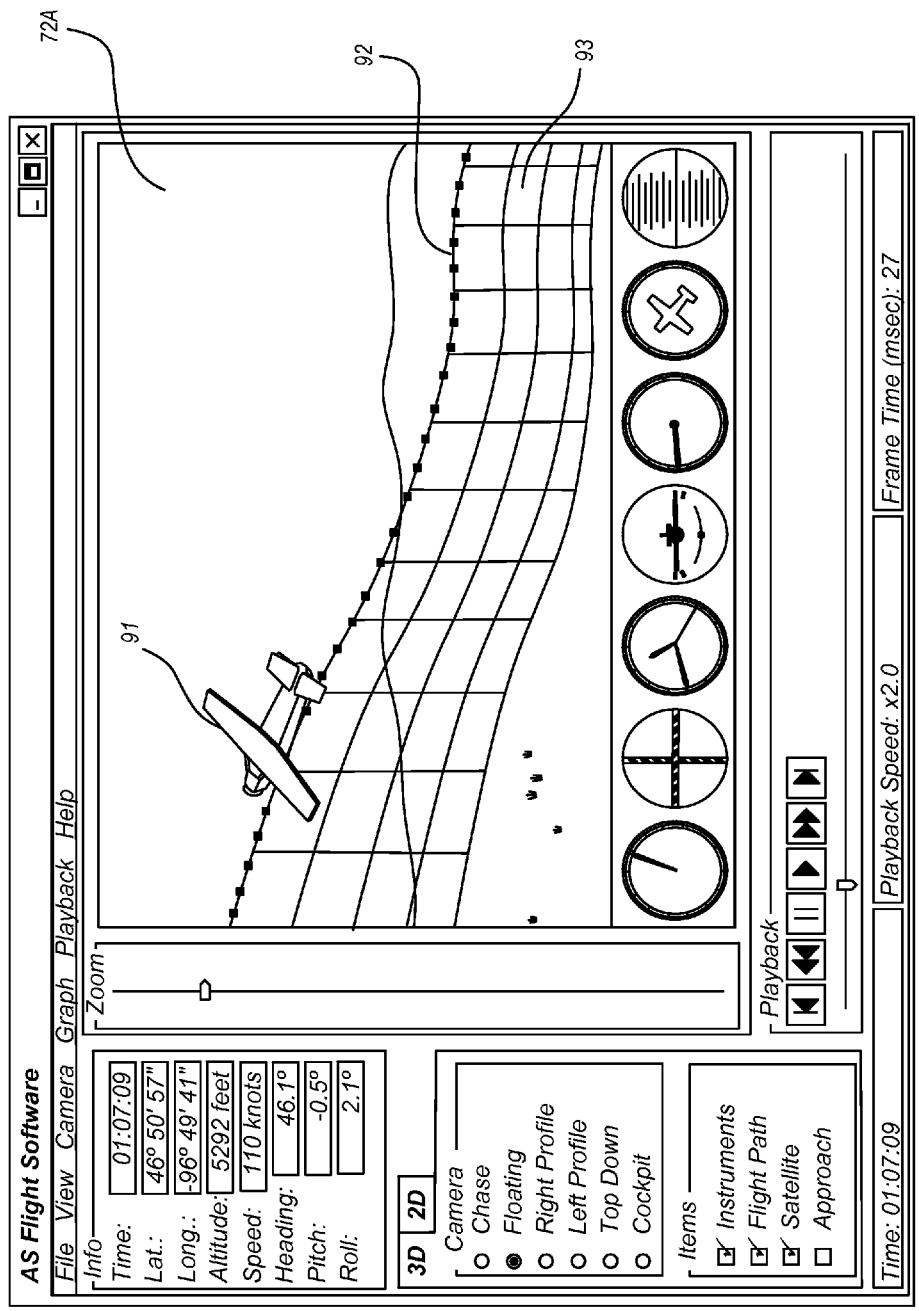
FIG. 9 shows the same example graphical user interface (GUI) as shown in FIGS. 7 and 8, with changes to represent additional graphical features available during the three-dimensional (3D) playback.

FIG. 9 shows the same example graphical user interface (GUI) as shown in FIG. 7 and FIG. 8 with changes to represent additional graphical features available during the three-dimensional (3D) playback. The synthetic vision window 72A again shows a playback of a recorded flight on a three-dimensional recreation of the environment in which the data was recorded. A model of the aircraft 91 is displayed at a position and orientation corresponding to the position and orientation of the actual aircraft. A data ribbon 92 extends behind and in front of the aircraft showing the recorded flight path. A checkerboard altitude wall 93 provides a graphical representation of the altitude of the aircraft, where each square of the checkerboard pattern represents a pre-defined number of feet of both horizontal and vertical distance.

Figure 10A:
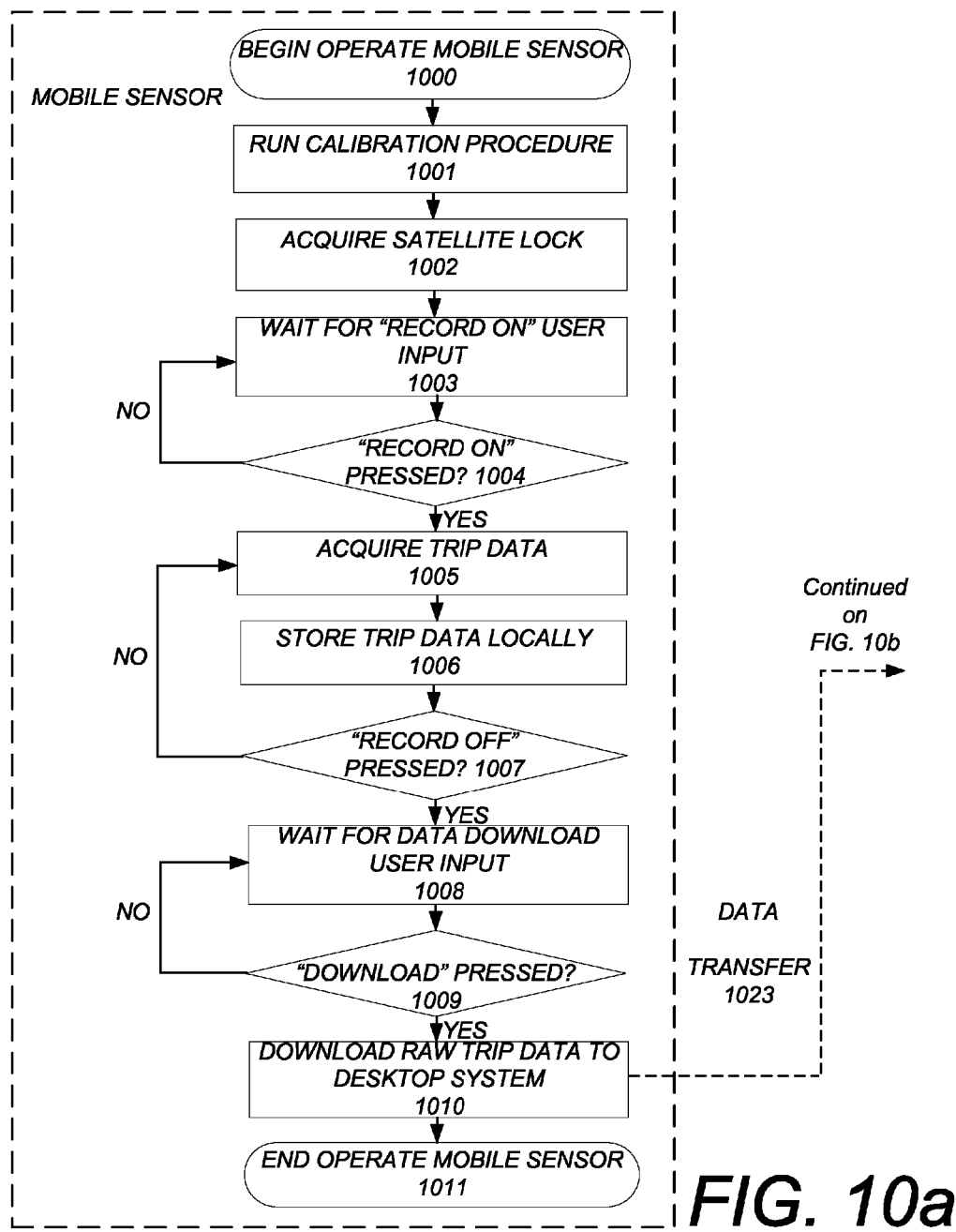
FIG. 10 is a high-level flowchart showing the flow of control required on the mobile sensor, the desktop application running on the desktop computer or the handheld computing device, and the centralized server during a typical record and playback cycle.
Figure 10B:
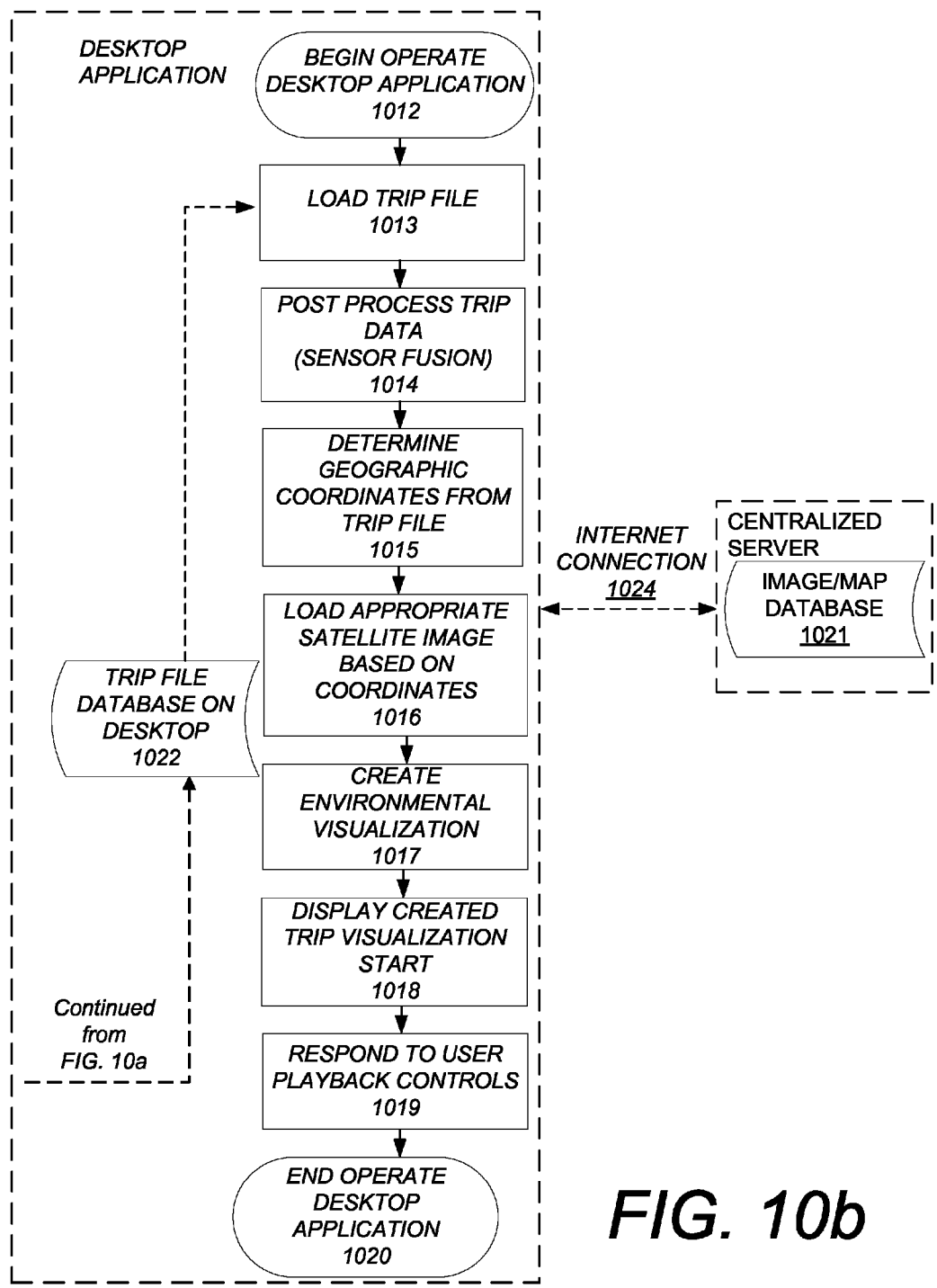

FIG. 10 is a high-level flowchart showing the flow of control required on the mobile sensor 10, the desktop application running on the desktop computer 20 or the handheld computing device 30, and the centralized server 22 during a typical record and playback cycle. Processing starts in "Begin Operate Mobile Sensor" 1000, which represents the operator turning the mobile sensor 10 on. A calibration procedure 1001 is typically required to initialize the mobile sensor 10 to a known state. The mobile sensor 10 must then acquire a signal lock on the GPS satellite 1002 in order to begin recording satellite data. Once satellite lock 1002 is obtained, the mobile sensor 10 must wait for the user to press the record button 1003 and 1004, after which it begins to acquire data 1005 via the on-board sensors. This data is stored locally in the on-board memory 1006 until the operator presses the Record button a second time to turn off the record function 1007. After the record function is terminated 1007, the mobile sensor 10 waits until a data download is commanded 1008 and 1009, and then downloads the data to the desktop system 1010 via a data transfer means 1023, which may include a direct-wired connection, a wireless connection, or data transfer by means of a removable memory device, thereby ending the "acquire data" operation of the mobile sensor 1011. The downloaded data is stored on the desktop application in a trip file database 1022.

Processing for the desktop application begins in "Begin Operate Desktop Application" 1012, representing the operator executing the desktop application. The desktop application loads the trip file 1013 from the trip file database 1022 and begins post-processing the data 1014, depending on stored readings from multiple sensor functions integral to the mobile sensor to create a highly accurate trip data file. Based on the geographic coordinates stored in the data file 1015, the desktop application then downloads one or more satellite or high-altitude images corresponding to the data file 1016 from an external image/map database on a centralized server 1021 or over an internet connection 1024. The desktop application then creates a synthetic representation of the environment 1017, displays the created trip visualization on the monitor 1018, and then responds to operator inputs via the playback controls and application commands 1019. The process terminates with "End Operate Desktop Application" 1020, which represents the operator terminating the desktop session and exiting the software.

Figure 11:
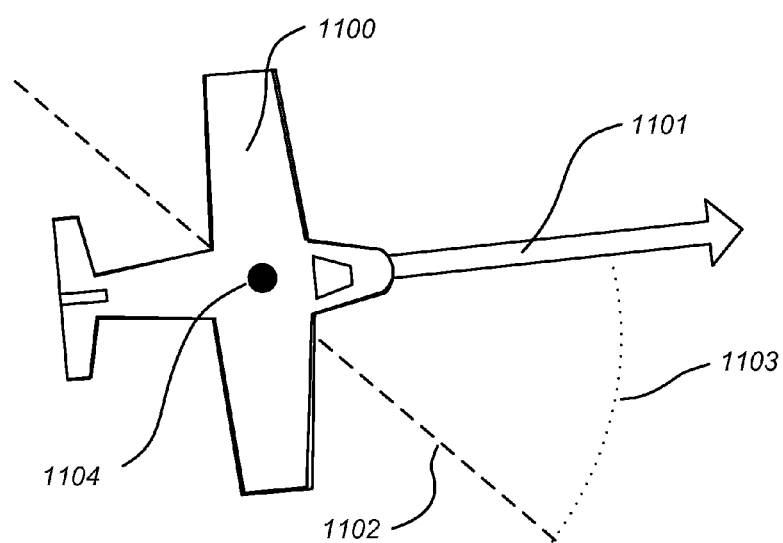
FIG. 11 provides a definition of the term yaw, and shows a top view of a moving body such as an aircraft.
Figure 12:
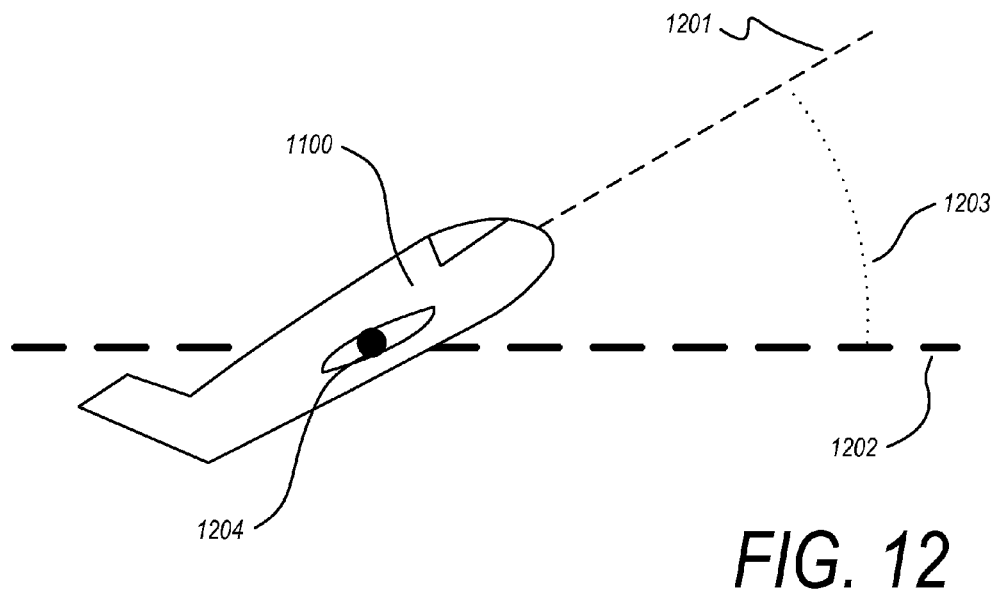
FIG. 12 provides a definition of the term pitch, and shows a side view of a moving body such as an aircraft.
Figure 13:
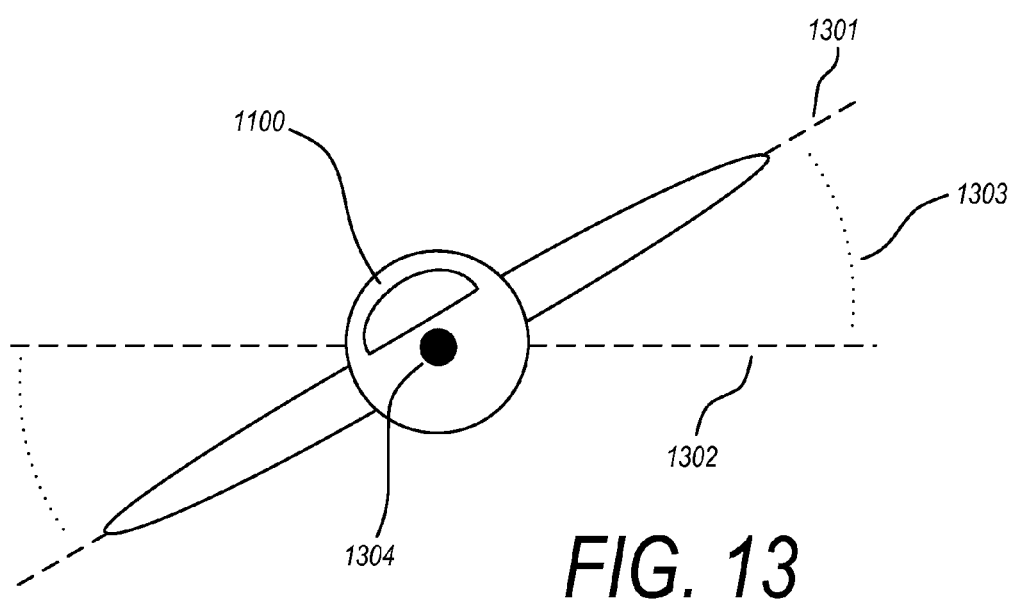
FIG. 13 provides a definition of the term roll, and shows a front view of a moving body such as an aircraft.

FIGS. 11, 12, and 13 provide definitions of the terms yaw, pitch, and roll, respectively, and are not otherwise referenced in the text of this specification. These terms are used throughout the specification and it is important that they are fully understood in this context.

FIG. 11 provides a definition of the term yaw, and shows a top view of a moving body 1100 such as an aircraft. The yaw angle 1103 is the number of degrees measured between the course 1102 of the moving body 1100 and the heading 1101 of the moving body 1100. The course 1102 of an object is defined to be the actual direction of movement of that object, and the heading 1101 is defined to be the direction that the object is facing. The yaw axis 1104 is the point about which the moving body 1100 rotates when demonstrating a change in yaw.

FIG. 12 provides a definition of the term pitch, and shows a side view of a moving body 1100 such as an aircraft. The pitch angle 1203 is the number of degrees measured between the "level" orientation of flight 1202 for the moving body 1100 and current orientation 1201 of the moving body 1100, as the moving body 1100 rotates about the pitch axis 1204.

FIG. 13 provides a definition of the term roll, and shows a front view of a moving body 1100 such as an aircraft. The roll angle 1303 is the number of degrees measured between the "level" orientation of flight 1302 for the moving body 1100 and current orientation 1301 of the moving body 1100, as the moving body 1100 rotates about the roll axis 1304.

Alternate embodiments of the mobile sensor 10 can be created with a smaller number of on-board sensors. While this would lower the accuracy of the data obtained, this approach would produce data that would be sufficient for many applications that do not require sophisticated or highly accurate monitoring of movement (such as the tracking of land-based vehicles) and would result in a lower cost sensor.

Additional alternate embodiments of the mobile sensor 10 could be created by adding additional sensors or additional data inputs via the optional radio to the preferred embodiment. In this manner information such as engine performance characteristics, waypoints, etc., could be added to the stored data set for later retrieval. These additional inputs could be added based on the specific needs of any application.

Once the mobile sensor 10 has finished recording a flight or trip, the operator can terminate the recording process. The mobile sensor 10 can then be turned off or set up to record another flight. Data already recorded will be maintained indefinitely in the on-board memory 609 or in the optional removable memory 673, until such time as the data can be downloaded to the computer 20 hosting the desktop application.

When all flights or trips have been recorded, the user can transfer the data from the mobile sensor 10 to the computer 20 using either the wireless or hardwired communication link 21, or, if so equipped, by taking the removable memory device 673 out of the mobile sensor 10 and bringing it by hand to the computer 20. In any event, the data is transferred to the computer 20 and stored in a trip database 1022.

Additional alternate embodiments of the mobile sensor 10 could also be created by using combinations of different memory devices and data transfer means. Versions of the mobile sensor 10 could contain permanent on-board flash memory 609, a removable memory device such as an MMC card 673, or both. The mobile sensor 10 could also have no on-board memory means and simply transfer the data immediately to an external device, such as the desktop computer 20.

Upon request by the user, the desktop application running on the computer 20 will load the trip data file 1013 and begin post-processing the data 1014. This post-processing consists of analyzing the values gathered by multiple, redundant sensors (as described in FIG. 6) and comparing and combining the values to achieve a data accuracy that would not be attainable by any single sensor alone. For example, if there is a gap in the GPS data received by the mobile sensor 10 (perhaps when the satellite data is unavailable for a period of time), the movements recorded by the accelerometers (600, 610, and 620) and gyroscopes (601, 611, and 621) can be used to fill in the gaps. In addition, changes in barometric pressure detected by the barometric pressure transducer 645 can be used by the mobile sensor 10 to calculate changes in altitude, which can supplement or replace the altitude derived from GPS data and inertial measurement sensors.

By transferring this processing activity from the mobile sensor 10 to the desktop computer 20, the system can take advantage of the processing power inherent in a typical desktop computer and off-load the processing burden from the mobile sensor 10 thus reducing the cost and complexity of the mobile sensor 10.

Once the post-processing 1014 has been completed, the desktop application uses the geographic coordinates stored in the data file 1022 to calculate the area of the Earth's surface for which a satellite or aerial image is required. It then interfaces to an image/map database 1021 on a centralized server over an internet-style connection 1024 and downloads a satellite or aerial photo (or series of photo tiles) that corresponds to the geographic location 1016 and creates a realistic, three-dimensional graphic visualization 1017 of the aircraft (or moving object) and its immediate environment. The desktop application then responds to user inputs 1019 allowing the user to play back the trip visualization as one would play a movie on a DVD player.

A typical embodiment of the user interface for the desktop application is shown in FIGS. 7, 8, and 9. A typical embodiment of the desktop application would provide an area on the screen for the three-dimensional playback 72A as well as simulated flight instruments 72B, an area of text boxes 73A and 73B showing dynamic readouts of important flight parameters, operator controls 74A, 74B, and 74C to allow the operator to control the angle at which the playback is shown, and DVD-style playback controls 75. In addition, data sets recorded by multiple mobile sensors, such as those used by a team of skydivers, could be superimposed on the same three-dimensional playback 72A to allow for performance comparisons. Airport-specific data, such as approach plates and glideslope and localizer paths, can be superimposed on the flight playback to allow a pilot to see how they performed during a landing. Graphical devices can be used to show the status of certain flight parameters. For instance, a three-dimensional graph of an airplane's altitude can be shown in the form of a checkerboard wall 93 that is displayed between the ground and the model of the aircraft 91 in the playback, where each square on the checkerboard represents a certain number of feet in altitude or horizontal distance. A secondary ghost image of the aircraft model 91 could be displayed on the three-dimensional playback 72A to show variance from an ideal flight path such as the approach path of an airport. Visualizations of special airspace types, such as restricted flight zones or aerobatic performance boxes, could be superimposed on the three-dimensional playback 72A. Simulated weather patterns can be created to match actual weather conditions that existed at the time of the flight.

The desktop application can also be used to display data on the flight in two-dimensional graph mode 80. In two-dimensional graph mode 80, plot lines of the flight parameters 81 and current value labels 83 are displayed on a graph-like grid pattern 82 to allow for the analysis of the flight.

In an alternate embodiment of the flight training and synthetic visualization system (FIG. 3), the mobile sensor 10 is used to gather flight data that is displayed in real-time (while the trip is ongoing) on a portable laptop or handheld computing device 30. In this embodiment, the system would be used primarily as a visual flight aid to provide additional flight data and analysis to a pilot while the flight is in progress.

The handheld device 30 would be co-located with the mobile sensor 10 and would transfer data in real-time over a wireless data connection 31. The application running on the handheld device 30 would be similar to the application running on the desktop computer 20, but in most cases would not have a connection to a centralized database. A realistic graphical depiction of the flight in progress would be displayed on the handheld device 30, allowing the pilot to view their ongoing flight from any angle and to display analytical information during the flight. Satellite images could be pre-loaded to the handheld device 30 by the user before the flight, or a grid or similar artificial background could be used for the real-time playback.

1. Fleet Operations Embodiment

Figure 14:
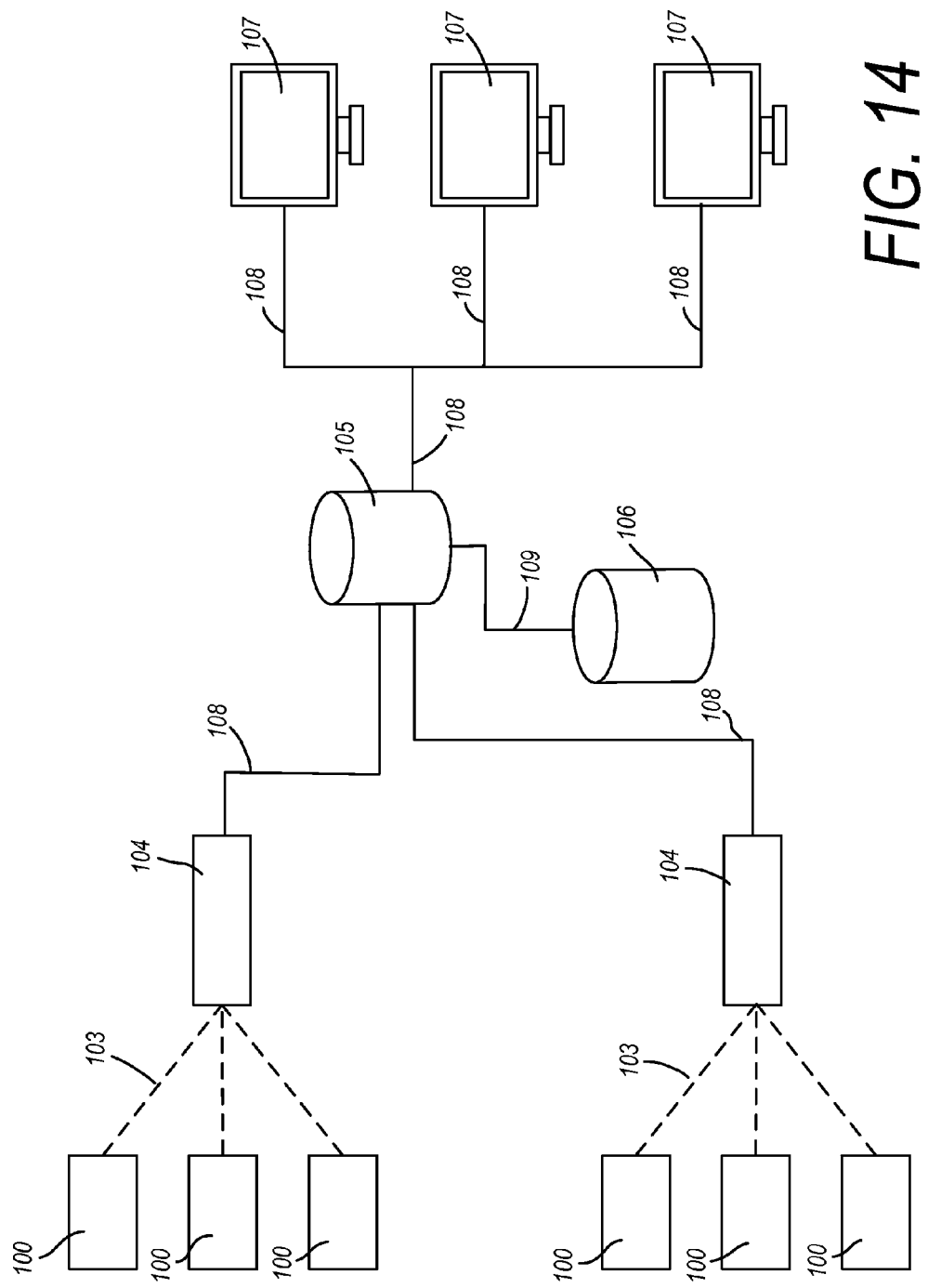
FIG. 14 is a system-level schematic of one implementation of a fleet operations quality management system.

FIG. 14 shows one implementation of a fleet operations quality management system. Data is captured from multiple instances of moving bodies 100 (e.g., trucks, automobiles, aircraft (e.g., airplanes, gliders), watercraft (e.g., boats), unmanned aircraft, unmanned ground vehicles, or any other vehicle in a vehicle fleet) and transferred to one of a number of what may be characterized as one or more data processing devices, computers, or data collection kiosks 104 via an appropriate communications link 103 (e.g., a portable memory device, a wireless data connection). A single data collection kiosk 104 can serve and collect data from any appropriate number of moving bodies 100, and thereafter process this data in a manner that that will be discussed in more detail below. The fleet operations quality management system may use any appropriate number of data collection kiosks 104, and each data collection kiosk 104 may be used in relation to any appropriate number of moving bodies 100. Data captured on the moving bodies 100 is stored in the form of raw data; that is, readings captured directly from sensors on the moving bodies 100 and not processed in any fashion. Once the raw data is received by a particular data collection kiosk 104 regarding a particular trip by a particular moving body 100, it is processed; that is, the raw sensor values are processed in at least some manner (e.g., calibrated, evaluated, compared, and/or combined together using algorithms on the data collection kiosk 104) to produce what may be characterized as processed navigational data or a trip file (e.g., having an enhanced accuracy). This trip file (a processed collection of raw sensor data on a trip by a vehicle) is sent in any appropriate manner to a main server 105, such as via an Internet connection 108 or via any other appropriate communications link. In one implementation, the trip file may be queued for later transmission to the main server 105 during off-peak hours. In any case, the main server 105 evaluates the trip file and sends it for archiving in a central database 106 via a local area network (LAN) 109 or via any other appropriate communications link. A remote access station 107 (e.g., a terminal, a laptop computer, a desktop computer, a "dumb terminal," or the like) may be used to view a particular trip file stored on the main server 105. The remote access station 107 may also be used to view a particular trip file archived in the central database 106 by querying the main server 105 to retrieve the file from the central database 106. Any appropriate number of remote access stations 107 may be operatively interconnected with the main server 105.

A collection of moving bodies 100 (e.g., vehicles) may be characterized as a fleet (e.g., a vehicle fleet) in relation to the fleet operations quality management system of FIG. 14. A fleet may be defined by any appropriate number of moving bodies 100, any appropriate number of data collection kiosks 104 may be used by any given fleet, any appropriate number of remote access stations 107 may be used in relation to any given fleet, and any appropriate number of remote access stations 107 may be used in relation to each fleet, all in relation to the fleet operations quality management system of FIG. 14. The fleet operations quality management system of FIG. 14 may be used in relation to any appropriate number of fleets (e.g., the main server 105 may be configured to service a single fleet, or alternatively the main server 105 may be configured to service any appropriate number of multiple fleets). For instance, the fleet operations quality management system of FIG. 14 could be used in relation to a single fleet or in relation to multiple fleets.

Figure 14A:
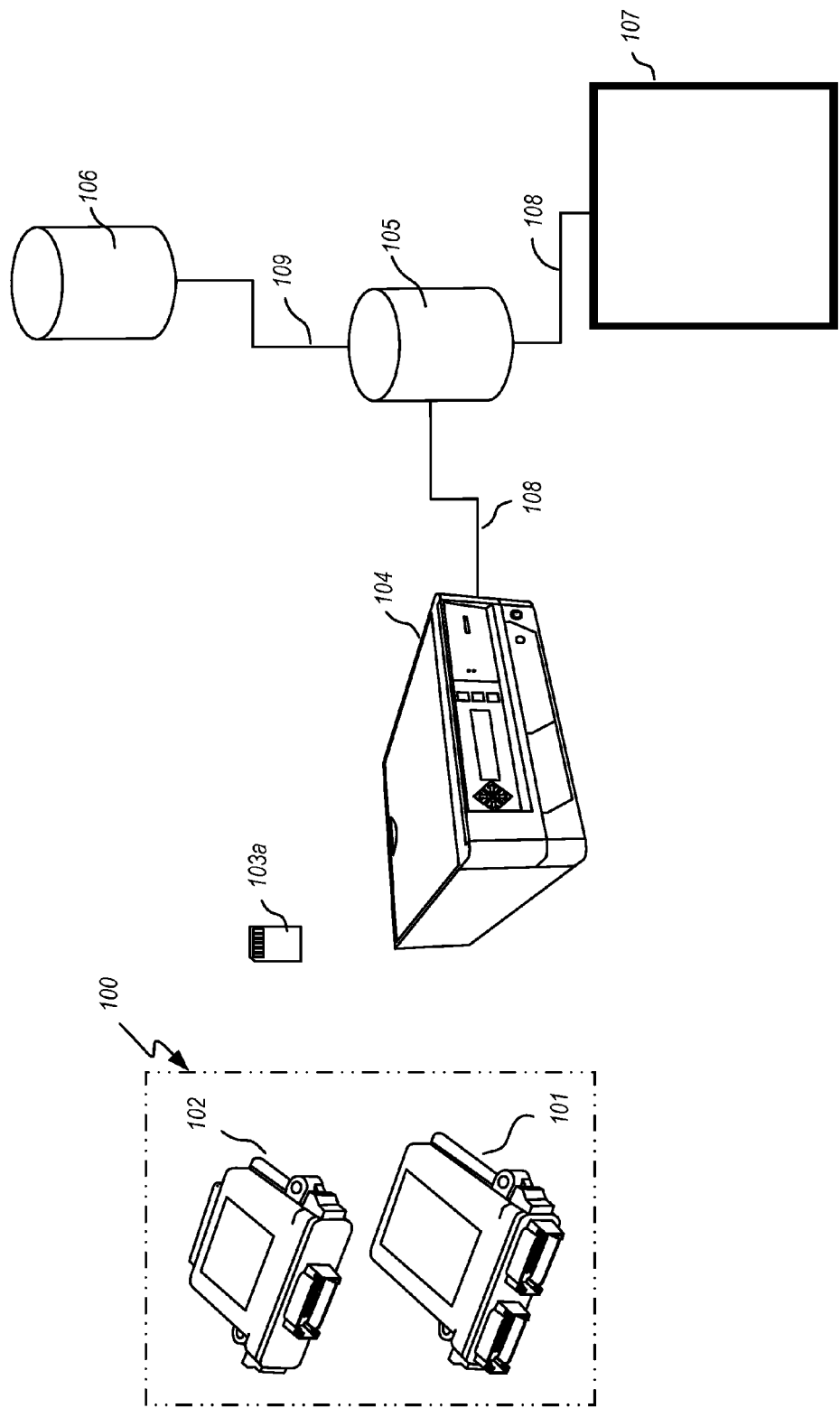
FIG. 14A is a perspective view of one implementation of certain components that may be used by the fleet operations quality management system of FIG. 14.

FIG. 14A shows one implementation of certain components that may be used by the fleet operations quality management system of FIG. 14, showing the flow of data from a single instance of a moving body 100 shown in FIG. 14 through the system to display on a remote access station 107. What may be characterized as a remote or mobile flight recorder, mobile data recording unit, or mobile sensor data recording unit 101 is mounted in any appropriate manner on a moving body 100 and is used to capture data about the movement and operation of the moving body 100. The data is sent from the mobile data recording unit 101 to a remote data storage system or remote memory subsystem 102 which is also mounted in any appropriate manner on the moving body 100, where this data may be stored indefinitely for later extraction. In one implementation, each of the mobile data recording unit 101 and the remote memory subsystem 102 are detachably mounted to the moving body 100 (although again any mounting technique may be utilized), but in any case preferably each are at least substantially maintained in a stationary or fixed position relative to the moving body 100. When one or more trips have been completed by the moving body 100, the data may be transferred from the remote memory subsystem 102 to a data collection kiosk 104 in any appropriate manner (e.g. via a portable memory device 103*a* as shown in FIG. 14A, via a wireless transmission device). The data collection kiosk 104 may be at any appropriate location, such as a central location in the form of an aircraft or truck terminal or a "home base" for a fleet of the moving bodies 100. The data collection kiosk 104 may be in the form of a personal computer or the like, and is used because of the inherent processing power found in a personal computer. The data collection kiosk 104 performs the bulk of the processing of the data that has been captured and downloaded by the mobile data recording unit 101 and remote memory subsystem 102, thereby allowing the mobile data recording unit 101 and remote memory subsystem 102 to use lower-cost, low-performance "low-end" processors used only for acquisition of raw sensor data. The data collection kiosk 104 processes the raw data retrieved from the remote memory subsystem 102 (preferably, on a trip-by-trip basis, such that the identity of the raw data on each trip is maintained). The data collection kiosk 104 then may queue the processed data for later transmission to a main server 105 over an Internet connection 108 as previously noted.

The main server 105 may be installed at any appropriate location, such as a central location or the like in the form of a company headquarters. The main server 105 may communicate with one or more data collection kiosks 104 associated with a single fleet operation (e.g., a single company), or may communicate with one or more data collection kiosks 104 for each of multiple fleet operations (e.g., multiple companies). The main server 105 analyzes the data received from the data collection kiosk 104 (e.g., the above-noted trip file). Data items from each recorded trip are compared against established trip profiles to determine if the moving body 100 for which the data was recorded performed outside of its acceptable performance ranges. These trip profiles consist of a set of rules against which each recorded trip or trip file is measured. If a trip file is shown to have broken one of the established rules for the corresponding trip profile, a "deviation" is said to have occurred. Trip files which are shown to contain one or more deviations are marked for later review by a user of the fleet operations quality management system. Trip files with one or more deviations are sent via an Internet connection 108 for display on one or more remote access stations 107 (e.g., via a web application). All trip files with no deviations (non-event trip files) are sent via a LAN connection 109 for archiving and further processing in a central database 106. A user of the fleet operations quality management system can download and review the trip files containing one or more deviations using a remote access station 107 (e.g., via a web application), and can also use a remote access station 107 (e.g., via a web application) to retrieve non-event trip files from the central database 106, as well, by sending a request to the main server 105 to retrieve the archived non-event trip file from the central database 106. The fleet operations quality management system could be configured so that the trip files with one or more deviations are automatically sent to the relevant remote access station(s) 107 (e.g., via a web application), the system could be configured so that the trip files with one or more deviations can be retrieved through the remote access station(s) 107 (e.g., via a web applications) by logging onto the main server 105, or both. Access to the trip files stored on the main server 105 and/or central database 106 may be appropriately controlled as desired/required, for instance if the fleet operations quality management system of FIG. 14 is handling multiple fleet operations (e.g., being used in relation to fleets for multiple organizations or companies).

In addition to using a remote access station 107 (e.g., via a web application) to download and review deviations and trip files, a user of the fleet operations quality management system may use a remote access station 107 (e.g., via a web application) to define any appropriate number of trip profiles. In this regard, a remote access station 107 (e.g., via a web application) may be used to define one or more rules for a desired trip profile. These trip profiles may vary depending upon the type of moving body 100, may vary from fleet operation to fleet operation, or both (e.g., different companies may wish to employ different requirements for the same type of moving vehicle 100, even when used for the same application). Examples include a trip profile for a commercial aircraft delivering goods to an off-shore oil platform, to a land-based trip profile for a commercial delivery truck following in-town routes. A typical rule for a flight-based trip profile may include a minimum altitude that must be maintained while over populated areas, while a similar rule would be meaningless for a land-based delivery truck.

FIG. 14B is a block diagram of one implementation of a data recording subsystem that is placed on a moving body 100 to record navigational data for the fleet operations quality management system shown in FIG. 14. A mobile data recording unit 101 is operatively interconnected to a remote memory subsystem 102 via an industry standard communications bus or by any other appropriate communications link. The mobile data recording unit 101 has integrated sensors to allow it to generate data about the movement of the moving body 100 through space. In a preferred implementation, the sensors integrated into the mobile data recording unit 101 are alone sufficient to collect the desired/required data, allowing the fleet operations quality management system to be used on any type of moving body 100. In an alternate implementation, however, the mobile data recording unit 101 can also accept signals from external subsystems already on the moving body 100. In the implementation shown in FIG. 14B, the mobile data recording unit 101 accepts power and ground from any appropriate power source (e.g., an internal battery, power from the moving body 100, or another external source). Optionally, the mobile data recording unit 101 is capable of receiving signals from various external sensor devices. In one implementation, these external sensors include an outside air temperature (OAT) sensor, a rotor torque sensor, operator switch inputs, and altimeter and airspeed signal inputs. The mobile data recording unit 101 can also exchange information with external subsystems via a standard serial communications connection or by any other appropriate communications link.

The mobile data recording unit 101 could be in the form of any of the mobile flight recorder or mobile data recording unit disclosed in any of U.S. Patent Application Ser. No. 60/701,736, filed on Jul. 22, 2005, and entitled "LOW-COST FLIGHT TRAINING AND SYNTHETIC VISUALIZATION SYSTEM"; U.S. patent application Ser. No. 11/327,965, filed on Jan. 9, 2006, and entitled "LOW-COST FLIGHT TRAINING AND SYNTHETIC VISUALIZATION SYSTEM AND METHOD"; and PCT Patent Application Ser. No. PCT/US2006/028448, filed on Jul. 21, 2006, and entitled, "LOW-COST FLIGHT TRAINING AND SYNTHETIC VISUALIZATION SYSTEM AND METHOD." The entire disclosure of these three patent applications is hereby incorporated by reference in their entirety herein. The mobile data recording unit from these three patent applications may be mounted on a moving body 100 in any appropriate manner for purposes of the fleet operations quality management system of FIG. 14, including without limitation so as to be readily detachable relative to the moving body 100 (e.g., so as to be readily removable from the moving body 100), or in a manner to accommodate leaving the mobile data recording unit mounted to the moving body 100 at the end of each trip.

In the implementation of FIG. 14B, a separate remote memory subsystem 102 accepts data from the mobile data recording unit 101 in the form of messages using a standard communications protocol. The data received in these messages is stored in memory embedded within the remote memory subsystem 102. The remote memory subsystem 102 may also accept a "wake up" signal from the mobile data recording unit 101, which in one implementation allows the remote memory subsystem 102 to be dormant when information is not being recorded. However, the provision of power to the remote memory subsystem 102 need not be dictated by receipt of a signal from the mobile data recording unit 101—the provision of power to the remote memory subsystem 102 may be initiated on any appropriate basis. Moreover, the remote memory subsystem 102 may also be configured to exchange data with one or more external subsystems (i.e., sensor systems external to the mobile data recording unit 101) via a serial communications connection or any other appropriate communications link, and can also accept operator switch inputs.

Optionally, additional monitoring units 120 can be placed on the moving body 100 to collect data from external subsystems beyond what can be collected directly by the mobile data recording unit 101. These additional monitoring units 120 may be units similar in size and function to either the mobile data recording unit 101 or the remote memory subsystem 102, and each may be dedicated to an external subsystem on the moving body 100 and responsible for collecting data from that subsystem and sending it to the mobile data recording unit 101. Any number of additional monitoring units 120 can be tied into one or more subsystems of the moving body 100 to collect data, and send that collected data to the mobile data recording unit 101 via communication messages.

Additional optional components (that is, "additional data capturing subsystems") can be added to the data recording subsystem. An optional video capture system 130, comprising at least one video camera mounted in any appropriate location on the vehicle and the corresponding electronic control circuitry, can be added to the data recording subsystem. In one implementation, multiple cameras could be placed in the cockpit or cab of the vehicle or on external vehicle components such as control surfaces. The captured video data can be sent to the mobile data recording unit 101 for processing and storage in the remote memory subsystem 102. An optional voice recording system 135, comprising at least one audio capture device (e.g., microphone), can also be added to the data recording subsystem. Ambient audio information, such as conversations or noises from inside the cockpit or cab, can be sent to the data recording unit 101, as can voice information directly from the vehicle's radio and intercom system. The optional video capture system 130 and optional voice recording system 135 are two examples of subsystems which can be added to the data recording subsystem. It is obvious to one skilled in the arts that additional data capturing subsystems, beyond those described herein, can be added to interface with the data recording subsystem.

Figure 15:
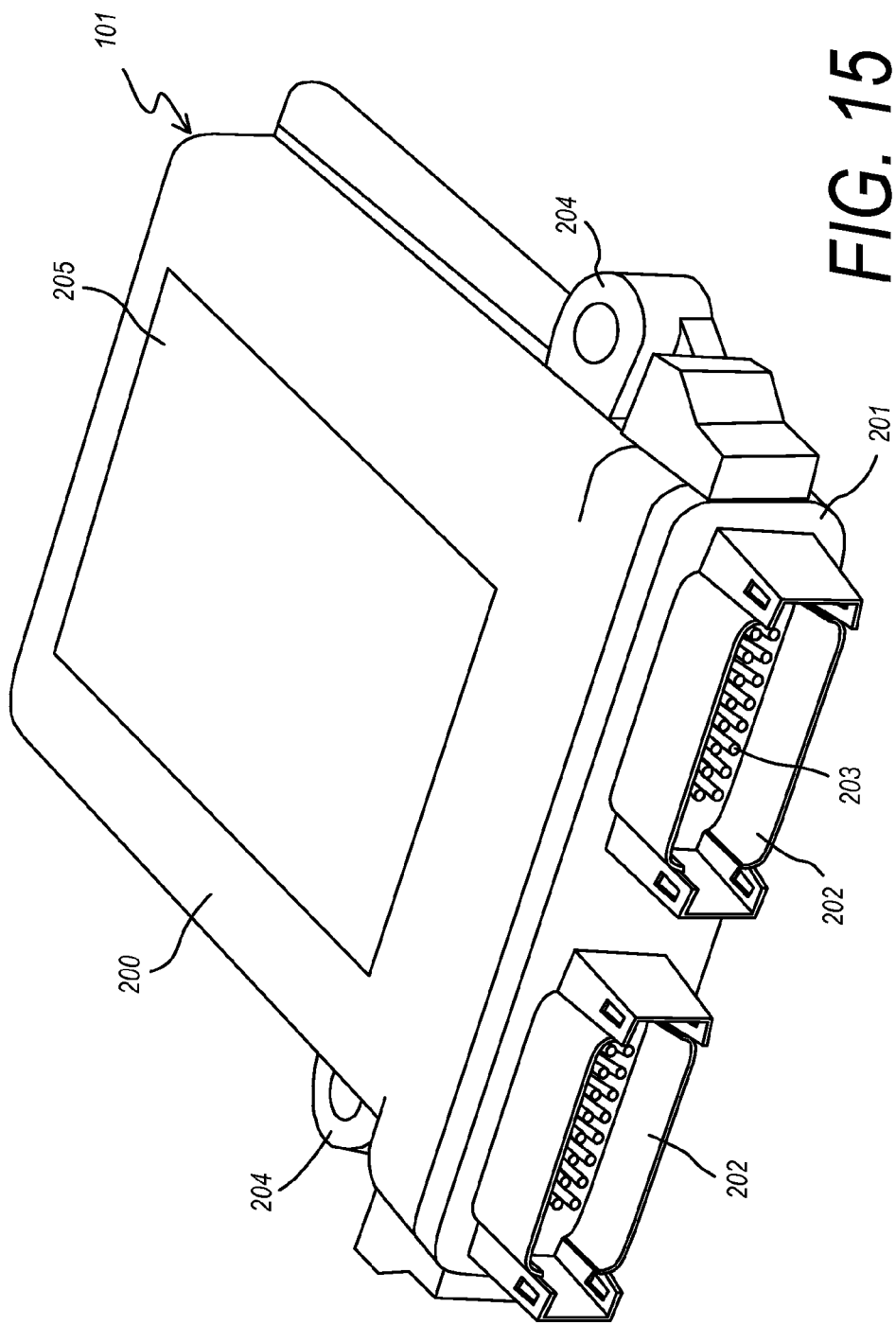
FIG. 15 is a perspective view of the self-contained remote or mobile data recording unit illustrated in FIG. 14A.

FIG. 15 is a perspective view of one implementation of a mobile data recording unit 101 that may be used in the fleet operations quality management system shown in FIG. 14. The mobile data recording unit 101 is housed in a main enclosure 200 and enclosure end cap 201, which together provide an environmental seal to protect the electronics for the mobile data recording unit 101. Any appropriate housing may be used for the mobile data recording unit 101. The enclosure end cap 201 includes one or more enclosure connectors 202 which contain one or more electrically-conductive pins 203. The electrically-conductive pins 203 allow electrical signals to pass between the electronics circuit board(s) inside the main enclosure 200 and enclosure end cap 201 and a device external to the mobile data recording unit 101. These electrical signals may include power for the electronics, readings from sensors located on the moving body 100, and data signals to and from other external devices. The mobile data recording unit 101 may be mounted to the moving body 100 using the mounting holes 204 integrated into the main enclosure 200. An optional module label 205 is placed on the outside of the main enclosure 200 and contains information about the mobile data recording unit 101.

Figure 16:
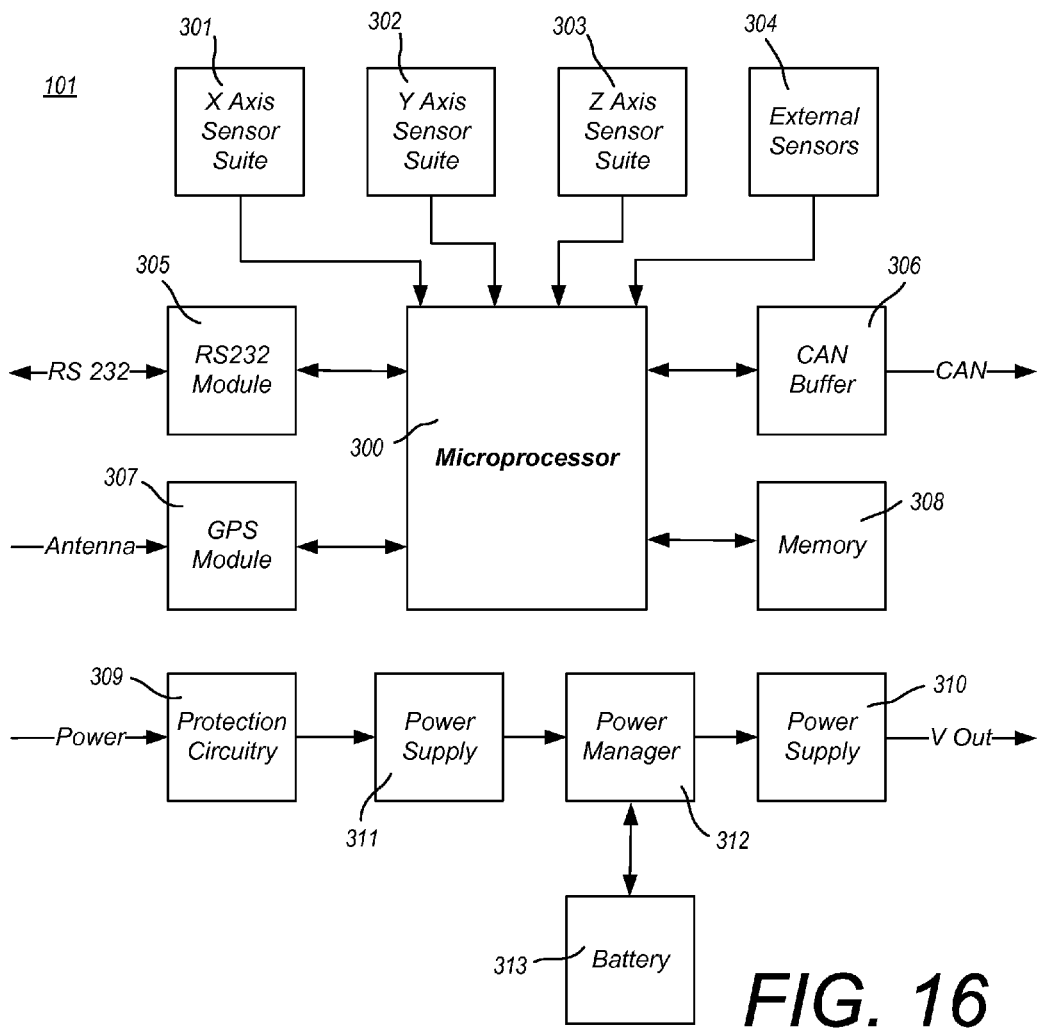
FIG. 16 is a block diagram showing one implementation of the electronic architecture of the self-contained mobile data recording unit of FIG. 15.

Inside the main enclosure 200 of one implementation of the mobile data recording unit 101 are the electronic components shown in FIG. 16. The mobile data recording unit 101 consists of several functional blocks. A low-end microprocessor 300 controls all functions within the mobile data recording unit 101 and collects data from the other functional blocks. A number of characterizations may be made about this low-end microprocessor 300, including without limitation, and which apply individually or in any appropriate combination: 1) the low-end microprocessor 300 may be significantly less powerful than any high-end microprocessor associated with the data collection kiosk 104 (e.g., the low-end microprocessor 300 may have no more than about 1% of the processing power of the associated data collection kiosk 104 in one implementation, the low-end microprocessor 300 may have no more than about 0.5% of the processing power of the associated data collection kiosk 104 in another implementation, and no more than about 0.1% of the processing power of the associated data collection kiosk 104 in yet another implementation); 2) the low-end microprocessor 300 may be in the form of no more than an 8-bit microprocessor; 3) the low-end microprocessor 300 may be configured to handle no more than about 20 million operations per second (20 MIPS); 4) the low-end microprocessor 300 may be configured to only acquire raw data; and/or 5) the functionality of the low-end microprocessor 300 may be limited to acquiring raw data from the various sensors of or in communication with the mobile data recording unit 101, and storing this raw data at one or more locations.

The X-axis sensor suite 301, the Y-axis sensor suite 302, and the Z-axis sensor suite 303 of the mobile data recording unit 101 each contain identical sensing components but are mounted orthogonally to each other, one in each of the three spatial dimensions. The sensor suites 301, 302, and 303 each contain magnetic sensing elements for sensing the Earth's magnetic field, accelerometers for sensing the magnitude of movement, and gyroscopes for sensing the rate of rotation of the mobile data recording unit 101 and therefore the moving body 100 to which the mobile data recording unit 101 is attached. Each sensor suite 301, 302, and 303 also contains an analog-to-digital converter to convert the raw analog sensor values to digital signals which can be read by the low-end microprocessor 300.

Contained on one or more of the sensor suites 301, 302, and 303 are pressure sensors which sense the ambient barometric pressure. These sensors require vents in the enclosure 200 to allow outside atmosphere into the mobile data recording unit 101. Brass vent ports or the like may be connected to the pressure sensors by small flexible tubes that are clamped on each end so that if the mobile data recording unit 101 goes into the water, water will not be allowed to enter the enclosure 200.

In addition to receiving signals from the integrated sensor suites 301, 302, and 303, the low-end microprocessor 300 can be configured to receive and process signals from external sensors 304, including but not limited to an outside air temperature (OAT) sensor, a rotor torque sensor as used on helicopters, and one or more operator switches.

The low-end microprocessor 300 can also process messages from additional monitoring units 120 received in the CAN buffer 306. In one implementation, the mobile data recording unit 101 has an RS232 module 305 or a similar communications module for serial communications with external subsystems. The mobile data recording unit 101 receives location information, including latitude, longitude, and altitude, from the GPS module 307 of the mobile data recording unit 101.

In addition to storing captured data in its own internal memory 308, the mobile data recording unit 101 sends a redundant copy of the data to the remote memory subsystem 102 for storage and later extraction. This may be done via communications messages sent to the remote memory subsystem 102.

The mobile data recording unit 101 receives power from an appropriate power source (e.g., from the power system of the moving body 100 or via an internal battery). This power is filtered through protection circuitry 309 which conditions the voltage for use. This protection circuitry 309 prevents damage caused by voltage spikes or other transient voltage conditions on the supplied power. A power supply 311 converts the voltage to the appropriate level for use in the mobile data recording unit 101. The power is controlled by a power manager circuit 312, which controls the input voltage from the power supply 311 and from the internal battery 313. A second power supply 310 may provide power to external devices such as the remote memory subsystem 102.

Figure 17:
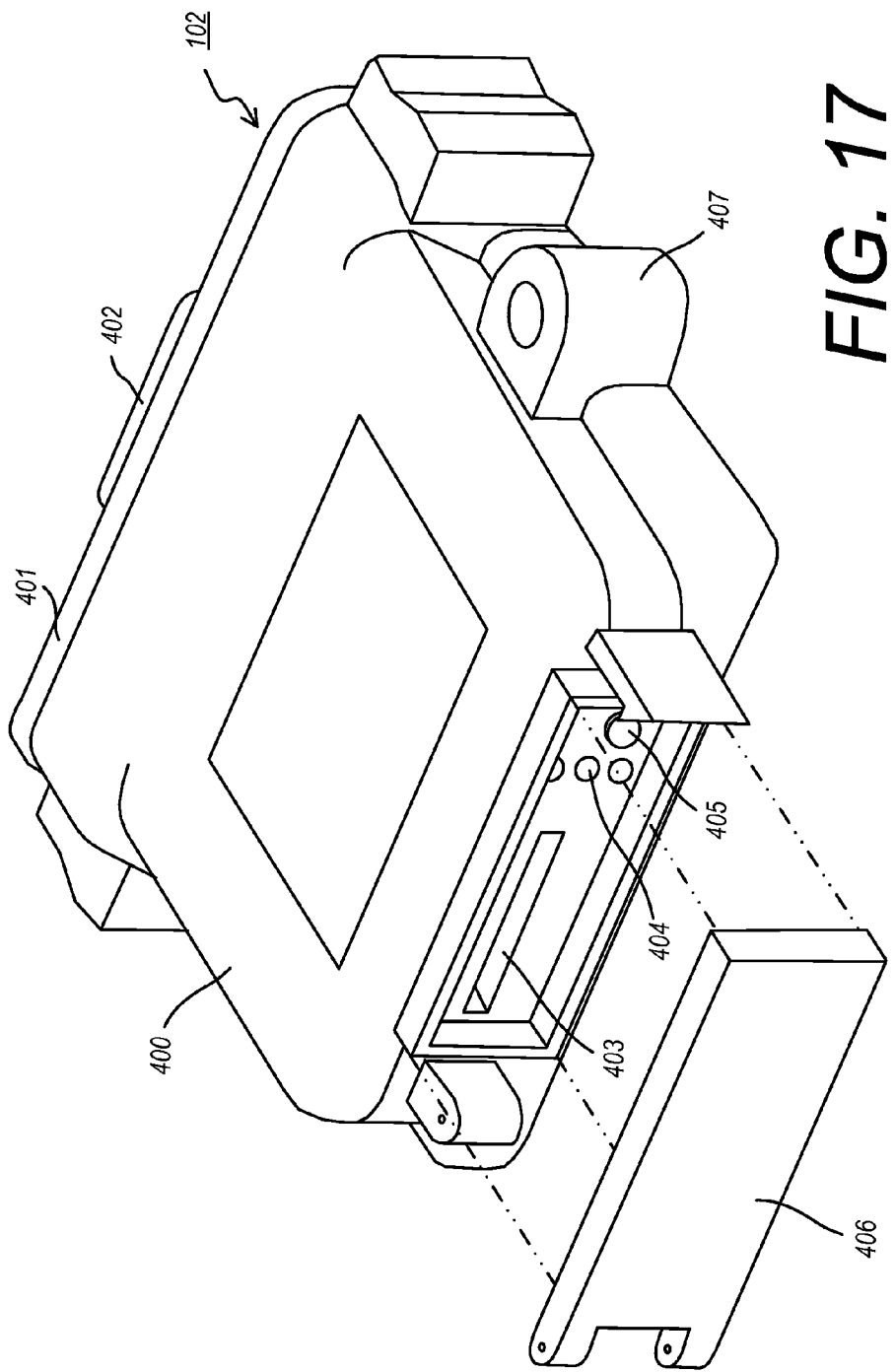
FIG. 17 is a perspective view of the remote memory subsystem illustrated in FIG. 14A.

FIG. 17 is a perspective view of one implementation of a remote memory subsystem 102 used in the fleet operations quality management system shown in FIG. 14. The remote memory subsystem 102 is housed in a main enclosure 400 and enclosure end cap 401, which together provide an environmental seal to protect the electronics for the remote memory subsystem 102. Any appropriate housing may be used for the remote memory subsystem 102. The enclosure end cap 401 includes one or more enclosure connectors 402, which allow electrical connections to be made between the internal components of the remote memory subsystem 102 and external components. One such external component, the mobile data recording unit 101, sends the data it collects to the remote memory subsystem 102 for storage and later transfer via the portable memory device 103a or any other appropriate communications link. The portable memory device 103a may be of any appropriate type (e.g., a floppy disk, a zip disk, a memory stick, a CD).

In the illustrated implementation, the portable memory device 103a is inserted into the memory device slot 403 of the remote memory subsystem 102. The memory device slot 403 contains electrical connection points which make contact with similar points on the portable memory device 103a so that data can be stored on the portable memory device 103a. One or more light emitting diodes (LEDs) 404 provide visual feedback to a user regarding the status of the remote memory subsystem 102. One or more operator buttons 405 are provided as a means of user input to control the operations (e.g., to initiate data extraction) of the remote memory subsystem 102. The memory device slot 403, LEDs 404, and operator buttons 405 are covered by an access panel cover 406 during operation to protect them from the elements. Mounting holes 407 are provided to allow the remote memory subsystem 102 to be mounted to the mobile data recording unit 101 or directly on a structural member of the moving body 100.

Figure 18:
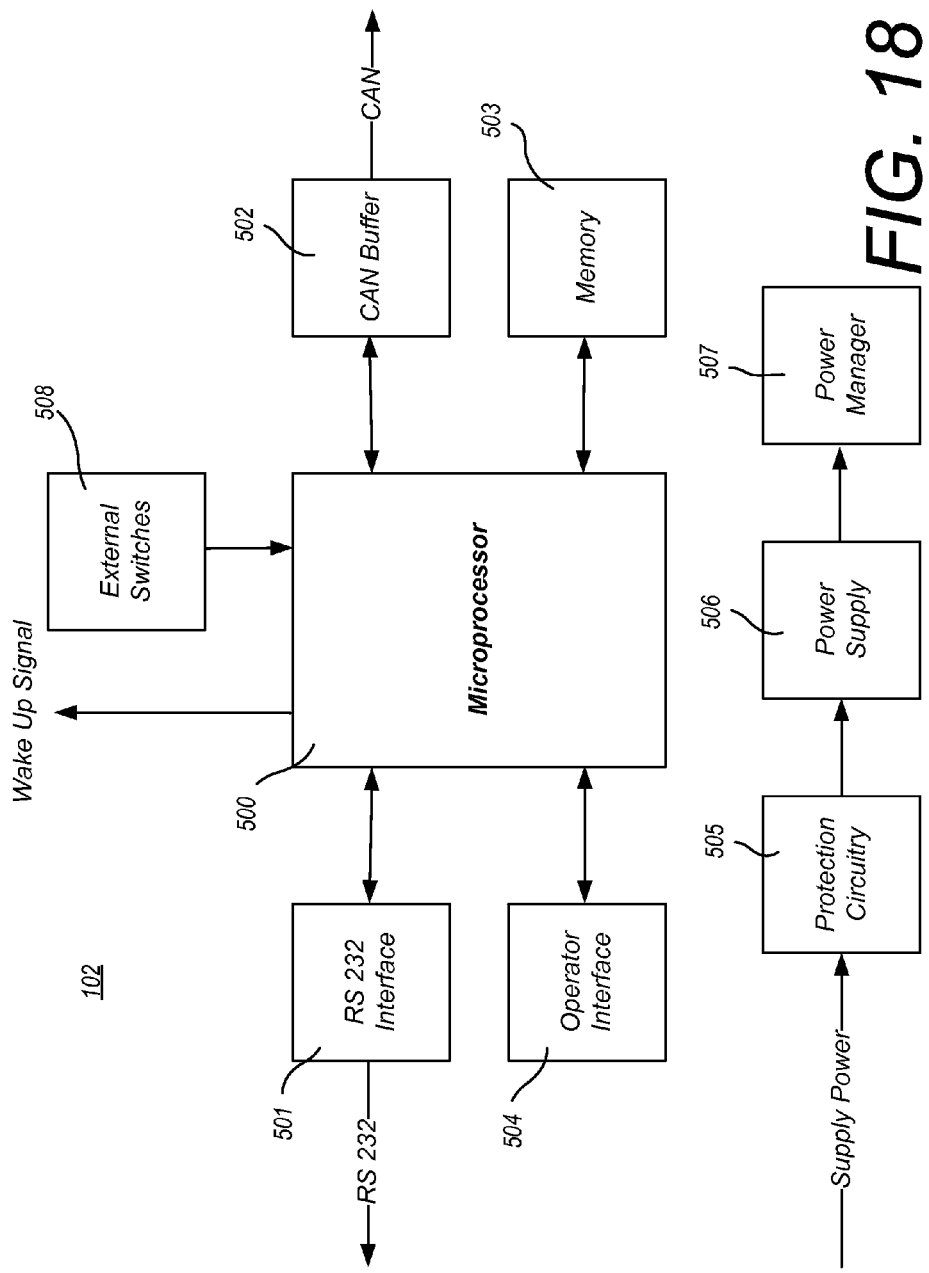
FIG. 18 is a block diagram showing one implementation of the electronic architecture of the remote memory subsystem of FIG. 17.

Inside the main enclosure 400 of the remote memory subsystem 102 are the electronic components shown in FIG. 18. The low-end microprocessor 500 of the remote memory subsystem 102 (which also may be in accordance with the low-end microprocessor 300; i.e., the discussion presented above with regard to the low-end microprocessor 300 may be equally applicable to the low-end microprocessor 500) controls the operation of the remote memory subsystem 102. An RS232 module 501 allows the remote memory subsystem 102 to communicate with external components using a standard serial communications protocol. Similarly, the low-end microprocessor 500 can communicate with external components using an industry standard communications protocol (such as Controller Area Network, or CAN), which is built into the low-end microprocessor 500. Messages sent to or received from external components are stored for processing in the message buffer 502. One such external component is the mobile data recording unit 101, which sends the data it captures regarding the associated moving body 100 to the remote memory subsystem 102 for storage.

A memory device reader 503 reads from and writes to the portable memory device 103a when it is present in the memory device slot 403. The operator interface circuit 504 controls the light emitting diodes 404. External switches 508 are also read and processed by the remote memory subsystem 102. The remote memory subsystem 102 receives power from an appropriate source (e.g., external power from the moving body 100, from an internal battery, or from the second power supply 310 of the mobile data recording unit 101). This power is filtered through protection circuitry 505 which conditions the voltage for use. This protection circuitry 505 prevents damage caused by voltage spikes or other transient voltage conditions on the supplied power. A power supply 506 converts the voltage to the appropriate level for use in the remote memory subsystem 102. The power is controlled by a power manager circuit 507, which controls the input voltage from the power supply 506.

The remote memory subsystem 102 is separate from the mobile data recording unit 101. This two-piece design allows the remote memory subsystem 102 or components thereof to be easily replaced without having to replace the mobile data recording unit 101. Since the remote memory subsystem 102 has parts that must be accessed frequently by a user or operator, such as the access panel cover 406 and the memory device slot 403, these parts are not sealed all of the time and can be exposed to elements such as salt air and humidity. Because of this, they may be susceptible to degradation and may need to be replaced more often than the mobile data recording unit 101. Designing these components into a smaller, less expensive enclosure limits the number of components that need to be replaced.

An alternate implementation of the fleet operations quality management system of FIG. 14 could combine the mobile data recording unit 101 and the remote memory subsystem 102 into a single housing (e.g., in the manner disclosed in the above-noted three patent applications that have been incorporated by reference herein). This would eliminate an enclosure and some redundant parts such as connector shells, and would therefore result in a lower system cost. A single unit design such as this could be used in environments where exposure to the elements is not an issue.

Another alternate implementation of the fleet operations quality management system of FIG. 14 could eliminate the mobile data recording unit 101 completely and use only the remote memory subsystem 102 by itself as a data logging unit to store information provided by subsystems already part of the moving body 100. In this alternate implementation, the fleet operations quality management system would not itself provide any sensors, but would merely log data that is already created by one or more components associated with the moving body 100.

Figure 19:
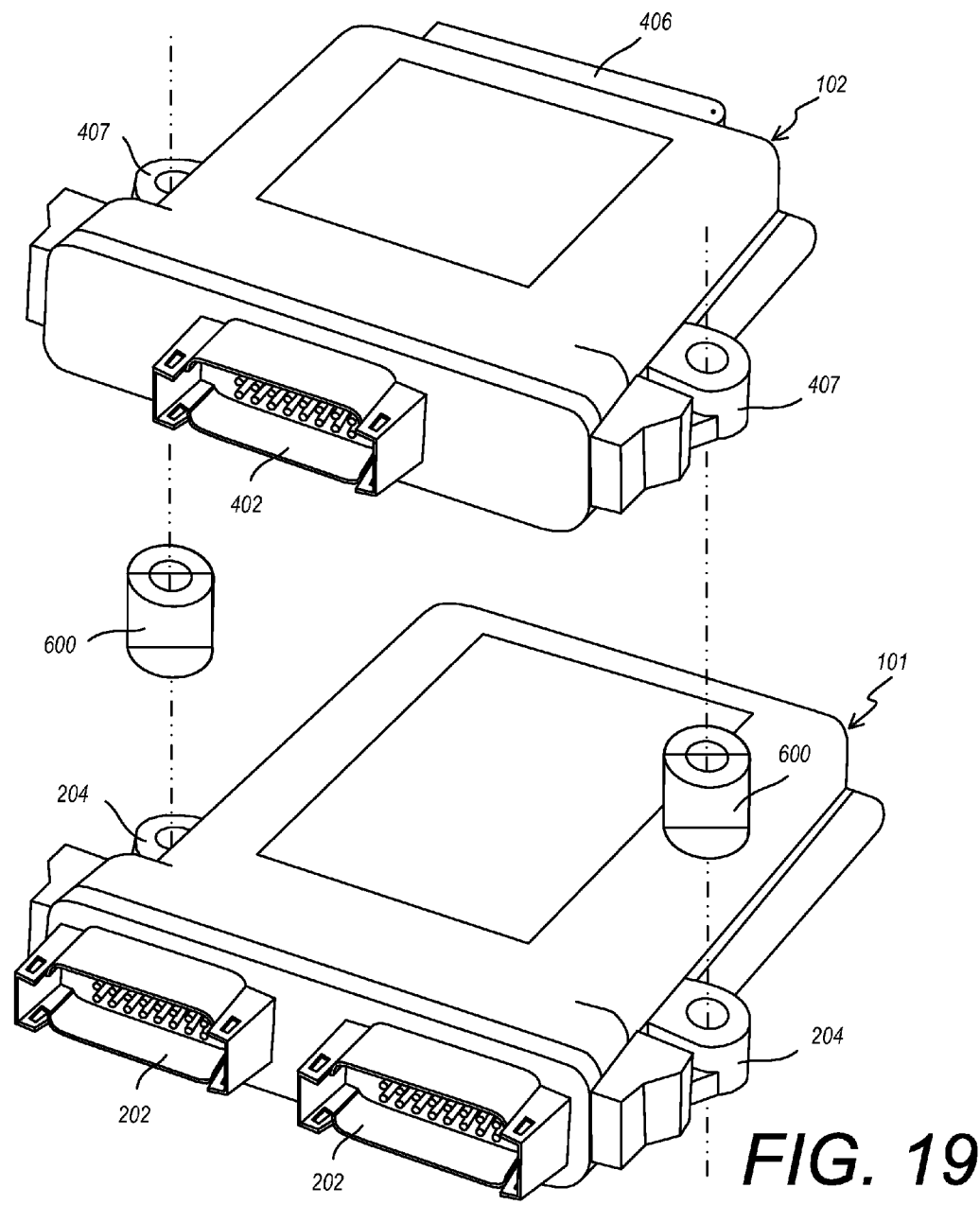
FIG. 19 is a perspective view showing how the remote memory subsystem of FIG. 17 could be co-located with the self-contained mobile data recording unit of FIG. 15.

Although the preferred implementation of the fleet operations quality management system separates the remote memory subsystem 102 from the mobile data recording unit 101, the two units can still be co-located when mounted to a moving body 100. FIG. 19 shows how the two devices can be mounted together, although any appropriate technique may be utilized. The remote memory subsystem 102 is placed on top of the mobile data recording unit 101, although any appropriate mounting location may be utilized. Circular stand-offs 408 are placed between the two units to allow air to flow between them to address build-up issues. Mounting holes 407, stand-offs 600, and mounting holes 204 are aligned, and bolts or similar mounting hardware are passed through the assembly and attached to a structural member of the moving body 100. Connector 402 from the remote memory subsystem 102 is placed on the same side as connectors 202 from the mobile data recording unit 101 to allow for an efficient electrical connection between the two devices. Access panel cover 406 is placed on the side opposite connectors 402 and 202 so that harnesses attached to these connectors will not interfere with the access panel cover 406. Optionally, remote memory subsystem 102 can be mounted in a location different from that of the mobile data recording unit 101 in relation to the moving body 100. The remote memory subsystem 102 could also be directly mounted to the moving body 100, with the mobile data recording unit 100 being mounted to the remote memory subsystem 102 as well.

In one implementation, a portable memory device such as a SD or MMC memory card is used as the portable memory device 103a and placed in the memory device slot 403 during normal operation. In any case, data captured by the mobile data recording unit 101 is sent to the remote memory subsystem 102, which in turn stores this data on the portable memory device 103a. When the portable memory device 103a is full, or when one or more trips are complete, the portable memory device 103a is removed from the remote memory subsystem 102 (e.g., by a user or by a maintenance worker (e.g., at the fleet terminal or the like)). In this manner, the user or maintenance worker (or more generally a designated individual(s)) may be responsible for a fleet of moving bodies 100, such as a number of aircraft at a flight operations base or a number of trucks at a trucking fleet terminal. The user or maintenance worker could collect the portable memory devices 103a from each moving body 100 for which they are responsible, and take them to a data collection kiosk 104 for processing, or use an alternate data transfer means for transferring the data from each relevant mobile data recording unit 101 to the data collection kiosk 104. Stated another way, the entirety of each trip file recorded by a data recording unit 101 is transferred to a data collection kiosk 104 only after the entirety of the trip file has been defined. Stated yet another way, the fleet operations quality management system of FIG. 14 does not involve the real-time transfer of data relating to a moving body 100 to any data collection kiosk 104.

Figure 20:
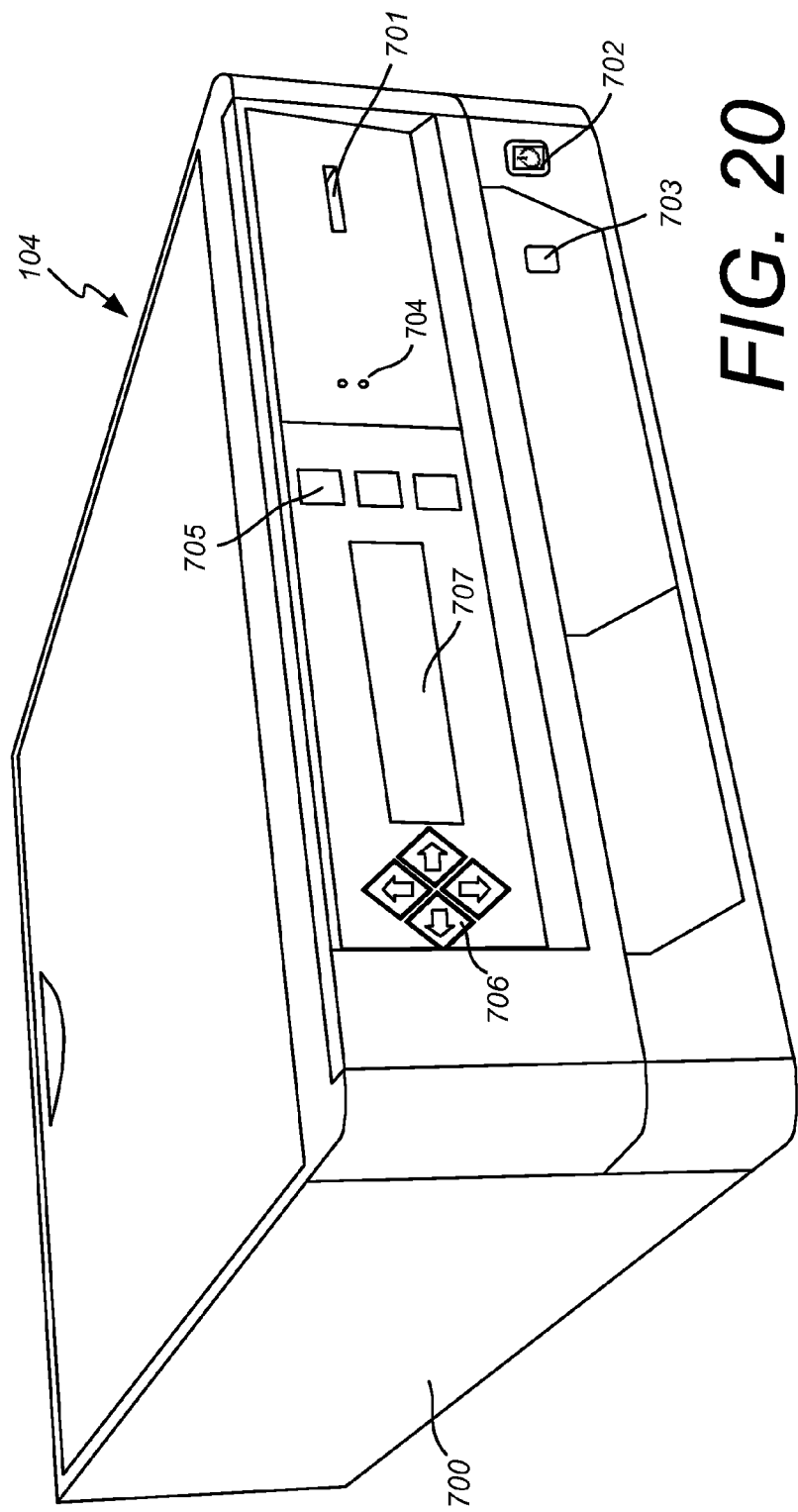
FIG. 20 is a perspective view of the off-vehicle or remote data processing device or data collection kiosk illustrated in FIG. 14A.

FIG. 20 illustrates the features of one implementation of a data collection kiosk 104. The data collection kiosk 104 is a dedicated computer for receiving and processing the data relating to the moving body 100 after the entire trip file has been defined. The data collection kiosk 104 may be placed at a central location at a fleet terminal or the like, such as a user or maintenance worker's office, or at any other appropriate location. The user transfers the data from the remote memory subsystem 102 associated with a particular moving body 100 to the data collection kiosk 104 in any appropriate manner. In one implementation, a portable memory device 103a again is used for this data transfer, and the portable memory device 103a is placed in the kiosk memory device slot 701 of the data collection kiosk 104. Light emitting diodes (LEDs) 704 provide status indications to the user, such as when the data collection kiosk 104 is powered on and when the data is being processed. In one implementation, the user initiates the data extraction process by pressing a data extraction button 703, although the data extraction process could be initiated in any appropriate manner. In another implementation, the data extraction process is automatically initiated when the portable memory device 103a is placed in the kiosk memory device slot 701. A display panel 707 provides feedback on the extraction process to the user in the form of text and menu options. The user can interact with the menu on the display panel 707 through the use of the function keys 705 and the direction keys 706. Data is transferred and cached in the internal memory of the data collection kiosk 104. The data collection kiosk 104 then processes the cached raw sensor data using algorithms stored on the data collection kiosk 104. These algorithms may combine raw sensor readings taken from multiple sensors and combine and filter them to derive new data values which are more accurate than the values from any single sensor. This process is called "sensor fusion". The data collection kiosk 104 can be turned on and off using the power key 702. A kiosk housing 700 encloses and protects the electronics of the data collection kiosk 104. Any appropriate housing may be used for the data collection kiosk 104.

After each trip file from the portable memory device 103a has been processed by the data collection kiosk 104, the portable memory device 103a may be erased and formatted for use with a mobile data recording unit 101, and then removed from the kiosk memory device slot 701. Data from multiple moving bodies 100 can be processed in this manner.

In one implementation, a portable memory device (e.g., a memory card, or the portable memory device 103a) can be used to send information from the data collection kiosk 104 back to the remote memory subsystem 102. This information is copied onto the portable memory device by the data collection kiosk 104, and the portable memory device is then inserted back into the remote memory subsystem 102. This information can include requests to initiate built-in self tests, commands for additional data, or new operating software for the remote memory subsystem 102. Once the portable memory device containing the information or commands is placed into the memory device slot 403 on the remote memory subsystem 102, the commands may be initiated by the user pressing one of the operator buttons 405 on the front of the remote memory subsystem 102 or in any other appropriate manner.

When a trip file recorded from moving body 100 has been extracted and processed, the trip file may be queued for later transmission to the main server 105 over an Internet connection 108 or in any other appropriate manner. Typically, the trip file would be scheduled for transfer over the Internet connection 108 during off-peak hours, such as overnight, to avoid taking system bandwidth away from day to day operations. However, trip files may be sent at any appropriate time.

The main server 105 receives and analyzes the trip file. The main server 105 compares the data in each trip file against established trip profiles to see if any of the trip files contain "deviations". A deviation is an event when the moving body 100 performed outside of the ranges established as acceptable or safe in the pre-defined trip profiles (e.g., where a moving body 100 broke a rule associated with the trip profile). For example, if an aircraft is supposed to maintain a minimum altitude above a populated city, a deviation occurs when the aircraft drops below that minimum altitude when above a city. Trip files that do not contain deviations are sent for archival and further processing in a central database 106. Trips with one or more deviations may be sent for display to an operator on a web application 107.

Figure 21:
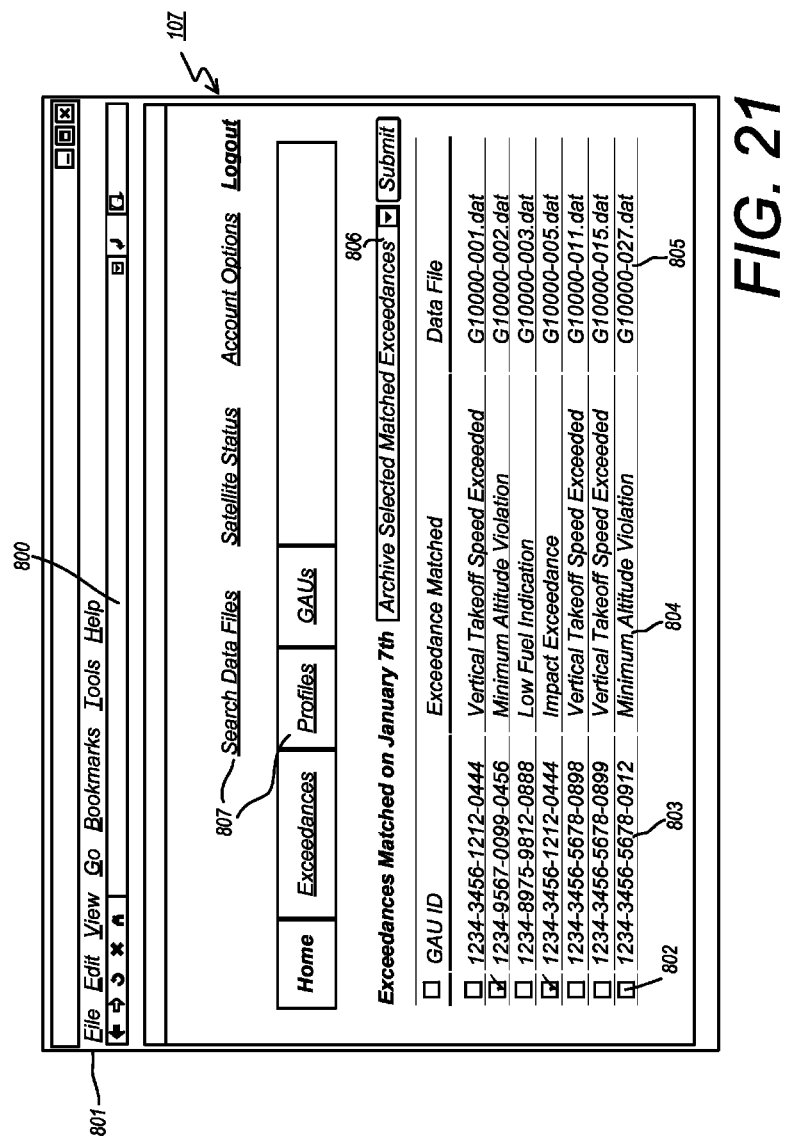
FIG. 21 illustrates a representative display on the user interface illustrated in FIG. 14A.

FIG. 21 shows one example of a typical use of a web application using a remote access station 107. The web application may be accessed over a typical Internet connection 108. The trip files from the main server 105 may be located by typing the server address in the address entry blank 800 using the web application and remote access station 107, or they may be retrieved in any other appropriate manner (e.g., through one or more input or login screens). Typical screen controls 801 can be used to navigate through and interact with the web application via the remote access station 107. A list of deviations for the associated fleet may be displayed on the home page of the web application via the remote access station 107 for operator review. What deviations appear on the list may be established in any appropriate manner. For instance, the deviations that are initially displayed may be associated with trip files that were stored on the central database 106 at some point in time after the operator last logged onto the main server 105. Another option would be for the user to input a date or a range of dates, and the list of deviations may be for trip files that were initially generated on the designated date or within the designated date range. Deviations could be listed for an entire fleet of moving bodies 100, for any individual moving body 100 within a relevant fleet, or for any combination of moving bodies 100 within a relevant fleet. In any case, each deviation that is displayed preferably provides information to the user as to at least the general nature of the deviation.

Check boxes 802 are provided on the screen to allow the user/operator to select one or more deviations on which to perform operations such as deletion or archival. An identification number 803 is provided for each deviation showing which mobile data recording unit 101 was used to record the particular deviation. The type or title of the deviation 804 is displayed next to the identification number 803, and the name of the data file 805 created by the data collection kiosk 104 is also displayed. The operator may select specific actions to be applied to the selected deviation using the command picklist 806. Other pages of the web application can be accessed using hyperlinks 807 provided on the main page using the remote access station 107.

Figure 22A:
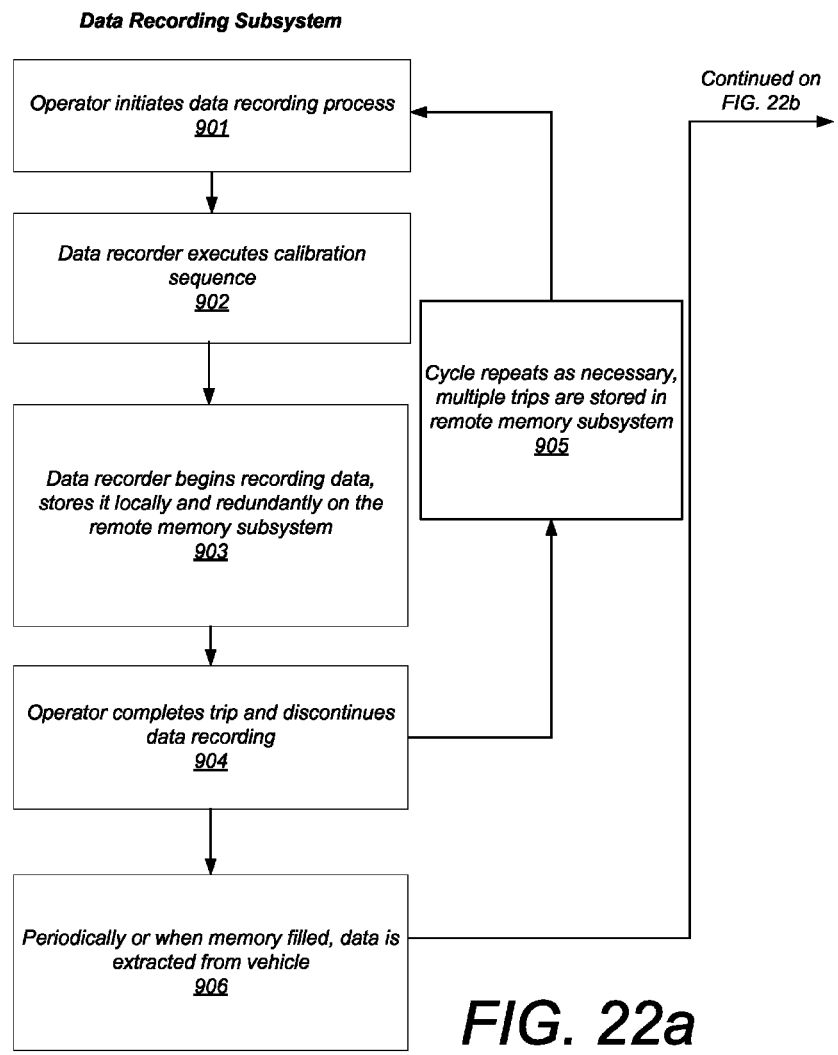
FIG. 22 is a flowchart of one implementation for operating the fleet operations quality management system of FIG. 14.
Figure 22B:
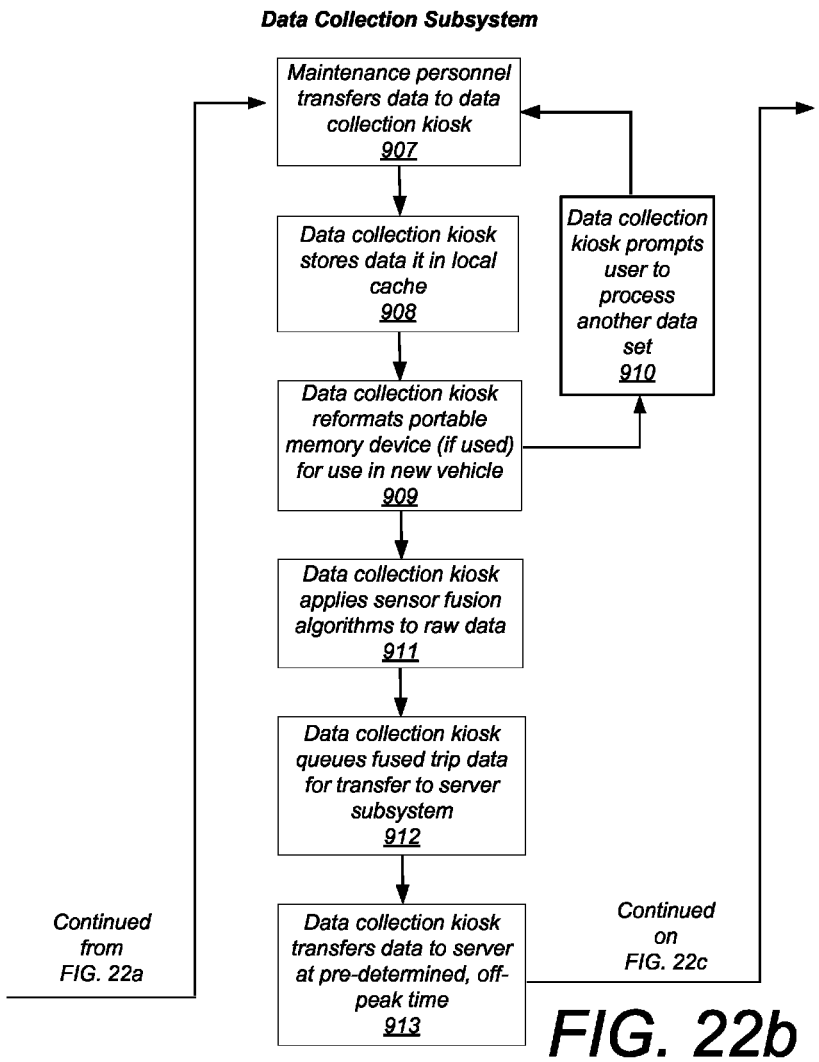
Figure 22C:
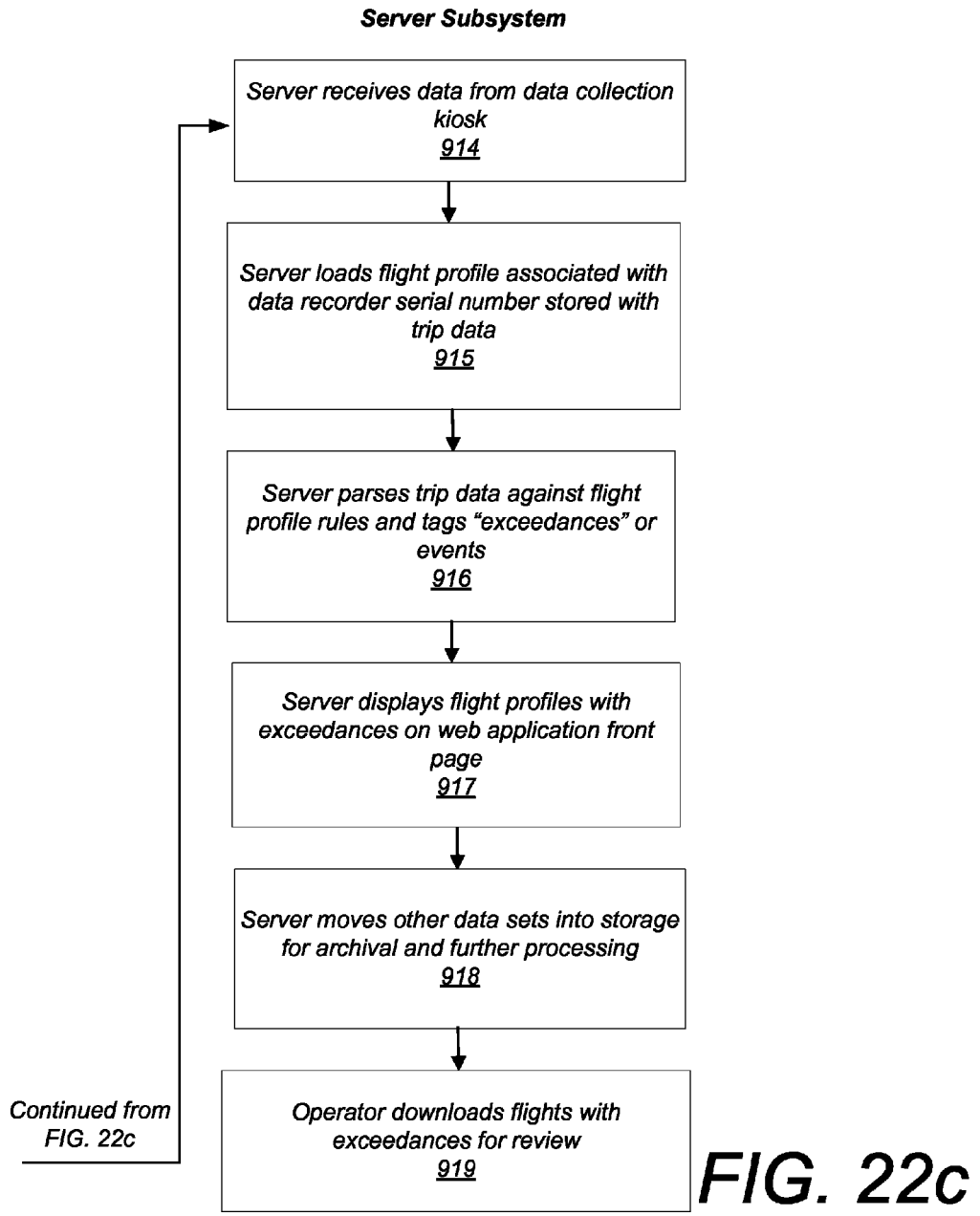

FIG. 22 is a flowchart showing one implementation of the use of the fleet operations quality management system of FIG. 14. The flowchart follows the data collected by a single instance of the mobile data recording unit 101 as it moves through the system. It is important to note that multiple mobile data recording units 101 would be deployed and in operation in an actual implementation of this system.

An operator or other person associated with the moving body 100 may manually begin the data recording process (Step 901), or data recordation may be initiated in any appropriate manner (e.g., automatically in the case of an unmanned vehicle), and which may cause the mobile data recording unit 101 to execute a calibration sequence (Step 902). In one implementation, the data recording process is automatically initiated when the trip begins, and is automatically discontinued when the trip ends. The purpose of the calibration sequence is to adjust the sensors packaged inside of the mobile data recording unit 101 for operation on the moving body 100. Once the calibration sequence has been performed on a mobile data recording unit 101, the calibration sequence may no longer be necessary in at least certain instances (e.g., if the mobile data recording unit 101 is not thereafter removed from the moving body 100). Once any calibration sequence is complete, the mobile data recording unit 101 begins capturing data from the sensors, storing it internally, and sending it to the remote memory subsystem 102 for storage (Step 903). Data recording may be discontinued in any appropriate manner and at any appropriate time, for instance manually or automatically at the end of a trip (Step 904). The mobile data recording unit 101 may be configured to automatically stop recording when the trip is complete and the moving body 100 is no longer moving. The mobile data recording unit 101 again may not depend on vehicle battery power to continue working, and may continue recording for an indefinite period of time after vehicle battery power is turned off. The mobile data recording unit 101 may use an algorithm to determine when recording should be turned off. An example algorithm may be to turn off 5 minutes after vehicle battery power is switched off and one minute after motion of the vehicle has ceased. This trip cycle completes as necessary, and multiple trips may be stored in the remote memory subsystem 102 (Step 905). Periodically, or when the memory is full, the data is transferred from the remote memory subsystem 102 to the data collection kiosk 104 in any appropriate manner (e.g., via a portable memory device 103*a*) (Step 906).

The data may be transferred to the data collection kiosk 104, alone or along with data collected from other moving bodies 100 in the associated fleet. For instance, an operations or maintenance worker may manually transfer the data to the data collection kiosk 104 (Step 907) via one or more portable memory devices 103*a*. The data collection kiosk 104 stores the data in internal memory (Step 908). If a portable memory device 103*a* is used, the data collection kiosk 104 may reformat the portable memory device 103*a* for subsequent use on another moving body 100 (Step 909). Multiple data sets or trip files can be processed in this manner (Step 910). When the data/trip file is extracted, the data collection kiosk 104 may apply sensor fusion algorithms to the data/trip files to pre-process the raw data collected by the mobile data recording unit 101 (Step 911). In one implementation, the data collection kiosk 104 may also check the data/trip file to see if there are any gaps in the data, to detect for potential tampering regarding any of the raw sensor trip data/trip files, to assess the validity of the raw sensor trip data/trip files, or the like. If one or more conditions of this general nature are detected, the data collection kiosk 104 may inform the user/operator that there is a desire/need to extract the redundant copy of the data that is stored in the mobile data recording unit 101. In another implementation, this data validity check may be done by the main server 105 after the trip files have been transferred from the data collection kiosk 104.

Each data collection kiosk 104 may be configured to detect for potential tampering in any appropriate manner. Once again, raw sensor trip data on multiple trips may be stored on a given portable memory device 103*a* or may be otherwise transferred from the remote memory subsystem 102 to a data collection kiosk 104. That is, raw sensor trip data on a certain number of trips from a given remote memory subsystem 102 may be transmitted to a data collection kiosk 104 for analysis. These multiple sets of raw sensor trip data may have an associated identifier, and these identifiers may be sequentially numbered. If a determination is made by the data collection kiosk 104 that a collection of raw sensor trip data from a given remote memory subsystem 102 is missing an identifier that should be in the sequence (e.g., the data collection kiosk 104 may be provided with sets of raw sensor trip data that are numbered 20-25 and 27-30—i.e., number 26 is missing), an indication of this condition may be conveyed and the raw sensor trip data of at least the missing trip(s) may then be retrieved from the relevant mobile data recording unit 101 for analysis (e.g., raw sensor trip data from the missing trip(s) may be retrieved from the relevant mobile data recording unit 101, or raw sensor trip data from each trip may be retrieved from the relevant mobile data recording unit 101). Other ways to identify raw sensor trip data that has been subject to potential tampering after being retrieved from the remote memory subsystem 102 may be utilized. Moreover, one or more ways for assessing whether the raw sensor trip data on each trip is otherwise "valid" (e.g., not corrupt) may be utilized as well.

As the raw sensor data on each trip has been processed by the data collection kiosk 104, the data collection kiosk 104 may queue this data/trip file for later transfer to the main server 105 (Step 912) and then transfer the data/trip file to the main server 105 at a pre-determined time during off-peak usage hours (Step 913). However, each trip file may be transferred from the data collection kiosk 104 to the main server 105 in any appropriate manner and at any appropriate time. That is, what is of particular importance is that each data/trip file is sent from the data collection kiosk 104 to the main server 105.

The main server 105 receives the data over an Internet connection 108 (Step 914). The main server 105 examines the serial number of the mobile data recording unit 101 associated with each trip file, and loads the associated trip profile based on those serial numbers (Step 915). Any appropriate way may be utilized to associate a trip file with its relevant trip profile. The main server 105 compares each trip file to the trip profile to see if any of the trip files contain "deviations", trip parameters that fall outside of the acceptable ranges defined by the trip profiles (Step 916). Trip files that contain deviations are sent for display on the relevant remote access station(s) 107 (e.g., via a web application main page) (Step 917). All data/trip files, including those that do not contain deviations, are sent via a LAN connection 109 to the central database 106 for archival and further processing (Step 918). Using the remote access station 107 (e.g., via web application), the operator may download those trip files with marked deviations for further review (Step 919). Non-deviation files stored in the central database 106 can also be accessed through a request to the main server 105 and displayed on the remote access station(s) 107 (e.g., via a web application) as needed.

In addition to providing access to trip files, the remote access station 107 (e.g., via a web application) can send the trip files to a graphical application such as that noted in the above-noted U.S. patent application Ser. No. 11/327,965. This graphical application may be part of a web application, but in any case can recreate the travel path of the moving body 100 through three-dimensional space by displaying a realistic graphical model of the moving body 100 on a simulated recreation of the environment in which the moving body 100 made its trip. This graphical application can incorporate satellite or high-altitude images of the geographical location where the trip was made, as well as terrain information. This additional information is downloaded from the Internet connection 108. In addition to imagery and terrain information, the graphical application can download or create additional graphical images to further augment the playback of the trip. For instance, a visual representation of the vehicle's path through space, such as a ribbon or line representing the path, can be shown extending out behind and in front of the moving body. This line can use colors or other graphical means to indicate areas in the trip where an event or deviation occurred. The operator can move quickly to the point in the trip where the event occurred, and can select the event to display additional information. Also, other information pertaining to the time the trip was made, such as weather and sunlight conditions, can be downloaded and displayed on the graphical simulation or used to augment the information stored in the trip data files. An intelligent software agent can be employed to mine the server and Internet for the best available information to augment the raw sensor data captured by the mobile data recording unit 101.

An important aspect of the fleet operations quality management system is the processing performed by the data collection kiosk 104. At least some of this processing may be referred to as "sensor fusion", as its primary purpose is to combine the raw, unprocessed readings captured from multiple, redundant sensors into one highly-accurate data stream representing the trip completed by the moving body 100. For example, algorithms are used to derive values for the yaw, pitch, and roll of the moving body 100 based on three-dimensional position and movement data from GPS satellite readings. These derived values for yaw, pitch, and roll are then compared to and combined with readings for yaw, pitch, and roll read directly from the accelerometers, gyroscopes, and magnetic sensors integrated into the mobile data recording unit 101. By combining yaw, pitch, and roll values from these two different but redundant sources, a more accurate and stable trip path can be derived. The GPS-derived readings can help compensate for sensor drift which is inherent in the gyroscopes, and the direct sensor readings can help compensate for the inherent inaccuracies of the GPS-only solution.

There are several key improvements the fleet operations quality management system described herein offers over known prior art. First, the mobile data recording unit 101 is designed such that it can be operated as a self-contained device which does not have to be tied into a vehicle's subsystems. The mobile data recording unit 101 contains enough integrated sensors to allow it to capture navigational data on its own without requiring additional information from the vehicle or its existing subsystems. This allows the mobile data recording unit 101 to be portable and easily installed in many types of vehicle systems. Because the mobile data recording unit 101 is designed such that it is not required to interface to existing subsystems, it is significantly easier to certify for use on vehicles such as aircraft. It can also be designed to be significantly less expensive than existing systems seen in the prior art.

Although the mobile data recording unit 101 can be operated as a self-contained system in one implementation, it is also capable of receiving information from existing on-board systems in other implementations. The mobile data recording unit 101 can receive signals from these existing systems via connections built into the housing.

A second improvement over known prior art is that the fleet operations quality management system captures raw sensor data and allows this raw sensor data to be downloaded to an external system for later processing. At least certain known prior art systems require that the sensor data be processed on the vehicle, and provide only this processed data to external systems for review. In these known prior art systems, the raw sensor data is not saved and cannot be retrieved for further processing. In the fleet operations quality management system described herein, the raw data is captured and preserved and can be processed off-line using multiple algorithms and external systems as required. This approach also allows the mobile data recording unit 101 to use a simple and inexpensive low-end microprocessor just powerful enough to capture the raw data, and to use a more powerful off-board computer for later processing of the data.

Because the captured raw data is processed after the trip, and not during it, the fleet operations quality management system described herein offers a third improvement over known prior art systems. The data collection kiosk 104 is essentially a personal computer dedicated to processing the raw sensor data some time after the trip has taken place. Because the trip is completed when this post-processing occurs, the data collection kiosk 104 can process the raw data by looking ahead in time, to see what the moving body 100 will be doing beyond the point in time that is currently being processed. This means that the processing algorithms do not have to depend only on historic data and trends, but can use this "fore-knowledge" of the trip to provide a more accurate analysis of the trip data points.

A fourth improvement of the fleet operations quality management system described herein over known prior art systems is the ability of the operator to use the web application to define their own trip profiles without having to ask the application supplier to implement the new profiles. The web application provides a simple menu-driven user interface to allow the operator to edit existing trip profiles or to add entirely new ones. This feature allows the system to be easily used with many different kinds of vehicles without significant rework or redesign.

The present invention seeks to incorporate detailed simulation modeling data with actual in-flight video for a complete virtual simulation program for both training and for examining flight data after a malfunction has occurred. The more detail gathered during a flight, the more realistic a simulation based on that data will be. Including real-time recorded video and audio of the flight in the cockpit and externally on the aircraft will provide data that cannot be collected using the best sensors currently available and used for gathering simulation data.

The present invention incorporates two distinct sources of data: a 3D simulation application 100 and a video playback application 200. An aircraft is mounted with both cameras and data collecting sensors. The cameras may be mounted in the cockpit or externally facing important components of the aircraft such as an airplane rudder. The data collecting sensors, such as inertial measurement units, flight speed sensors, or other flight data recording devices, collect important flight data and store that data into an on-board memory storage device.

The 3D simulation application 100 essentially takes the recorded flight data and, using a computer with rendering capabilities, displays the flight data in a modeled 3D virtual environment. Once a trip has been downloaded from the onboard memory storage device and rendered into a viewable model by the computer, it may be played back in real time using a media player designed to handle such a 3D model.

Video recorded flight data is handled in a similar manner, except that the rendering step is not necessary. Video or other time-sequenced image recording devices may be aimed internally at the cockpit such as a pilot would view the control panel and windshield of the aircraft, or they may be aimed externally at designated portions of the aircraft, or both. If multiple cameras are used, each will supply its own video feed and will record whatever area of the plane it is aimed at for the duration of the trip. This video data is saved in an onboard memory storage device and may be played back at any time using an appropriate media player. Additional data may be embedded into the video, such as GNSS positional data as the recording is being made.

Although the preferred embodiment of the present invention will use on-board storage devices for storing data as it is recorded, an alternative embodiment of the invention will send recorded data wirelessly to a remote storage device. This may be performed via a wide-area network (WAN) or using a satellite internet connection.

2. The Virtual Modeling Application 1105

Figure 23:
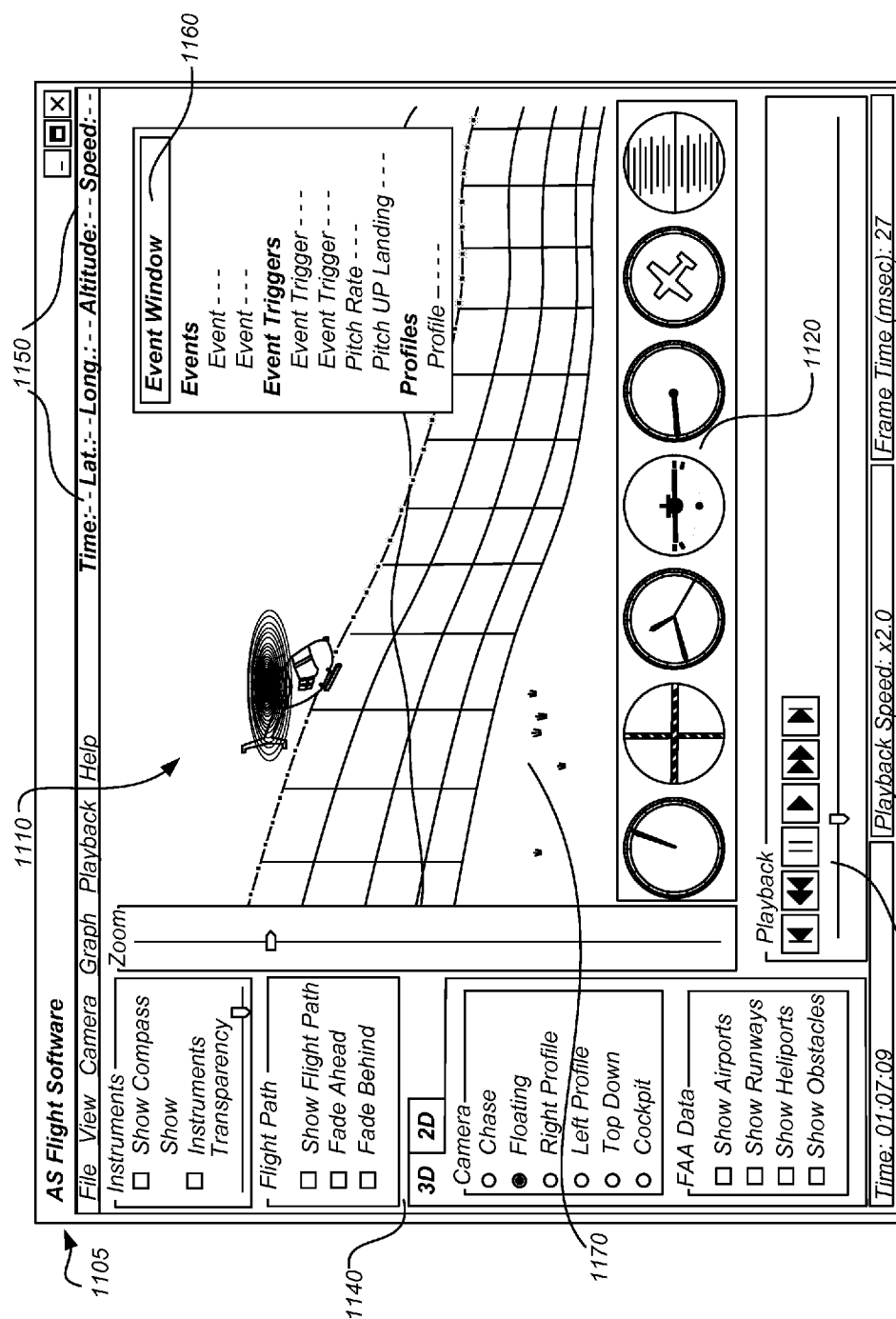
FIG. 23 is a diagram of the virtual model aspect of the present invention as it is being rendered using computer software.

Referring to the figures in more detail, FIG. 23 shows the 3D playback application 1105 as it would appear on a computer monitor or other display device post-rendering. Once all data has been collected in flight from all sensors located on the aircraft, that data can be uploaded to a capable computer and rendered into a 3D visual display.

The computer renders the data and displays it in an application window 1110. The computer renders aircraft instruments 1120 which will display data as the pilot would see it appearing in the aircraft's cockpit while flying in real time. This also adds to the realistic experience of the simulation and helps to synch data between the simulation and the video. An Instruments Control panel allows the user to switch the display of the simulated instrument panel on and off. A slider control allows the user to control the degree of transparency of the control panel. Making the instrument panel semi-transparent will allow the user to view the 3D simulation behind the panel. In addition to the instrument panel, these controls allow the user to switch the display of the compass rose, a small graphic which appears in the upper right corner of main window indicating direction, on and off.

Also rendered and displayed in the application window 1110 are any 3D graphical features 1170, such as a flight wall graphically displaying the 3D travel path of the aircraft. Such a simulated flight wall is disclosed in U.S. Pat. No. 7,848,698, which is incorporated herein by reference. This would also include a computer-generated model of the aircraft itself, models of the terrain, or any other rendered visuals. Graphical features 1170 include aerial or satellite image of where the flight occurred which is applied over three dimensional terrain data. A realistic 3-D model of the aircraft is shown flying the maneuvers that were recorded by the recording device during the actual flight. Graphical feature controls 1140 are located alongside the display window 1110 for controlling how the 3D playback is displayed, which features are displayed, which instruments are displayed, and which view the simulation is seen from. This gives the user flexibility and a wider measure of teaching means by allowing the user to view the aircraft from multiple camera angles.

The simulation application 1105 also includes media player controls 1130 for controlling simulation playback. This is provided in media player-style controls, similar to typical DVD players or other media software, so that it is possible to play, pause, fast forward, rewind, and go to the beginning or end of the flight. There is also a horizontal slider control that allows the user to quickly go to any point in the playback.

Digital readouts 1150 of trip parameters are displayed at the top of the window 1110. This includes information on position, speed, and orientation of the aircraft. This allows the user to see the exact value of flight parameters at any point in the flight at a glance without moving away from the model-flight view. If certain data of a flight is not recorded, that data will appear as unavailable in the display screen as to not confuse the simulation pilot.

The event window 1160 provides a list of all of the events that were identified by the software for the currently displayed flight. The window shows three separate lists: 1) all events available in this file (along with any unavailable events), 2) all event triggers this file was parsed against, 3) all profiles associated with the recorder. The Events window shown here lists five events which are available in the file. Event "00400310.004" is currently being reviewed and the associated event trigger and profile(s) for this event are highlighted. During flight playback, events shown in the list are highlighted in red as the aircraft is moving through the corresponding event. Double-clicking on an event with the mouse will cause the playback to immediately go to that part of the flight.

3. The Video Recording and Playback Application 1200

Figure 24:
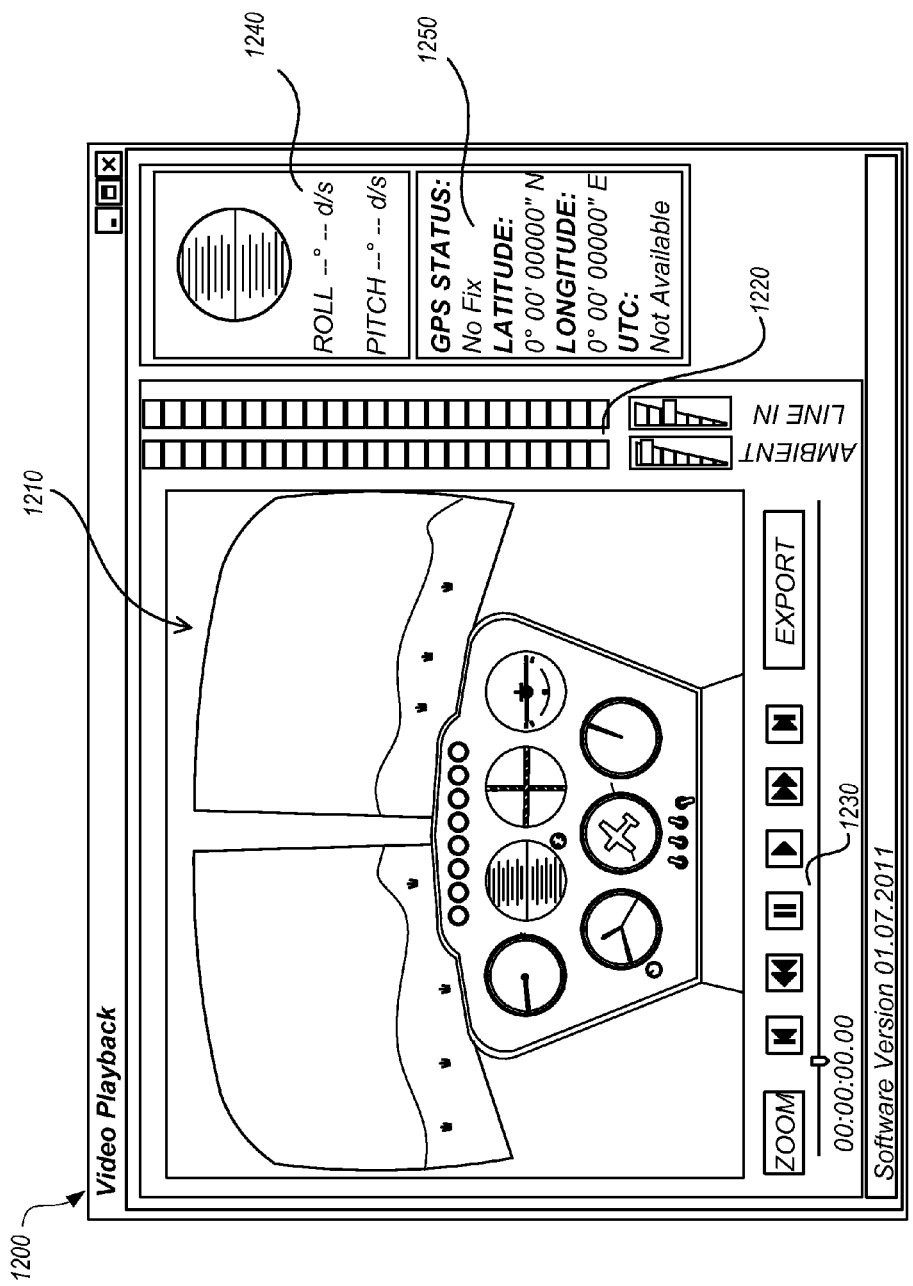
FIG. 24 is a diagram of the flight video aspect of the present invention as it is being played back on a display device.

FIG. 24 shows the video playback application 1200 as it would appear on a computer monitor or other display device once the recording is downloaded from the storage device located on the aircraft. In the exemplary embodiment, recorded video is displayed in the window 1210. As mentioned above, recorded video may be from any camera placed on the aircraft, including a cockpit view or views of important external components of the aircraft. Alternatively, any time-sequenced still images or other visual imagery, including photographed still images taken at specific time intervals, may be used in place of live video filmed during flight.

The window 1210 includes typical media player controls 1230 that are used when the video playback is being viewed stand-alone. The controls will be unavailable when the video is synched with the simulation program 1105. These controls 1230 are similar to typical DVD players or other media software, so that it is possible to play, pause, fast forward, rewind, and go to the beginning or end of the flight. There is also a horizontal slider control that allows the user to quickly go to any point in the playback.

Visual indicators for audio playback 1220 are included in the display window 1210. Two audio streams are recorded during aircraft flight: one is a direct line to the communication channel between the pilot, co-pilot, and ground, and the other is a microphone installed in the cockpit to pick up ambient noise. There is an indicator for each of these two audio inputs. The indicators show how many decibels are being picked up from each stream; the higher the indicator shows, the higher the decibel level. These streams can be muted at the option of the user. These streams will typically be used to determine what may have gone wrong during a flight. For instance, if there were engine issues during flight, the ambient microphone will pick up any unusual noises made by the engine. Also, clues may be determined by what the pilot and copilot say during a malfunction. These audio streams will also add to the realism of the simulation when played with the video playback.

An attitude indicator 1240 is displayed alongside the actual video playback. This is a computer generated indicator which is synched with the video playback automatically. Signals are picked up by an IMU or GNSS tracking device installed on the aircraft and provide accurate information as to the aircraft's attitude. This indicator will provide important orientation information to a user who is viewing the video playback. Additionally, a GNSS indicator 1250 providing current latitude and longitude is displayed alongside of the video playback. This, in addition to the attitude indicator, will aid the user in orienting himself while viewing the video playback. The combination of these two tools also adds to the realism of viewing a simulation using video playback, as these devices will likely be available to the user when performing real live flights.

4. Synching Simulation 1105 and Video Playback 1200

Figure 25:
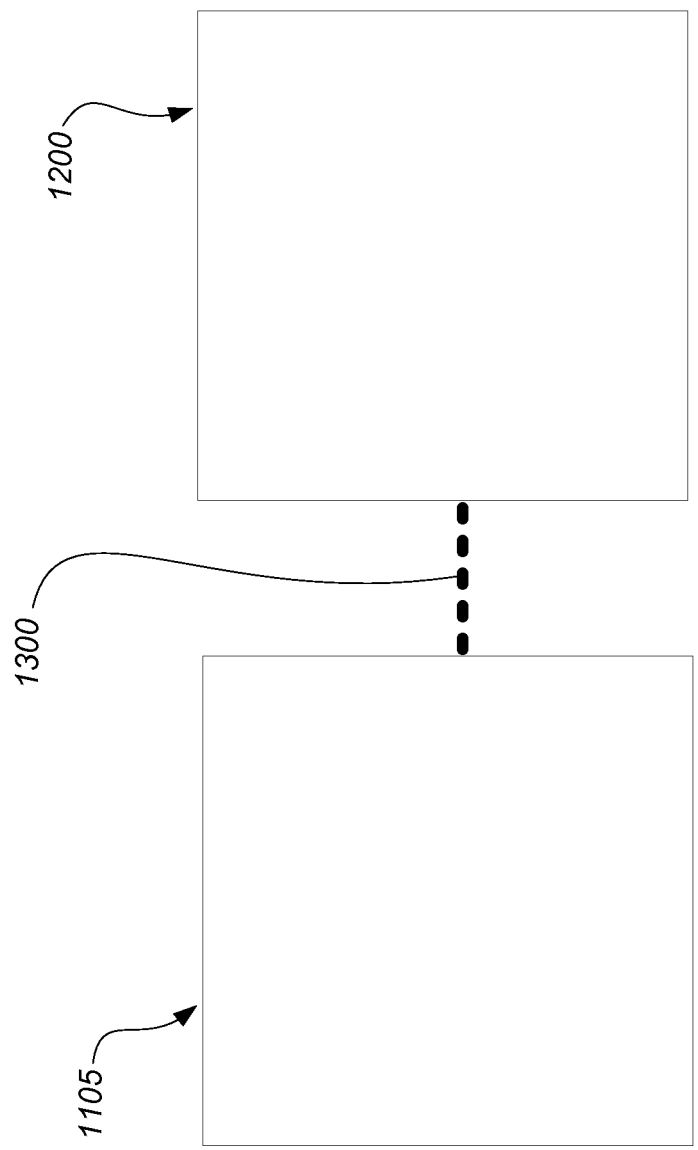
FIG. 25 is a diagram displaying the interaction between the virtual model aspect and the flight video aspect of the present invention as they combine to form one system and method.

The novel aspect of the present invention lies in the synching of the 3D simulation playback 1105 and the true video playback 1200. A coordination signal 1300 allows the two applications to synch in real-time as shown in FIG. 25. Several options are available to the user to increase readability of using both applications at once. The simulation playback 1105 may be shown on one display device, while the actual video playback 1200 is displayed alongside on a second display device. Alternatively, both could be shown on the same display in separate windows 1110, 1210. As stated above, the media controls of the video playback are disabled while the two applications are synched, allowing the simulation program 1105 to control both video playback and simulation playback.

Figure 26:
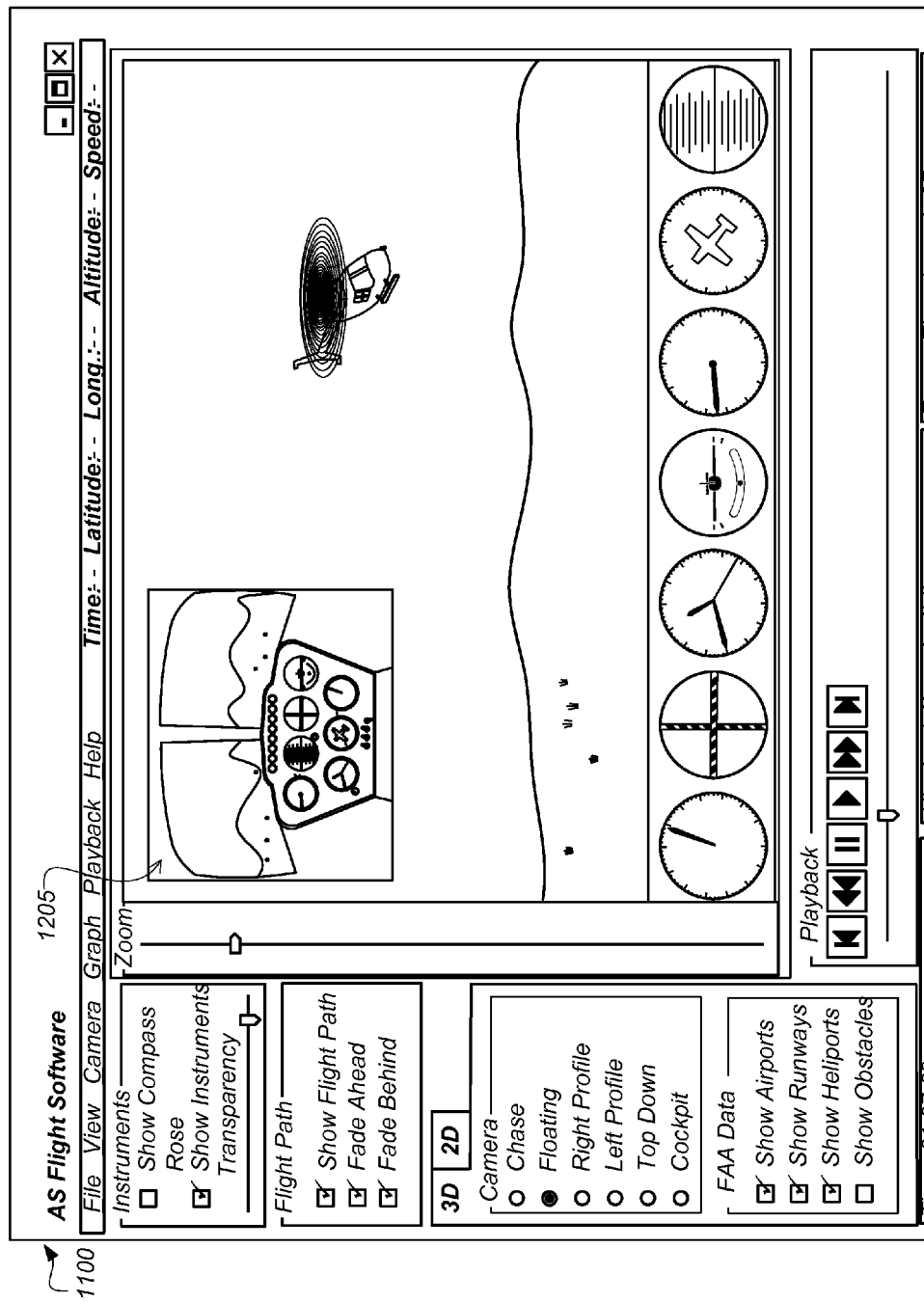
FIG. 26 is an alternative view demonstrating the flight video aspect of the present invention being played in a window on the same display screen as the virtual model aspect, representing how the two aspects of the present invention can be viewed simultaneously.

FIG. 26 demonstrates an alternative option to viewing the two applications simultaneously. In this view, a sub-window 1205 contains video playback within the simulation playback application 1105. In this way, the use of one display can be maximized while allowing the user to have access to both views simultaneously. Again, playback control is limited to the simulation controls in this option.

Synching the video playback 1200 with the simulation 1105 introduces a level of realism into the flight simulation not previously available. The simulation and video, because they are synched, can be fast-forwarded or rewound simultaneously to view a specific point in time as a teaching tool. The simulated instruments 1120 are viewed right next to the actual instruments shown in the cockpit view of the video playback. Alternatively, a 3D model of the aircraft can be viewed tracking along a flight path in the simulation, while the video playback shows an external view of the aircraft rudder or other aircraft control surfaces. This allows for an expanded teaching tool as well as providing additional detail to aid examiners in determine what caused an aircraft malfunction.

5. Method of Synchronized Simulation and Video Playback

Figure 27:
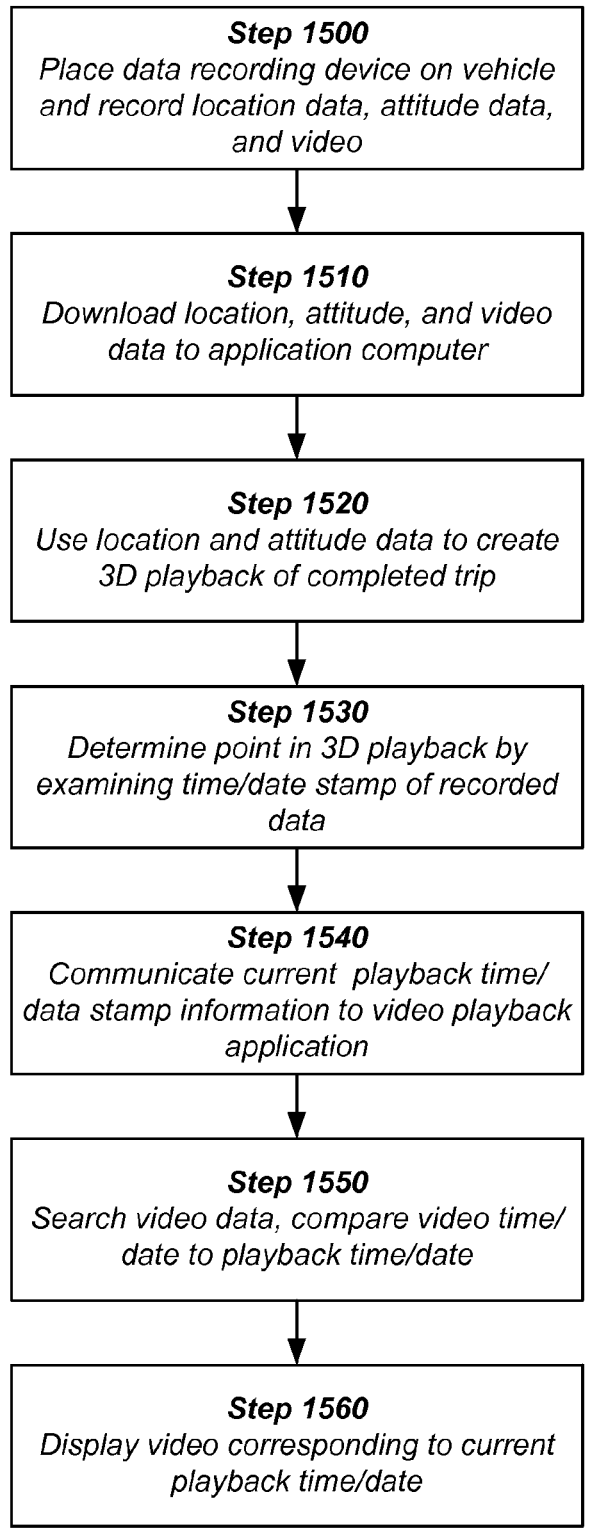
FIG. 27 is a flowchart demonstrating a method of the present invention.

FIG. 27 is a flowchart showing the various steps in one embodiment of the present invention required to synch the two applications 100, 200. Initially, the aircraft is equipped with data recording devices, video recording devices, and audio recording devices at step 1500. These sensors and recording devices are necessary to provide real-time flight data to be used post-flight. In one embodiment, all data recording devices, video recording devices, and audio recording devices may be contained in a single housing, while in another embodiment, all of the devices are stand-alone devices.

As the aircraft flies, data is recorded by all equipped sensors and devices. The recorded data is either saved on local data storage devices or is transmitted wirelessly and stored remotely on data storage devices. This data must be downloaded from the storage device at step 1510 and loaded onto a computer capable of rendering the 3D simulation model and viewing the model and video playback. The computer will process the collected data and render a 3D simulated playback of the flight at step 1520.

To synchronize the video and simulation playback, the user must determine a point in the 3D playback simulation where a chosen time stamp is located at step 1530. This information is communicated and linked with the matching time stamp recorded into the video and audio data at step 1540. The video data and simulation data are searched and compared at step 1550 to determine if proper synching has occurred by comparing all recorded time stamps. Finally, the synchronized video and simulation may be played back at step 1560 using a display device connected to the rendering computer.

The flowchart shown in FIG. 27 is a high-level view of the synchronization of multiple streams of data, and does not show details on how the time stamp data for each of those multiple streams of data may be stored. FIG. 27A through 27E provide additional details on three separate possible methods for storing and packaging data streams with their corresponding time stamps (that is, three different data packaging "schemes"). These figures are meant to be exemplary and are not meant to be limiting in any way.

Figure 27A:
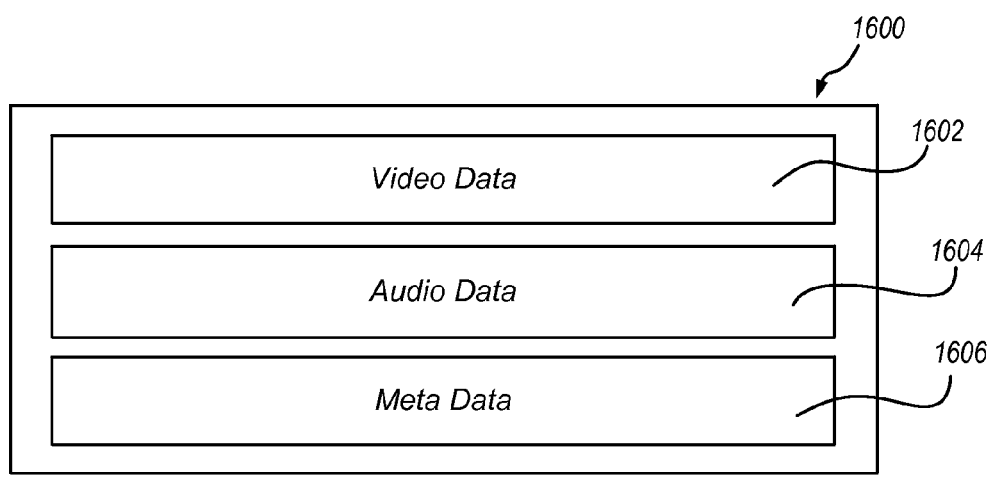
FIG. 27A is a diagram of a data packaging scheme embodying the present invention.
Figure 27B:
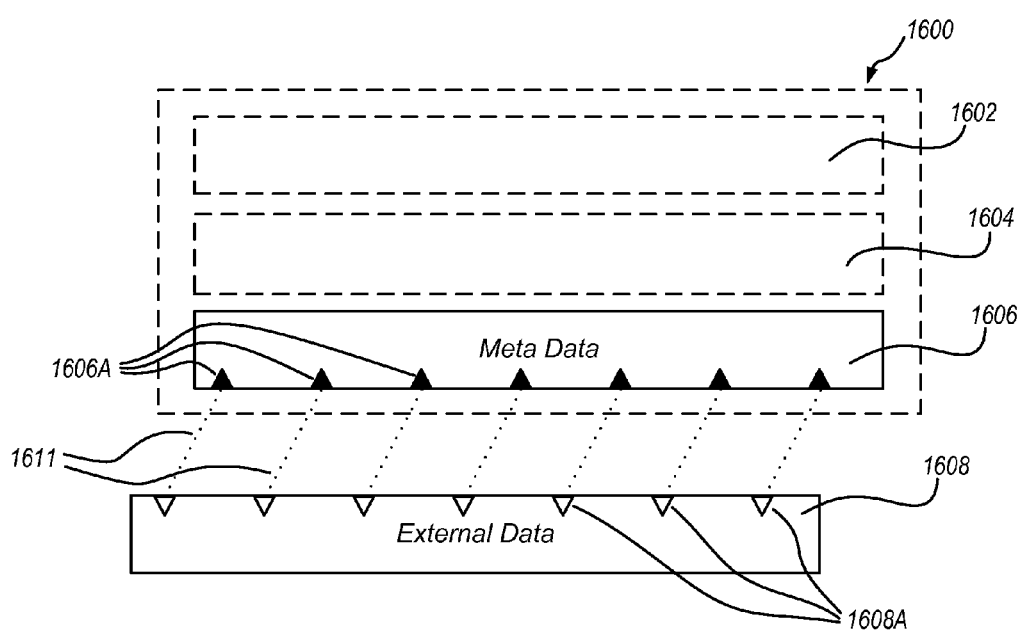
FIG. 27B is an alternate diagram of a data packaging scheme embodying the present invention.

FIGS. 27A and 27B show alternate views of one data packaging scheme in which video data 1602, audio data 1604, and meta data 1606 are packaged together in a single multimedia container 1600. For the purposes of discussion, the multimedia container 1600 may be thought of as a file format that encapsulates these three streams of data (or any other appropriate combinations of data streams) and allows the data streams to be treated as a single object. In this example, the multimedia container 1600 is likely an industry standard file format used for the storage of video and audio data, as well as additional "meta data". In this embodiment, the meta data 1606 holds time stamp data that can be correlated to specific spots in both the video data stream 1602 and the audio data stream 1604.

FIG. 27B shows an alternate view of this data packaging scheme showing that the meta data stream 1606 contains periodic sync markers 1606A. A sync marker 1606A is a piece of data that contains, at a minimum, a time stamp that can be correlated with the other data streams 1602 and 1604. Also shown in FIG. 27B is external data 1608, which may consist of location data, attitude data, or any other type of data which needs to be synchronized with the video data 1602 and audio data 1604. The external data 1608 also has its own sync markers 1608A, which contain, at a minimum, time stamp information that correlates to points in the external data stream 1608.

Through a process such as the one described in the flowchart of FIG. 27, a correlation 1611 is made between the external data sync markers 1608A and the meta data sync markers 1606A. It is this correlation 1611 that allows two or more streams of data recorded by separate devices to be synchronized in time.

Figure 27C:
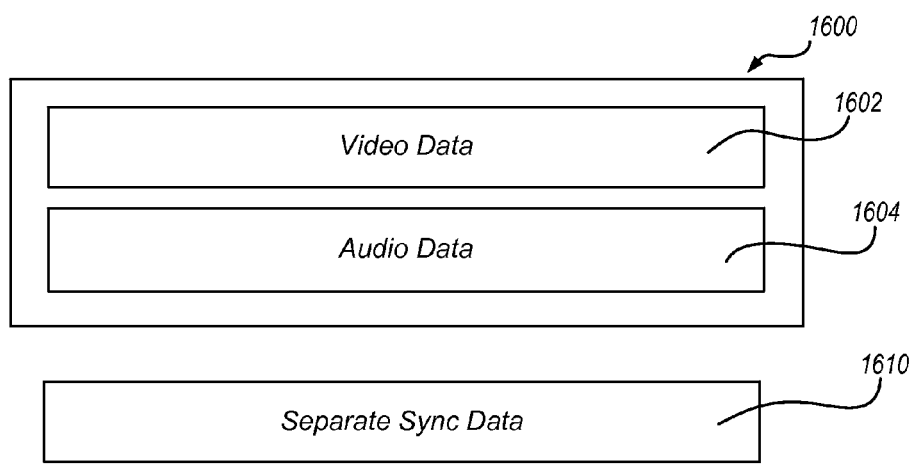
FIG. 27C is an alternate diagram of a data packaging scheme embodying the present invention.
Figure 27D:
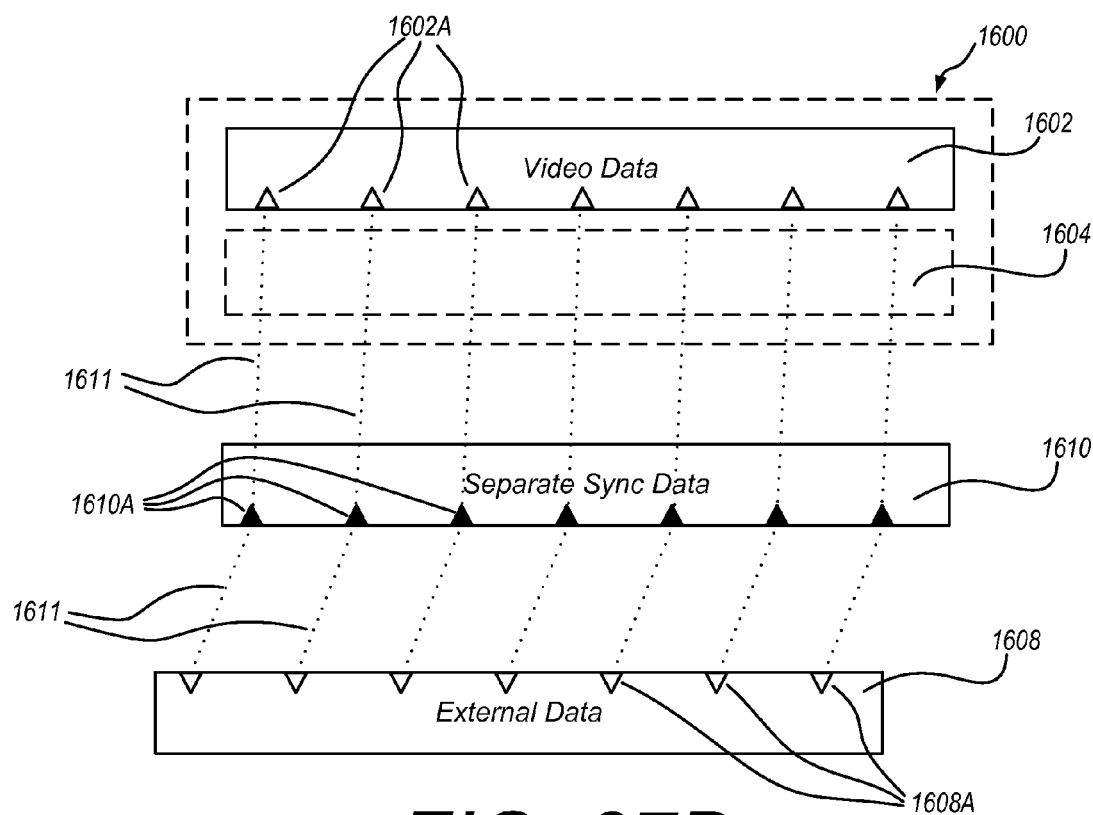
FIG. 27D is an alternate diagram of a data packaging scheme embodying the present invention.

FIGS. 27C and 27D illustrate a second data packaging scheme that may be used. In this second scheme, only the video data 1602 and the audio data 1604 are contained in the multimedia container 1600. As in the previous example, the multimedia container 1600 used in this scheme is likely an industry standard file format used for the storage of video and audio data (possibly the same standard format used for the first data packaging scheme, but without the meta data in this example). Instead of storing meta data inside the multimedia container 1600, as shown in FIGS. 27A and 27B, a separate sync data file 1610 is created.

This separate sync data file 1610 is created as the video data 1602 and the audio data 1604 are recorded. The separate sync data file 1610 contains periodic time stamp information as well as references into both the multimedia container 1600 and the external data 1608.

As shown in FIG. 27D, these references to other data streams are another type of sync marker 1610A for which a correlation 1611 is made to specific video reference points 1602A in the video data 1602 and to specific sync markers 1608A in the external data 1608. In other words, the separate sync data file 1610 contains information (sync markers 1610A) which are used to sync to specific points in the video data 1602A as well as to specific points in the external data 1608A.

Figure 27E:
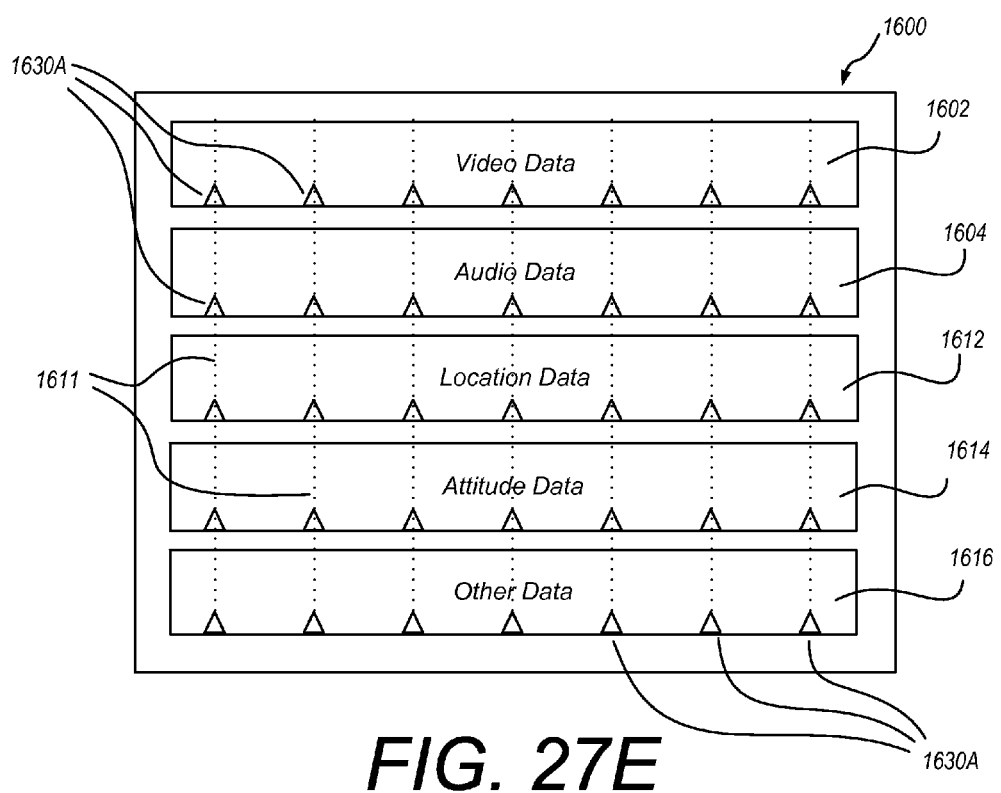
FIG. 27E is an alternate diagram of a data packaging scheme embodying the present invention.

Finally, FIG. 27E shows a third example data packaging scheme. In this third scheme, multiple streams of data are stored in a single multimedia container 1600. In contrast to the previous two data packaging schemes (shown in FIGS. 27A/27B and FIGS. 27C/27D), the multimedia container 1600 used here is a proprietary data format that would be created specifically for this embodiment. This proprietary multimedia container 1600 may contain data streams such as video data 1602, audio data 1604, location data 1612 (such as that provided by a GPS receiver), attitude data 1614 (such as that provided by an inertial navigation system), and any other data 4116 that may be appropriate.

In the example scheme shown in FIG. 27E, all of the streams are tied together (by correlations 1611) through internal sync markers 1630A. These internal sync markers 1630A are created in real-time, as the data streams are recorded, and provide automatic synchronization points for the synchronized playback of the present invention. This proprietary multimedia container 1600 is transferred as a single file to the playback system, where software on the playback system exists to read, interpret, and playback the various data streams contained within in a synchronized manner.

Figure 28:
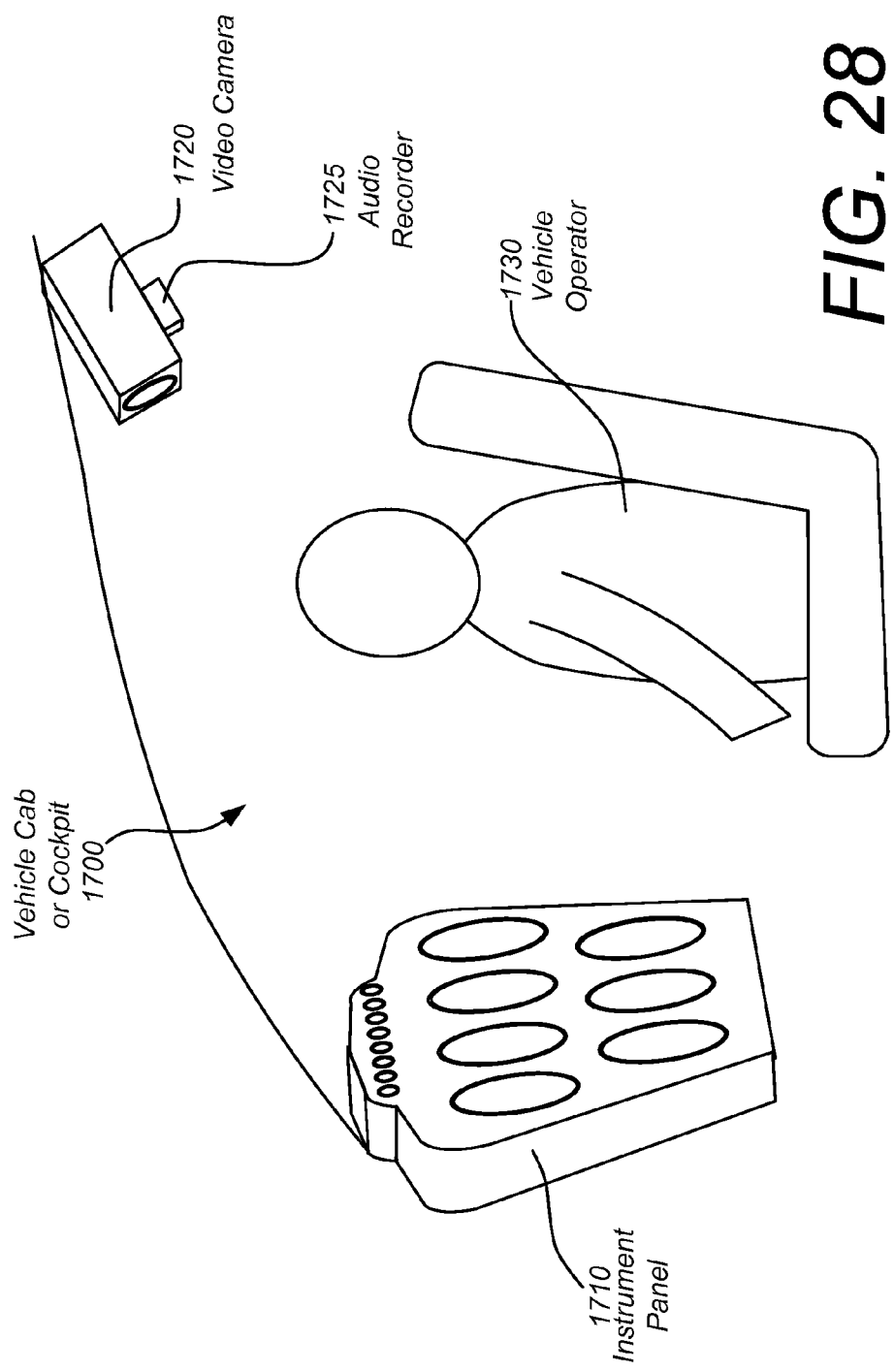
FIG. 28 is an side elevation view of the inside of a vehicle cab or cockpit, showing an embodiment of the present invention.

FIG. 28 demonstrates an example of a vehicle cab or cockpit 1700 where video data 1602 is recorded using a video camera 1720, and audio data 1604 is recorded using an audio recorder 1725. The recording devices 1720, 1725 include a clear view of the instrument panel 1710 and the vehicle operator 1730. This allows the video camera 1720 to record video data 1602 of the essential instrument controls and simultaneously recording video data 1602 of the operator's 1730 actions. Similarly, the audio recorder 1725 is capable of recording ambient cockpit noise or words spoken by the vehicle operator 1730.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of image-matching processes when viable.

Although the figures and examples described herein are limited to an embodiment of the present invention as it is installed on an aircraft, it should be obvious to one skilled in the art that the present invention could be installed on any kind of vehicle, such as a truck, automobile, or similar ground-based vehicle. For example, the recorded video described herein could be produced by a video camera installed in the cab of an on-highway truck. The synched playback produced by such a system would prove invaluable in recreating events such as collisions that occurred with the truck. The synched playback invention could be viewed by authorities investigating an accident, and they could compare the data captured in the simulation, including the orientation, speed, and location of the truck, to the images from the video, representing the actions of the driver as well as the view out the front window. The synched playback invention could also be implemented in other embodiments, such as synching recorded video from a skydiver or sports participant with a recreation of their performance. These alternate embodiments do not change the inventive concepts described herein.

Having thus described the invention, what is claimed as new and desired to be secured by Letters Patent is:

1. A synchronized video and synthetic visualization system for a mobile object comprising an aircraft traversing a flight path, which system comprises:
   a mobile video recorder associated with the aircraft and adapted to record video images from different camera angles along the flight path;
   a data recording device associated with the aircraft and adapted to record navigational and flight information;
   a secondary computer system adapted for creating a 3-D recreation of a flight path of the aircraft based on the navigational and flight information;
   a digital terrain model stored onto the data recording device and including an area of the Earth's surface including at least a portion of the flight path;
   a graphics software engine on the secondary computer system;
   a first 3-D display of a 3-D recreation including: the terrain model; a representation of the aircraft superimposed on the terrain model; and a data ribbon representing the flight path superimposed on the terrain model;
   altitude readings computed from the navigational and flight information at pre-defined intervals along the flight path;
   a second 3-D display comprising a vertical synthetic flight wall extending downwardly from the flight path data ribbon to a ground level on the terrain model computed using the altitude readings and the navigational and flight information;
   the flight wall being subdivided graphically into a vertically-oriented checkerboard configuration comprising multiple rectangular segments separated by multiple, horizontally-spaced vertical striations each representing a pre-defined horizontal distance and multiple, vertically-stacked horizontal striations each representing a pre-defined vertical distance, the pre-defined vertical and horizontal distances corresponding to altitude and distance of travel flight along the flight path respectively;
   a display device adapted for dynamically displaying in 3-D with the graphics software engine the flight wall including the vertical and horizontal striations below the flight path data ribbon;
   wherein the display device is adapted for dynamically displaying in 3-D with the graphics software engine the progress along the flight path of the aircraft on top of the flight wall and over the terrain model; and dynamically displaying aircraft altitudes at respective rectangular segments along the flight path;
   a synchronizer connected to the video recorder and the secondary computer system, the synchronizer being adapted for synchronizing video images from the video recorder with the 3-D recreation of a flight path; and
   the simulator adapted for analyzing the vehicle flight path.

2. The system according to claim 1, which includes:
   a time-referencing function adapted for time-referencing said video images with said simulated movement of said object along said flight path.

3. The system according to claim 1, which includes:
   a display device connected to said synchronizer and adapted for simultaneously displaying video images synchronized with a synthetic visualization associated with the object in motion.

4. The system according to claim 3, which includes:
   said synthetic visualization comprising a simulated flight for said object.

5. The system according to claim 1, which includes:
   sensors mounted on said object and adapted for sensing data associated with the object as it moves along said flight path; and
   said sensor data being synchronized with said video images and said flight path simulation.

6. The system according to claim 1, which includes:
   an audio recorder connected to said synchronizer and adapted for synchronizing audio recording data with said video images and said sensor data.

7. The system according to claim 6, which includes:
   an audio output device adapted for generating an audio signal synchronized with said display device output and simulating movement of said object along said flight path.

8. The system according to claim 6, which includes:
   a navigation device mounted on the object and adapted for determining geo-referenced positions of said object along said flight path; and
   said geo-referenced positions of said object along said flight path being synchronized with said playback of recorded video and said visually-modeled simulation.

9. The system according to claim 1, which includes:
   a processor connected to said synchronizer; and
   a display device connected to said processor and adapted for displaying said video images synchronized with said time-referenced object positions.

10. The system according to claim 9, which includes:
    said processor being adapted to synchronize a 3-D flight path for said object with said time-referenced object locations and output a graphical representation of said flight path to said display device.

11. The system of claim 1, wherein the video recording device is a digital camcorder.

12. The system of claim 1, which includes:
said vehicle having a data storage device;
a video recording device installed on the exterior of the vehicle;
said video recording device being directed towards a control element of the vehicle; and
said video recording device recording real-time video of the control element, including time reference, and storing the recorded data on the vehicle data storage device.

13. A method of synchronizing a simulation of a flight path of a mobile object comprising a vehicle with images from object positions along said flight path, which method comprises the steps of:
providing a processor associated with said object;
providing as input to said processor simulation data corresponding to a simulation of said object's path along said flight path;
providing the object with an image-recording device;
recording images from different camera angles associated with said object's path along said flight path;
providing as input to said processor said recorded images;
synchronizing with said processor said simulation with said images;
providing a display device connected to and receiving output from said processor;
simultaneously displaying on said display device said synchronized simulation and images;
analyzing said flight path with said processor;
wherein said simulation data comprises a digital terrain model for an area of the Earth's surface including at least a portion of the flight path; a representation of the aircraft superimposed on the terrain model; a data ribbon representing the flight path superimposed on said terrain model; and a vertical synthetic flight wall extending downwardly from said flight path data ribbon to a ground level on said terrain model;
wherein said flight wall is graphically subdivided into a vertically-oriented checkerboard configuration comprising multiple rectangular segments separated by multiple, horizontally-spaced vertical striations each representing a pre-defined horizontal distance and multiple, vertically-stacked horizontal striations each representing a pre-defined vertical distance, said pre-defined vertical and horizontal distances corresponding to altitude and distance of travel flight along said flight path respectively;
wherein said flight wall is displayed dynamically in 3-D on said display device with said graphics software engine; and
wherein the progress along said flight path is displayed dynamically in 3-D on said display device on top of said flight wall and over said terrain model.

14. The method according to claim 13, which includes the additional steps of:
providing said object with a geo-reference positioning device; and
providing geo-referenced positions from said positioning device to said processor; and
synchronizing with said processor said geo-referenced positions with said simulation and said images.

15. The method according to claim 13, which includes the additional steps of:
providing a time-referencing device; and
time-referencing said simulation on said images.

16. The method according to claim 13 wherein said processor comprises one of an on-board processor located on said object and a remote processor receiving downloads of said simulation data and said images from said object.

17. The method according to claim 13 wherein said simulation data include position, speed and heading of said vehicle.

18. The method according to claim 13 wherein said simulation data include position, speed, heading and altitude of said aircraft.

19. The method according to claim 13 wherein said processor creates a 3-D simulation of said object's movement along said flight path.

20. The method according to claim 13, which includes the additional step of:
time-stamping points in said simulation corresponding to positions of said object along said flight path; and
examining said simulation data at a time-stamped point along said flight path.

21. The method according to claim 20, which includes the additional step of:
downloading said simulation data and said images to a memory device;
searching said memory device for simulation data and said images corresponding to a respective timestamp; and
displaying simulation data and images corresponding to said timestamp.

22. The method according to claim 13 wherein said image-recording device comprises a video recorder.

23. The method according to claim 13 wherein said simulation data and said images are synchronized in real-time and post-processed.

24. The method according to claim 13 wherein said simulation data and said images are stored on one or more data storage devices on said object.

25. The method according to claim 13 wherein said simulation data and said images are transmitted wirelessly and stored remotely on data storage devices remote from said object.

26. The method according to claim 13 wherein said display device renders a 3-D simulation model of said object's movement along said flight path.

27. The method according to claim 13 wherein said synchronization step includes the additional steps of:
comparing all recorded timestamps;
determining if proper synchronization has occurred; and
providing an output signal alerting an operator if said simulation and said images were not properly synchronized.

28. The method according to claim 13, which includes the additional step of:
providing a meta-data stream including periodic synchronization markers;
providing external data consisting of one or more of location data, speed data and heading data; and
correlating external data sync markers and meta-data sync markers; and
synchronizing two or more streams of data recorded by separate devices.

29. The method according to claim 28, which includes the additional steps of:
providing said meta-data with timestamp data;
providing a video datastream; and
correlating said timestamp data to specific positions along said flight path in the video datastream and the audio datastream.

30. The method according to claim 28, which includes the additional steps of:
   providing said meta-data with timestamp data;
   providing an audio datastream;
   correlating said timestamp data to specific positions along said flight path in the audio datastream.

31. The method according to claim 13, which includes the additional steps of:
   providing a multimedia container;
   providing video data;
   providing audio data;
   storing said video and audio data in said multimedia container; and
   creating a separate sync data file from said video and audio data as the video and audio data are recorded;
   periodically time stamping information in the sync data file; and
   providing references to both the multimedia container and external data to the sync data file;
   syncing specific points in the video data; and
   syncing specific points in the external data.

32. The method according to claim 13, which includes the additional steps of:
   creating a proprietary data format including one or more of video data, audio data, location data and attitude data;
   creating internal sync markers in real-time as the data streams are recorded;
   providing automatic synchronization points for the synchronized playback of the recorded data;
   storing multiple streams of data in a single multimedia container;
   transferring the proprietary multimedia container data contents to a single file;
   providing software for reading, interpreting and playing back said recorded data streams in a synchronized manner; and
   correlating the data streams with the internal sync markers.

* * * * *